(12) United States Patent
Fukaya

(10) Patent No.: US 7,289,120 B2
(45) Date of Patent: Oct. 30, 2007

(54) GRAPHIC DISPLAY CONTROL APPARATUS AND PROGRAM

(75) Inventor: Hideshi Fukaya, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 292 days.

(21) Appl. No.: 10/869,744

(22) Filed: Jun. 15, 2004

(65) Prior Publication Data

US 2004/0223002 A1    Nov. 11, 2004

Related U.S. Application Data

(63) Continuation of application No. PCT/JP03/12517, filed on Sep. 30, 2003.

(30) Foreign Application Priority Data

| Sep. 30, 2002 | (JP) | ............................. 2002-285841 |
| Sep. 30, 2002 | (JP) | ............................. 2002-286062 |
| Sep. 30, 2002 | (JP) | ............................. 2002-287131 |
| Sep. 30, 2002 | (JP) | ............................. 2002-287301 |

(51) Int. Cl.
  *G06T 11/20*   (2006.01)
  *G06F 3/048*   (2006.01)
(52) U.S. Cl. ..................... 345/440; 715/769
(58) Field of Classification Search ............... 345/440; 715/769
See application file for complete search history.

(56) References Cited

U.S. PATENT DOCUMENTS

| 4,794,553 | A |   | 12/1988 | Watanabe et al. |
| 5,008,854 | A |   | 4/1991 | Maeda et al. |
| 5,535,317 | A | * | 7/1996 | Tanaka et al. ............... 345/440 |
| 5,539,867 | A | * | 7/1996 | Handa et al. ................ 345/440 |
| 5,870,319 | A | * | 2/1999 | Thornton et al. ........... 708/160 |
| 6,061,058 | A |   | 5/2000 | Owens et al. |
| 6,133,924 | A | * | 10/2000 | Ito et al. ..................... 345/440 |
| 2003/0006986 | A1 | * | 1/2003 | Dick et al. .................. 345/440 |
| 2003/0182333 | A1 | * | 9/2003 | Good et al. ................. 708/131 |

FOREIGN PATENT DOCUMENTS

| JP | 09-282476   | 10/1997 |
| JP | 10-097501 A | 4/1998 |
| JP | 10-161980 A | 6/1998 |

(Continued)

OTHER PUBLICATIONS

English Abstract Attached.

(Continued)

*Primary Examiner*—Jin-Cheng Wang
(74) *Attorney, Agent, or Firm*—Frishauf, Holtz, Goodman & Chick, P.C.

(57) ABSTRACT

A geometrical graphic form (for example, a straight line 100) displayed on a geometrical window GW1 is selected, and a copy operation is carried out. When pasting is carried out for a formula window CW1, the selected geometrical form object is converted into the corresponding formula (for example, y=x), and the converted formula is displayed on the formula window CW1. A display region (for example, a specified region T1) of the formula is selected, and a copy operation is carried out. When pasting is carried out for the geometrical window GW1, a functional graph graphic form 102 is displayed on the geometrical window GW1 based on the selected formula.

7 Claims, 65 Drawing Sheets

FOREIGN PATENT DOCUMENTS

JP          10-222471 A      8/1998

OTHER PUBLICATIONS

"IBM Mathematical Laboratory Series: Function and graph: Function Laboratory" IBM Japan, Ltd., Feb. 28, 1992, p. 108-129, (CS-NA-2003-801-1).

Related Continuation U.S. Appl. No.: 11/734,169, filed Apr. 11, 2007, Inventor: Manabu Igusa, Title: "Graphic Display Control Apparatus and Program".

Usuda, Shoji, "Range of Use Expands with Japanese Language Correspondence" Mathcad 7 -from basic to application mini interpretation-, TRY! PC, CQ Publishing Co., Ltd., May 1, 1998, pp. 115 to 123 (CSDB: Domestic Technical Journal 199801377012).

\* cited by examiner

FIG.4

| IDENTIFIER ID | GEOMETRY TYPE | SPECIFIC POINT COORDINATE | | | |
|---|---|---|---|---|---|
| | | FIRST SPECIFIC POINT | SECOND SPECIFIC POINT | THIRD SPECIFIC POINT | FOURTH SPECIFIC POINT |
| ID0024 | STRAIGHT LINE | (1, 2) | (-1, -2) | — | — |
| ID0028 | CIRCLE | (0, 0) | (2, 0) | — | — |
| ID0030 | FUNCTIONAL GRAPH | — | — | — | — |
| ID0031 | FUNCTIONAL GRAPH | — | — | — | — |
| ... | ... | ... | ... | ... | ... |

|   | List1 | List2 | List3 |
|---|-------|-------|-------|
| 1 | 7 | 4 | |
| 2 | 4 | 5 | |
| 3 | 5 | 2 | |
| 4 | 8 | 1 | |
| 5 | 1 | 6 | |

|   | List1 | List2 | List3 |
|---|-------|-------|-------|
| 1 | 7 | 4 | |
| 2 | 4 | 5 | |
| 3 | 5 | 2 | |
| 4 | 8 | 1 | |
| 5 | 1 | 6 | |

SW13 — T13

| X | Y1 |
|---|-----|
| 0 | 6.6 |
| 1 | 6 |
| 2 | 5.4 |
| 3 | 4.8 |

TW14 — [table: X | Y1; 0 | 6.6; 1 | 6; 2 | 5.4; 3 | 4.8] — 440

| X | Y1 |
|---|---|
| 0 | 6.6 |
| 1 | 6 |
| 2 | 5.4 |
| 3 | 4.8 |

T14

TW14

7

SW14

|   | List1 | List2 | List3 |
|---|---|---|---|
| 1 | 7 | 4 |   |
| 2 | 4 | 5 |   |
| 3 | 5 | 2 |   |
| 4 | 8 | 1 |   |
| 5 | 1 | 6 |   |

| GEOMETRICAL GRAPHIC FORM ID | GEOMETRY TYPE | SPECIFIC POINT COORDINATE | | | |
|---|---|---|---|---|---|
| | | FIRST SPECIFIC POINT | SECOND SPECIFIC POINT | THIRD SPECIFIC POINT | FOURTH SPECIFIC POINT |
| ID_G024 | STRAIGHT LINE | (1, 2) | (-1, -2) | — | — |
| ID_G028 | CIRCLE | (0, 0) | (2, 0) | — | — |
| ID_G030 | FUNCTIONAL GRAPH | — | — | — | — |
| ID_G031 | FUNCTIONAL GRAPH | — | — | — | — |

| GEOMETRICAL GRAPHIC FORM ID | FUNCTIONAL FORMULA |
|---|---|
| ID_G030 | $y=3x^2+2$ |
| ID_G031 | $y=x^3+8x-7$ |

| FORMULA ID | FORMULA DATA |
|---|---|
| ID_C020 | $y=-x+4$ |
| ID_C023 | $y=x^3+8x-7$ |
| ID_C024 | $y=3x^2+2$ |

| GEOMETRICAL GRAPHIC FORM ID | FORMULA ID |
|---|---|
| ID_G030 | ID_C024 |
| ID_G031 | ID_C023 |

| CALCULATION LINK FLAG | GEOMETRICAL LINK FLAG | COPY DATA |
|---|---|---|
| ON | OFF | y=3x+4 |
|  |  |  |

FIG.60

| CATEGORY | CONVERSION NAME | CONVERSION MEANS |
|---|---|---|
| ABSOLUTE VALUE | SIMPLIFY ABSOLUTE MULTIPLICATION | abs(a)*abs(b)=abs(a*b) |
| | SIMPLIFY ABSOLUTE DIVISION | abs(a)/abs(b)=abs(a/b) |
| | REMOVE AN ABSOLUTE VALUE | abs(a)=a |
| | REMOVE AN ABSOLUTE VALUE | abs(a)=-a |
| | CHANGE abs TO signum | abs(a)=a/signum(a) |
| | CHANGE signum TO abs | sugnum(a)=a/abs(a) |
| ~ | ~ | ~ |

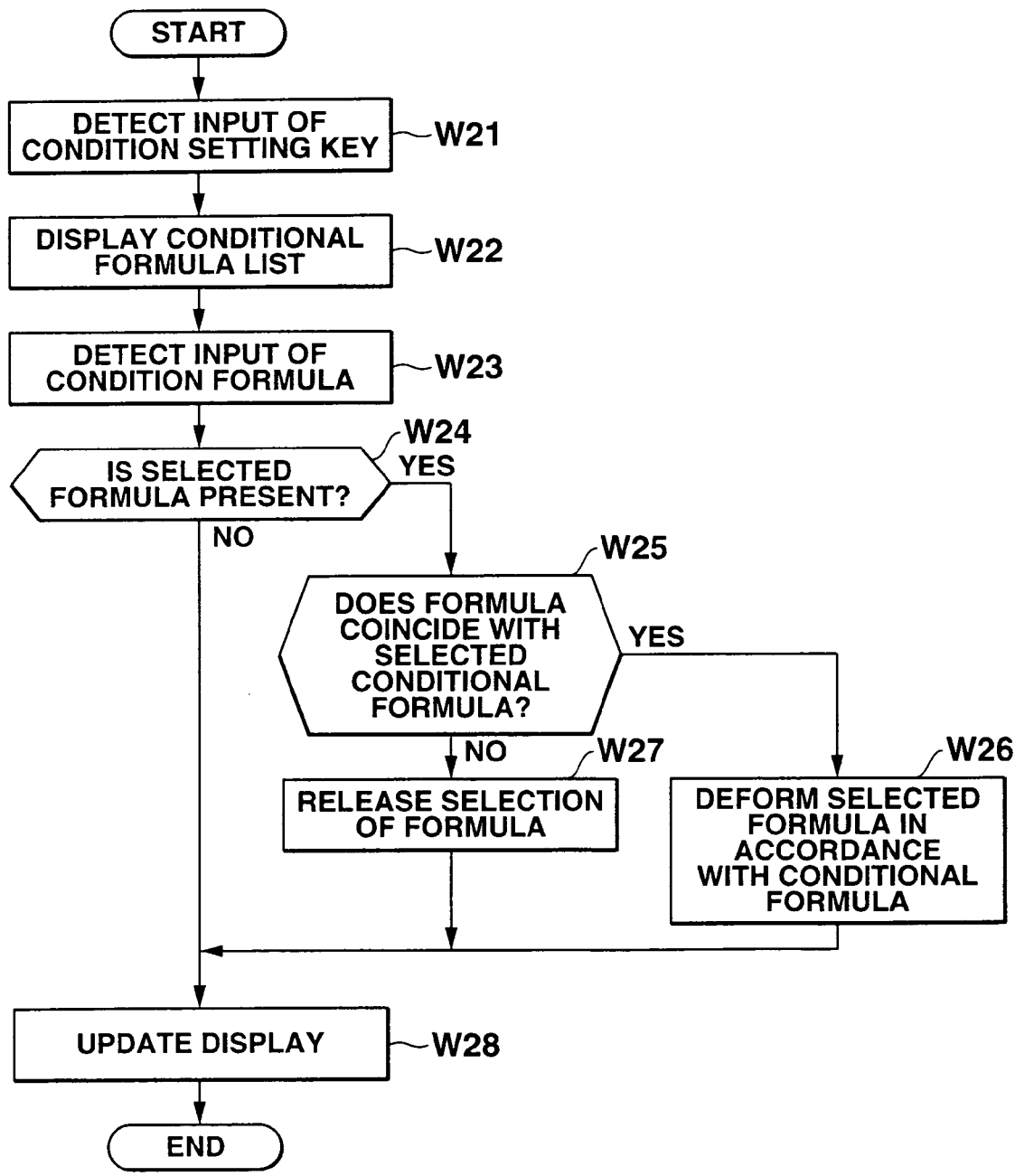

FIG.64

| CATEGORY | CONVERSION NAME | CONVERSION MEANS |
|---|---|---|
| | VARIABLE CHANGE RULE | a+b=b+a |
| | GROUP WITH MINUS SIGN (-) | (-a)+b=-(a+b) |
| | GROUP WITH THE SAME SIGN IN AN ADDITION/SUBTRACTION | -a+b-c+d=b+d-(a+c) |
| | CHANGE THE ORDER OF MULTIPLICATION | a*b=b*a |
| BASIC DEFORMATION | CHANGE DIVISION TO MULTIPLICATION | a/b=a*(1/b) |
| | CHANGE POWER TO MULTIPLICATION | a^n=a*a*a*... |
| | CHANGE FACTORIAL TO MULTIPLICATION | n!=a*(a-1)*...*2*1 |
| | REMOVE MINUS SIGN FROM MULTIPLICATION | (-a)*(-b)=a*b |
| | REMOVE MINUS SIGN FROM DIVISION | (-a)/(-b)=a/b |
| | CHANGE THE ORDER OF POWER | a^n+a^(n-1)+...+a+1=1+a+...a^(n-1)+a^n |
| | GROUP COEFFICIENT OF MULTIPLICATION | a*x+b*x=(a+b)*x |
| | PRIME FACTOR DIVISION | (a+b)*x=a*x+b*x |
| | ~ | ~ |
| | ~ | ~ |
| TRIGONOMETRIC FUNCTION | CHANGE sin AND cos TO 1 | (sin(a))^2+(cos(a))^2=1 |
| | CHANGE 1 TO sin AND cos | 1=(sin(a))^2+(cos(a))^2 |
| | ADDITION THEOREM | sin(a+b)=sin(a)*cos(b)+cos(a)*sin(a) |
| | ADDITION THEOREM | sin(a-b)=sin(a)*cos(b)-cos(a)*sin(a) |
| ~ | ~ | ~ |
| ~ | ~ | ~ |

FIG.70

| CATEGORY | CONVERSION NAME |
|---|---|
| TRANSFORMATION | simplifiy |
| | expend |
| | factor |
| | rFactor |
| | factorOut |
| | approx |
| | combine |
| | ⟨ |
| CALCULATION | diff |
| | ∫ |
| | lim |
| | ⟨ |
| ⟨ | ⟨ |

GRAPHIC DISPLAY CONTROL APPARATUS AND PROGRAM

CROSS-REFERENCE TO RELATED APPLICATIONS

This is a Continuation Application of PCT Application No. PCT/JP03/12517, filed Sep. 30, 2003, which was published by the International Bureau on 8 Apr. 2004 (08.04.2004) under No. WO 2004/029788.

This application is based upon and claims the benefit of priority from prior Japanese Patent Applications No. 2002-285841, filed Sep. 30, 2002; No. 2002-286062, filed Sep. 30, 2002; No. 2002-287131, filed Sep. 30, 2002; and No. 2002-287301, filed Sep. 30, 2002, the entire contents of all of which are incorporated herein by reference.

BACKGROUND OF THE INVENTION

1. Field of the Invention

The present invention relates to a graphic display control apparatus and program.

2. Description of the Related Art

Conventionally, an apparatus comprising a graphical drawing function for graphically drawing a geometrical graphic form is known. For example, in a functional pocket calculator which comprises: a variety of functions such as calculating functions such as equation calculation, matrix calculation and complex calculation; a financial calculating function, or a statistic function, there is known a functional pocket calculator comprising the above described graphical drawing functions (hereinafter, referred to as a "functional pocket calculator"). This functional pocket calculator is capable of graphically displaying a calculation result of a variety of technical calculations utilizing a calculating function or displaying a graphical formula by inputting the graphical formula and drawing a graph. Therefore, in an educational scene, the functional pocket calculator of such type is, widely utilized in order to study a relationship between character data such as a formula and a graph or a graphic form.

In the functional pocket calculator as described above, there is known a functional pocket calculator comprising a function which manually inputs a general shape of a graph targeted to be displayed, by means of an input pen or the like and a coordinate on the graph is input, thereby specifying a graphical formula and displaying a precise graph based on the graphical formula.

However, in a conventional functional pocket calculator, in order to input a functional formula or a graphical formula, thereby producing a graph or in order to display a graphical formula or graphic form from a graphic display, there has been a need for a series of operations which are different from each other according to their purposes. Therefore, in order to learn or analyze a relationship between character data such as a formula and a graph or a graphic form by using the conventional functional pocket calculator, there has been a need to make a series of respective operations, and at the same time, there has been a need to properly understand an operation of the functional pocket calculator.

In addition, in a conventional graphical display device, it is general that a primary interest is placed on association of a functional formula and a graph. However, in mathematical learning or the like, for example, it is often that arithmetical operation of a functional formula as well as a mere graphical display is carried out. In a conventional graphical function pocket calculator, because a primary interest of development is placed on deriving of a functional formula based on a graph or drawing a graph based on the functional formula, it is difficult to consider that use of such calculator is always suitable in a scene of learning a change of a formula or the like.

BRIEF SUMMARY OF THE INVENTION

The present invention is made in view of the above described conventional circumstance.

It is an object of the present invention to provide a graphical display control apparatus which shows a relationship between character data such as a formula and a graph or a graphic form corresponding thereto by means of a very simple operation.

It is another object of the present invention to easily handle a formula processing function in an electrical device such as a graphic function pocket calculator.

According to an aspect of the present invention, a graphic display control apparatus comprises:

a display device comprising a first screen which displays a display mode in a geometrical graphic form and a second screen which displays a display mode in a formula including a character string; and a conversion display controller which, after a copy operation is made for one of the first screen and the second screen, when a paste operation is made for the other screen, converts a content of one display mode specified by the copy operation into the other display mode specified by the paste operation, and controls a display of the converted content on the other screen.

According to another aspect of the present invention, an article of manufacture comprises a computer usable medium having computer readable program code means embodied therein, the computer readable program code means comprises:

computer readable program code means for causing a computer to control a first screen which displays a display mode in a geometrical graphic form and a second screen which displays the display mode in a formula including a character string; and computer readable program code means for causing a computer to, after a copy operation is made for one of the first screen and the second screen, when a paste operation is made for the other screen, convert a content of one display mode specified by the copy operation into the other display mode specified by the paste operation and controlling a display of the content on the other screen.

According to still another aspect of the present invention, a graphic display control apparatus comprises:

a formula display controller which controls a display of data in a formula format including a formula and a character;

a graphic display controller which controls a display of data in a graphic format including a graph and a graphic form;

a first specifying unit which specifies either one of data in a character format displayed by the formula display controller and data in a graphic format displayed by the graphic display controller;

a second specifying unit which, after one of data in the character format and data in the graphic format is specified by the first specifying unit, specifies either of a display by the formula display controller and a display by the graphic display controller;

a graphic form conversion display controller which, after the data in the character format displayed by the formula display controller is specified by the first specifying unit, when the display by the graphic display controller is specified by the second specifying unit, converts the data in the character format displayed by the formula display controller into data in the corresponding graphic format, and controls a display of the converted data; and a graphic form conversion display controller which, after the data in the graphic format displayed by the graphic display controller is specified by the first specifying unit, when the display by the formula display controller is specified by the second specifying unit, converts the data in the graphic format displayed by the graphic display controller into data in the corresponding formula format.

According to still another aspect of the present invention, an article of manufacture comprises a computer usable medium having computer readable program code means embodied therein, the computer readable program code means comprises:

computer readable program code means for causing a computer to display data in a formula format including a formula and a character;

computer readable program code means for causing a computer to display data in a graphic format including a graph and a graphic form;

computer readable program code means for causing a computer to specify either of data in a character format displayed by formula display controller and data in a graphic format displayed by graphic display controller;

computer readable program code means for causing a computer to, after either of data in the character format and data in the graphic format is specified by first specifying unit, specify any of a display by the formula display means and a display by the graphic display means;

computer readable program code means for causing a computer to, after the display by the formula display controller is specified, when the display by the graphic display controller is specified, convert the data in the character format displayed by the formula display controller into the data in the corresponding graphic format, and control a display of the converted data; and computer readable program code means for causing a computer to, after the data in the graphic format displayed by the graphic display controller is specified, when the display by the formula display controller is specified, convert the data in the graphic format displayed by the graphic display controller into the data in the corresponding formula format, and control a display of the converted data.

According to still another aspect of the present invention, a data format conversion control apparatus comprises:

a first display device which displays data in a first format;

a second display device which displays data in a second format; and a conversion controller which, when a predetermined move operation from the first display device to the second display device is instructed, converts the data displayed at the first display device into the second format and controls the converted format to be displayed at the second display device.

According to still another aspect of the present invention, an article of manufacture comprises a computer usable medium having computer readable program code means embodied therein, the computer readable program code means comprises:

computer readable program code means for causing a computer to display data in a first format;

computer readable program code means for causing a computer to display data in a second format; and computer readable program code means for causing a computer to, when a predetermined move operation from the data displayed in the first format to the data displayed in the second format is instructed, convert data displayed in the first format into data displayed in the second format, and controlling a display of the converted data in the second format.

According to still another aspect of the present invention, a graphic display control apparatus comprises:

a display device comprising a first screen which displays a display mode in a geometrical graphic form and a second screen which displays a display mode in a formula consisting of a character string;

a setting unit which sets a correlation between the geometrical graphic form displayed on the first screen and the formula displayed on the second screen; and a display update unit which, when a change operation is made for either of the geometrical graphic form and formula in which the correlation is set by the setting means, updates the other display mode based on the change operation.

According to still another aspect of the present invention, an article of manufacture comprises a computer usable medium having computer readable program code means embodied therein, the computer readable program code means comprises:

computer readable program code means for causing a computer to display a display mode in a geometrical graphic form and a display mode in a formula consisting of a character string;

computer readable program code means for causing a computer to set a correlation between the geometrical graphic form and the formula; and computer readable program code means for causing a computer to, when a change operation is made for either of the geometrical graphic form and formula in which the correlation is set by setting means, update the other display mode based on the change operation.

According to still another aspect of the present invention, a formula display control apparatus comprises:

a formula display unit which displays a formula;

a formula selecting unit which selects a part or all of the formula displayed by the formula display unit;

a menu display unit which displays a plurality of deformation menus;

a menu selecting unit which selects any one of a plurality of deformation menus displayed on the menu display unit;

a formula deforming unit which deforms a part or all of the formula selected by the formula selecting unit in accordance with the deformation menu selected by the menu selecting unit; and a display controller which causes the formula display unit to display a formula after deformed by the formula deforming unit.

According to still another aspect of the present invention, an article of manufacture comprises a computer usable medium having computer readable program code means embodied therein, the computer readable program code means comprises:

computer readable program code means for causing a computer to display function which displays a formula;

computer readable program code means for causing a computer to select a part or all of the formula;

computer readable program code means for causing a computer to display a plurality of deformation menus;

computer readable program code means for causing a computer to select any one of the plurality of deformation menus;

computer readable program code means for causing a computer to deform a part or all of the formula selected in accordance with the deformation menu selected; and computer readable program code means for causing a computer to display a formula after deformed.

BRIEF DESCRIPTION OF THE SEVERAL VIEWS OF THE DRAWING

FIG. 4 is a view showing an example of geometrical window data;

FIG. 33A and FIG. 33B are views each showing a change example of a display screen of the functional pocket calculator in the fourth embodiment;

FIG. 34A and FIG. 34B are views each showing a change example of a display screen of the functional pocket calculator in the fourth embodiment;

FIG. 37 is a view showing an example of geometrical window data;

FIG. 38 is a view showing an example of a functional formula table;

FIG. 39 is a view showing an example of calculation window data;

FIG. 40 is a view showing an example of a link table;

FIG. 41 is a view showing an example of a copy buffer;

FIG. 60 is a view showing an example of conditional formula listings;

FIG. 61 is a flow chart for illustrating an operation in the seventh embodiment;

FIG. 64 is a view showing an example of deformation formula listings;

FIG. 70 is a view showing an example of modified command listings.

DETAILED DESCRIPTION OF THE INVENTION

Hereinafter, preferred embodiments in which a graphical display control apparatus according to the present invention is applied to a functional pocket calculator will be described in detail with reference to FIG. 1 to FIG. 30.

Figure 1:
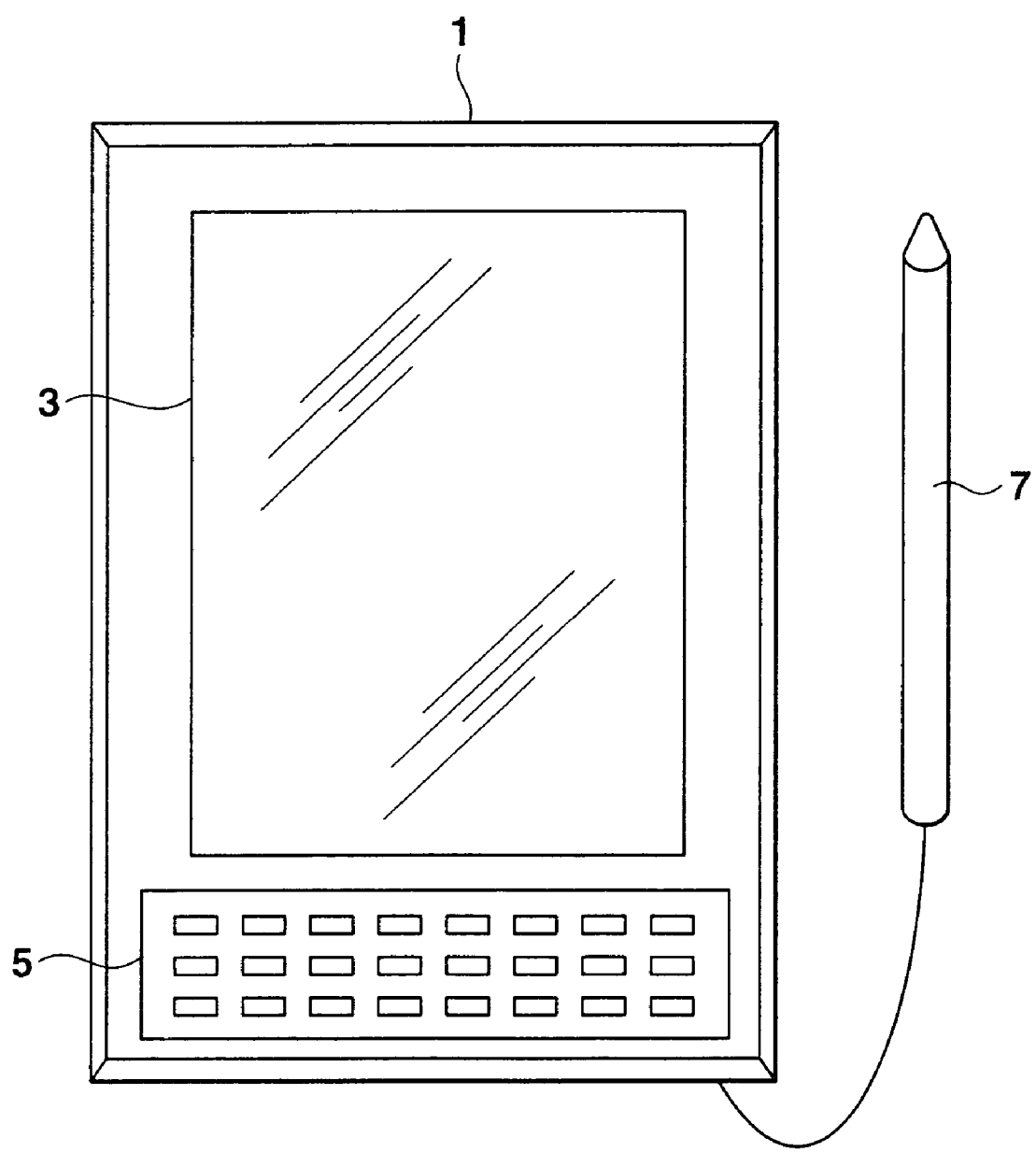
FIG. 1 is a view showing an example of overview of a functional pocket calculator to which the present invention is applied.

FIG. 1 shows an example of overview of a functional pocket calculator 1 to which the present invention is applied. The functional pocket calculator 1 comprises a display 3, a variety of keys 5, and an input pen 7. Specific functions are each assigned to keys configuring the variety of keys 5, and a user operates the functional pocket calculator 1 by depressing these keys. A tablet (touch panel) 30 described later is configured integrally with the display 3, and the user can input data by a touch operation on the display 3 using the input pen 7.

First Embodiment

A first embodiment of a functional pocket calculator to which the present invention is applied will be described here. The following description will be given by way of example where the present invention is applied to a functional pocket calculator having installed therein a geometrical application program for achieving a geometrical graphical drawing function (hereinafter, conveniently referred to as a "geometrical application") and a calculation application program for achieving a calculating function (hereinafter, conveniently referred to as a "calculation application").

In the first embodiment, when the display content of either of a geometrical application screen (hereinafter, referred to as a "geometrical window") and a calculation application screen (hereinafter, referred to as a "calculation window") is selected, a copy operation is made, another screen is specified, and a paste operation is made, the display content of the selected one screen is controlled to be displayed according to a display mode of such another screen.

Figure 2:
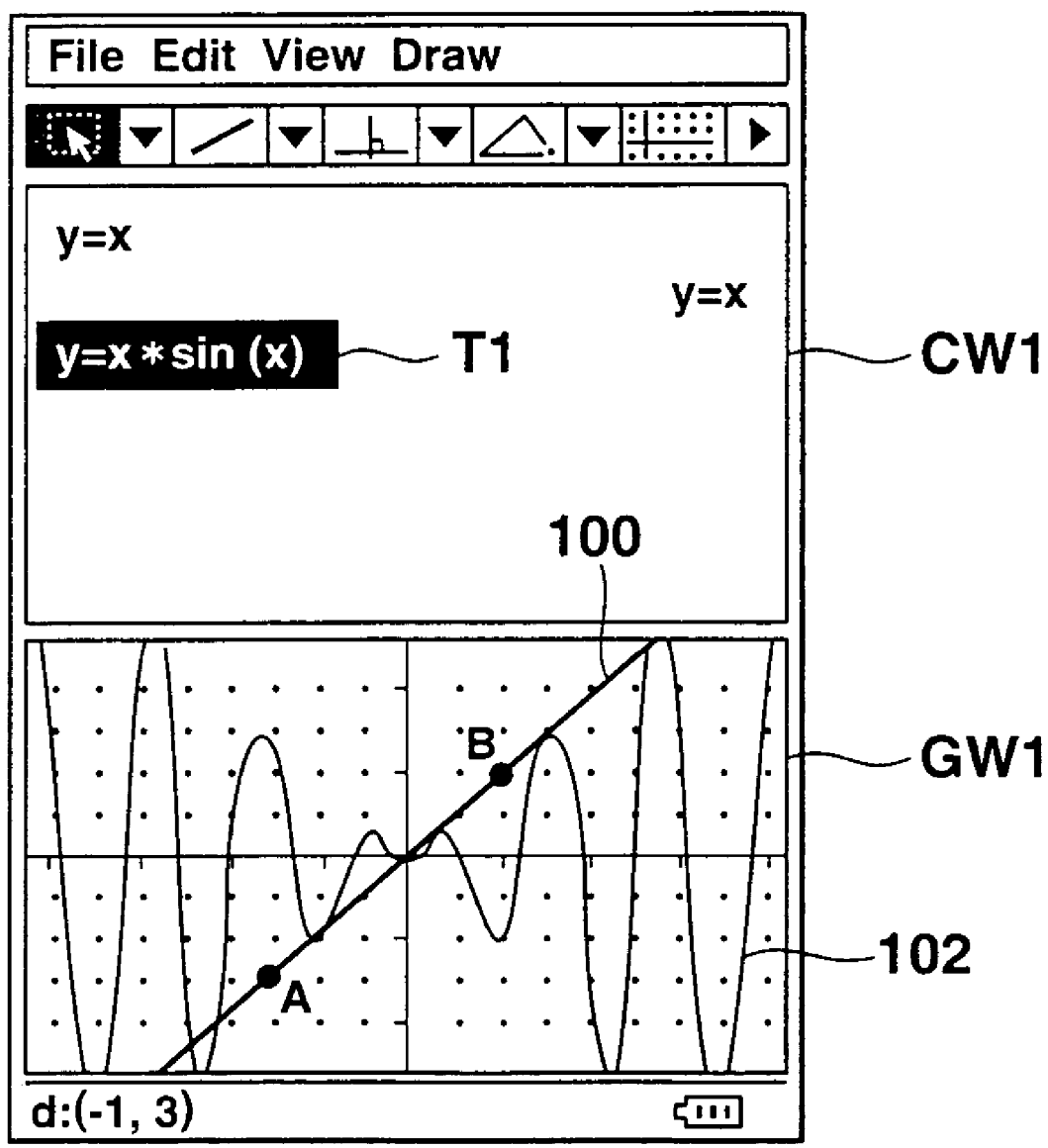
FIG. 2 is a view showing an example of a display screen of the functional pocket calculator.

FIG. 2 shows a display screen example of the functional pocket calculator 1 in the first embodiment according to the present invention. On the screen display, a formula window CW1 and a geometrical window GW1 are displayed. A user can carry out a variety of calculation processing functions such as equation calculation, matrix arithmetical operation, and complex arithmetical operation in the formula window CW1. The user specifies geometrical type of a graphic form targeted to be drawn and specifies a specific point coordinate of the geometrical graphic form (inputs a functional formula if the geometrical type is a functional graph), whereby the corresponding geometrical graphic form object can be displayed on the geometrical window GW1. The geometrical graphic form object displayed on the geometrical window GW1 can be selected by means of an input pen or the like, and a display position can be moved in parallel.

In the functional pocket calculator 1, in a state in which a geometrical application and a calculation application are started up, and the geometrical window GW1 and the formula window CW1 are displayed on a display screen, as described above, for example, in the geometrical window GW1, when an instruction for drawing a straight line is input as shown in FIG. 2 and points A and B are specified by means of the input pen or the like, a straight line object 100 passing through the points A and B is drawn.

For example, when the straight line object 100 is selected, a copy operation is input, the formula window CW1 is specified, and a paste operation is input, a character string "y=x" of the corresponding linear formula is displayed at a cursor position of the formula window CW1.

A copy and paste operation is an operation for, for example, specifying desired data on a screen (such as a graphic form, an image, or a character string) by means of a pointing device (such as a pen or a mouse), and specifying a position to which data or a substitute for the data is pasted by means of a pointing device (such as a pen or a mouse). This operation is carried out by an operation for, after specifying desired data on a screen by means of a pen, executing a copy command, specifying a position of a paste destination by means of the pen, and executing a paste command.

The copy and paste operation can be achieved by an operation for, for example, specifying and touching desired data on a screen by means of a pen, and moving the data while maintaining that touch (hereinafter, referred to as a "drag operation") and an operation for moving upwardly the pen at a position of a paste destination in a state in which the touch of desired data is maintained after the drag operation (hereinafter, referred to as a "drop operation").

An operation for abutting an input pen (for example, an input pen 7 shown in FIG. 1) against a display device (for example, a display 3 shown in FIG. 1) and sliding on the display device the input pen abutted against the display device is referred to as "Drag," an operation for releasing the input pen from the display device is referred to as "Drop," and a series of these operations is referred to as "Drag and Drop." A copy and paste operation may be achieved by selecting a copy menu provided, by means of a button or the like in a copy source screen, and then, selecting a paste menu on a copy destination screen.

In the formula window CW1, for example, "y=x" is input to be edited, and the resultant formula is changed to "y=x×sin(x)." When the formula "y=x×sin(x)" is selected, a copy operation is input, the geometrical window GW1 is specified, and a paste operation is input, a functional graph graphic form 102 based on the formula "y=x×sin(x)" is drawn on the geometrical window GW1.

Figure 3:
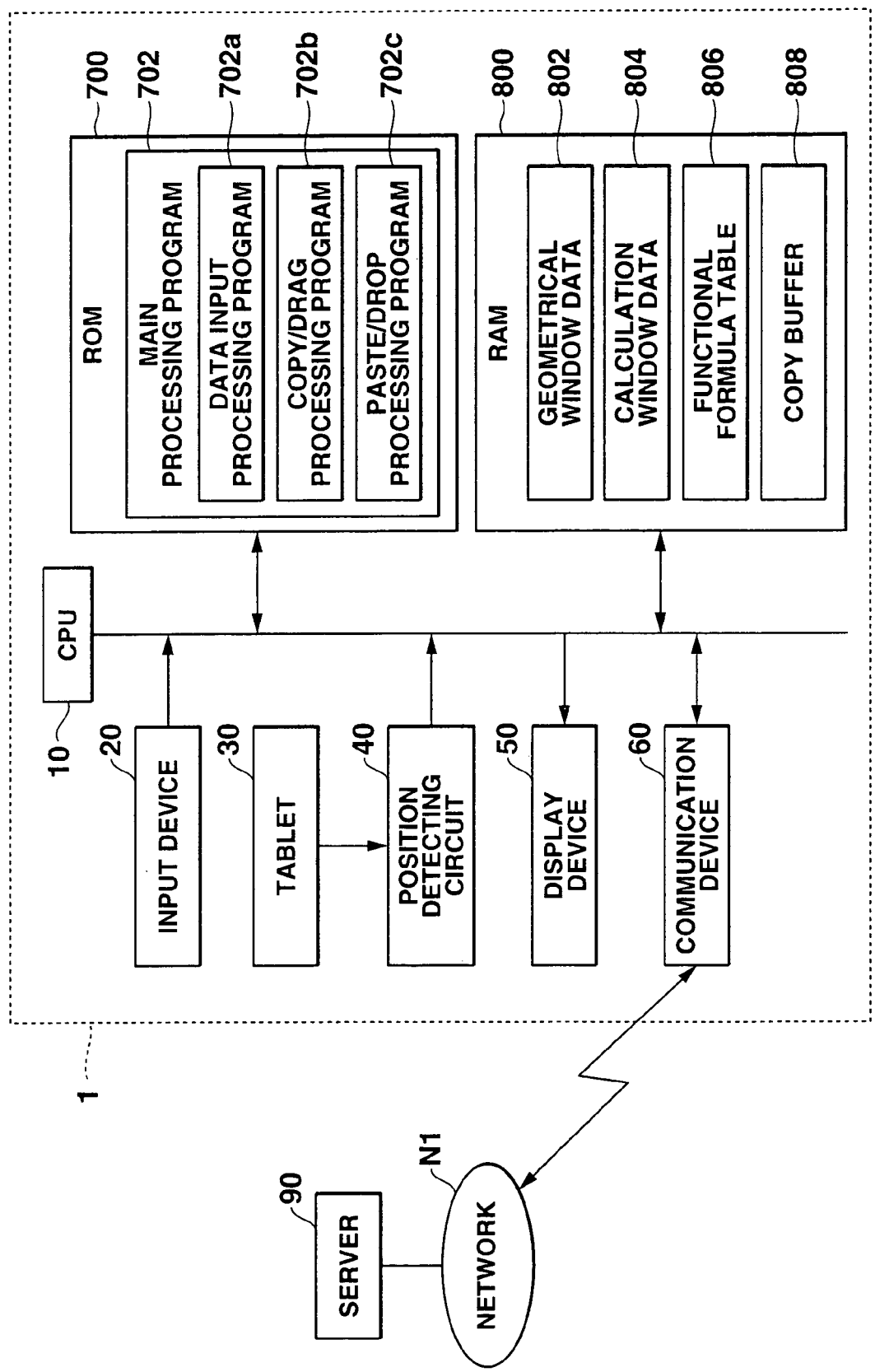
FIG. 3 is a view showing a functional configuration of the functional pocket calculator in a first embodiment.

FIG. 3 is a view showing a functional configuration example of the functional pocket calculator 1. The functional pocket calculator 1 comprises functional portions such as a CPU 10, an input device 20, a tablet 30, a position detecting circuit 40, a communication device 60, a display device 50, a ROM 700, and a RAM 800.

The CPU 10 executes processing based on a predetermined program according to an input instruction; supplies an instruction to each functional portion or transfers data; and integrally controls the function pocket calculator 1. Specifically, the CPU 10 reads out a program stored in the ROM 700 according to a signal input from the input device 20 or tablet 30, and executes processing in accordance with the program. A processing result is stored in the RAM 800, and a display signal for displaying the processing result is outputted to the display device 50 as required, thereby displaying the corresponding display information.

The input device 20 is an input device which comprises keys required to input numeric values or formulas and the like and select a function or the like. The input device 20 outputs a depress signal of the depressed key or the like to the CPU 10. By means of key input at the input device 20 input means is achieved for startup instruction of a geometrical application or a formula application, execution of graphical drawing processing, input of formulas, execution of arithmetical operation or the like, termination of processing or mode cancel, moving of a cursor or the like in a variety of pointers or in a menu screen, or a variety of selecting operations or an instruction for determining the selecting operations. The input device 20 corresponds to the keys 5 shown in FIG. 1.

As an input device, the functional pocket calculator 1 comprises a tablet 30 serving as a touch panel. The tablet 30 is an input device obtained by combining a device such as an input pen (corresponding to the input pen 7 shown in FIG. 1) for indicating a position at a display device 50 with a device for sensing the indicated position of the display device 50. The position detecting circuit 40 connected to the tablet 30 detects a positional coordinate indicated by the tablet 30. When the tablet 30 is used, the position at the display device 50 can be specified in detail. By means of a touch operation of the display device 50 using the tablet 30, the input means at the above described input device 20 can be achieved.

By means of a drag and drop operation using the tablet 30, data specified on either of the geometrical window and calculation window can be copied to another screen.

The display device 50 displays a variety of screens by being controlled based on a display signal output from the CPU 10, and comprises an LCD (Liquid Crystal Display) or the like. The display device 50 corresponds to the display 3 shown in FIG. 1, and is formed integrally with the tablet 30.

The communication device 60 comprises a communication apparatus which is connected to another device (for example, a server 90) via a network N1 and transmits and receives predetermined information. The CPU 10 carries out control for establishing communication with an external device via the communication device 60 and the network N1.

Specifically, for example, the programs or data and the like received from the server 90 via the communication device 60 and the network N1 are arranged to be stored in the ROM 700 or RAM 800, whereby the user can utilize the programs or data or the like stored in the server 90.

The ROM 700 stores initial programs for carrying out a variety of initial settings, checking hardware, or loading required programs and the like. The CPU 10 sets operating environment of the functional pocket calculator 1 by executing this initialization program when the functional pocket calculator 1 is powered ON.

The ROM 700 stores application programs such as a geometrical application program and a calculation application program; a variety of processing programs according to operations of the functional pocket calculator 1 such as menu display processing and a variety of setting processes; and programs for achieving a variety of functions which are included by the functional pocket calculator 1. In particular, the ROM 700 stores a main processing program 702. The main processing program 702 comprises a data input processing program 702a, a copy/drag processing program 702b, and a paste/drop processing program 702.

The CPU 10 executes processing in accordance with the main processing program 702. Specifically, the CPU 10 starts execution of the data input processing program 702a according to the user data input operation, and carries out data input processing. The CPU 10 starts execution of the copy/drag processing program 702b according to the user copy/drag operation, and carries out copy/drag operation. The CPU 10 starts execution of the paste/drop processing program 702c according to the user paste/drop operation, and carries out paste/drop processing.

The RAM 800 comprises a variety of programs which are executed by the CPU 10 and a memory region for temporarily storing data or the like upon execution of these programs. In particular, the RAM 800 comprises: geometrical window data 802 for storing geometrical data drawn on a geometrical window; calculation window data 804 for storing the calculation data displayed on a calculation window; a functional formula table 806 for storing functional formula data concerning a functional graph drawn on a geometrical window; and a copy buffer 808 for temporarily storing data specified by a copy operation.

FIG. 4 shows an example of the geometrical window data 802. The geometrical window data 802 is a data table in which an identifier ID, a geometry type, and a specific point coordinate are associated with each other. When an instruction for drawing a geometrical graphic form is input in a geometrical window, the CPU 10 draws the corresponding object of the geometrical graphic form based on the specified specific point coordinate. At this time, the CPU 10 assigns its specified type ID to the geometrical graphic form object, associates the identifier ID, geometry type, and specific point coordinate with each other, and stores them in the geometrical window data 802.

The geometrical graphic forms used here include those represented as line drawings such as points, lines (including segment of line, straight line), vectors, circles (including arc), polygons, and functional graphs. The objects used here include units of geometrical graphic forms drawn (displayed). For example, if a geometrical graphic form of circle is drawn, the drawn line drawing (circle) is referred to as a circle object. If a circle and a straight line are drawn, a portion of line drawing according to the circle is referred to as a circle object, and a portion of line drawing according the straight line is referred to as a straight line object.

That is, in the geometrical window data 802, a specific point coordinate of a geometrical graphic form other than a functional graph drawn on a geometrical window is stored, and the geometrical application draws a geometrical graphic form based on the specific point coordinate stored in the geometrical window data 802.

For example, if a geometrical type is a "straight line," in the geometrical window data 802, the coordinates of the specified two points are stored as a first specific point coordinate and a second specific point coordinate. If a geometry type is "polygon," an apex coordinate of the specified n apexes is stored as an n-specific point coordinate. If a geometry type is "circle," the specified center coordinate is stored as a first specific point coordinate, one point coordinate on a circumference is stored as a second specific point coordinate. If a geometry type is "elliptical," the specified center coordinate is stored as a first specific point coordinate; a coordinate indicating a short radius is stored as a second specific point, and a coordinate indicating a long radius is stored as a third specific point. For example, in the geometrical window data 802 shown in FIG. 4, a first specific point (0, 0) which is a center coordinate and a second specific point (2, 0) which is a coordinate of one point on a circumference are defined for a circle object to which an identifier ID "ID0028" is assigned.

If the geometry type of a geometrical graphic form specified to be drawn in a geometrical window is a functional graph, the CPU 10 draws a functional graph object based on the specified functional formula. At this time the CPU 10 assigns an identifier ID to the functional graph object, updates the geometrical window data 802, and updates a functional formula table 806.

Figures 5, 6:
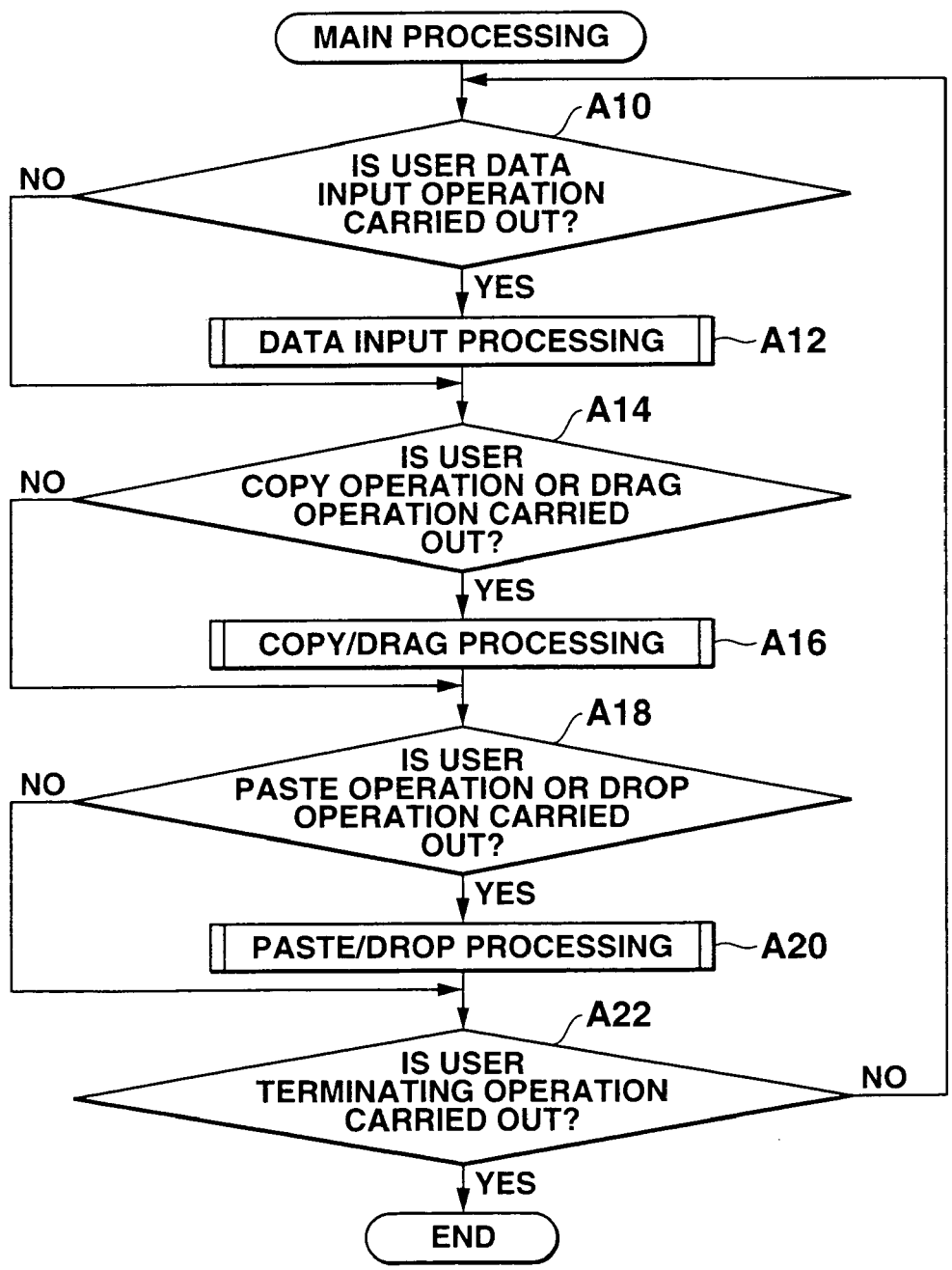
FIG. 5 is a view showing an example of a functional formula table.
FIG. 6 is a view showing a flow of operation of the functional pocket calculator upon execution of main processing in the first embodiment.

FIG. 5 shows an example of the functional formula table 806. The functional formula table 806 is a data table in which an identifier ID and a functional formula are associated with each other. When a functional graph object is drawn in a geometrical window, the CPU 10 associates the identifier ID assigned to the functional graph object with the corresponding functional formula, and stores them in the functional formula table 806. For example, as shown in FIG. 5, in the functional formula table 806, a functional formula "$y=3x^2+2$" of the functional graph object to which an identifier ID "ID0030" is assigned in the geometrical window data 802 shown and described in FIG. 4 is stored to be associated with the identifier ID "ID0030."

Now, an operation of the functional pocket calculator 1 in the first embodiment according to the present invention will be described.

FIG. 6 is a flow chart showing an operation of the functional pocket calculator 1 upon execution of main processing. If a user data input operation is sensed via an input device 20 or a tablet 30 (step A10: YES), a CPU 10 executes data input processing (step A12). If a user copy operation or drag operation is sensed (step A14: YES), the CPU 10 executes copy/drag processing (step A16). If a user paste operation or drop operation is sensed (step A18: YES), the CPU 10 executes paste/drop processing (step A20).

If a user terminating operation is sensed (step A22: YES), the CPU 10 terminates this processing. Hereinafter, data input processing, copy/drag processing, and paste/drop processing each will be described with reference to FIG. 7 to FIG. 11.

Figure 7:
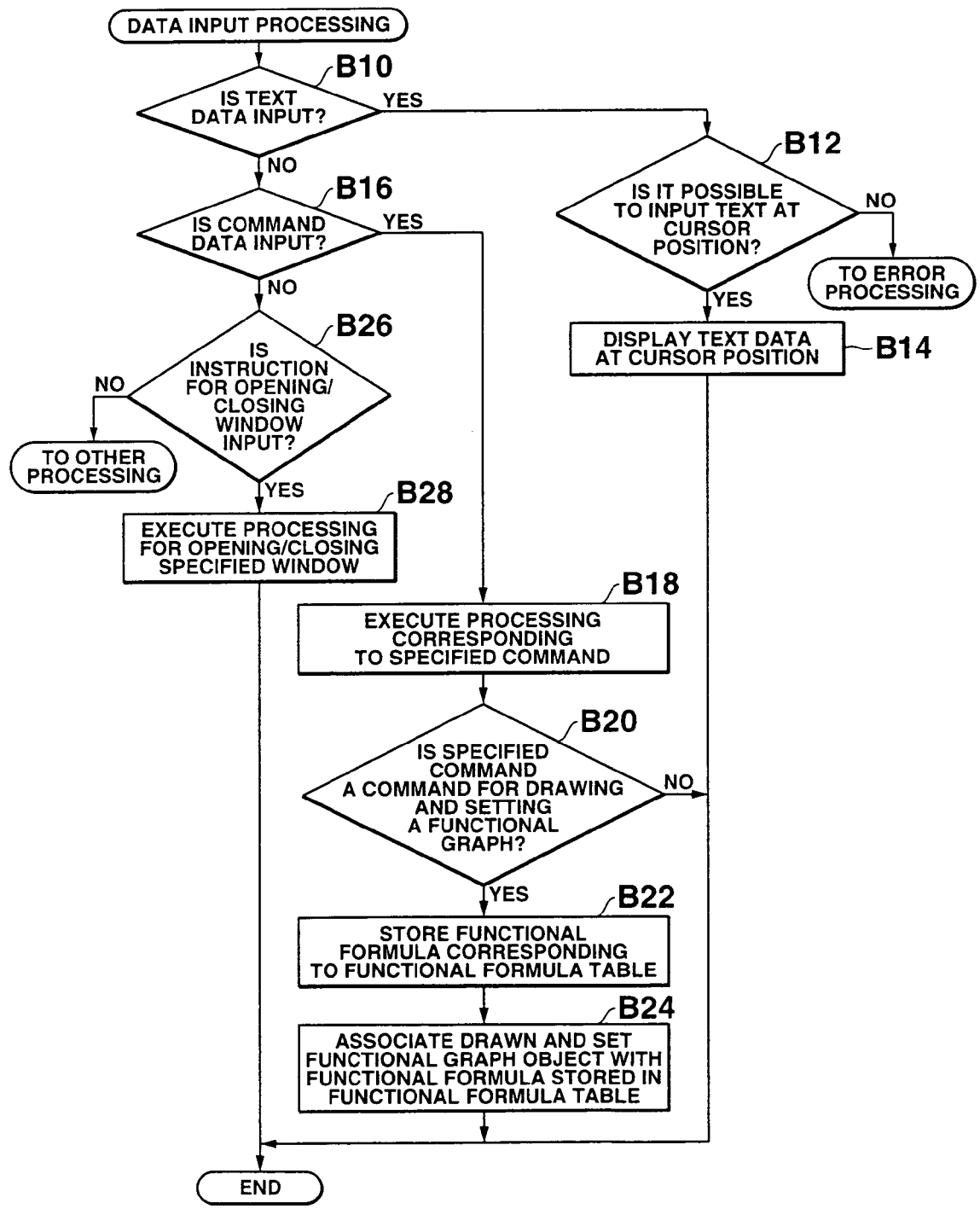
FIG. 7 is a view showing a flow of operation of the functional pocket calculator according to data input processing in the first embodiment.

First, data input processing will be described here. FIG. 7 is a flow chart showing an operation of the functional pocket calculator 1 upon execution of data input processing. If text data is input (step B10: YES), the CPU 10 determines whether or not a cursor position of a specified window to which text data is input is a text input enabling position (step B12). In the first embodiment, a case in which text data is input refers particularly to a case in which a variety of formula data such as a coordinate value, linear formula, equation of circle/ellipse, and functional formula are input to a calculation window.

If text input to a cursor position is impossible (step B12: NO), the CPU 10 executes error processing, and causes the display device 50 to display an error message to be notified. If text input to a cursor position is possible (step B12: YES), the input text data is displayed at the cursor position of the specified window (step B14).

If command data is input (step B16: YES), the CPU 10 executes processing which corresponds to the specified command with respect to the specified window to which the command data is input (step B18). In the first embodiment, a case in which command data is input refers to a case in which a command for instructing drawing of a variety of geometrical graphic forms is input to a geometrical window.

If the input command data is a command for drawing and/or setting a functional graph (step B20: YES), the CPU 10 stores the corresponding functional formula in the functional formula table 806 (step B22), and associates a functional graph object drawn and/or set in the specified window with a functional formula stored in the functional formula table 806 (step B24). Specifically, a functional formula corresponding to the drawn and/or set functional graph object is associated with an identifier ID assigned to the functional formula, the associated formula and ID are stored in the functional formula table 806, and an identifier ID corresponding to the drawn and/or set functional graph object is associated with the specified window.

If an instruction for opening/closing a window is input (step B26: YES), the CPU 10 executes processing for opening/closing the specified window (step B28). If other input operations have been made, the CPU 10 executes the corresponding other processing.

Figure 8:
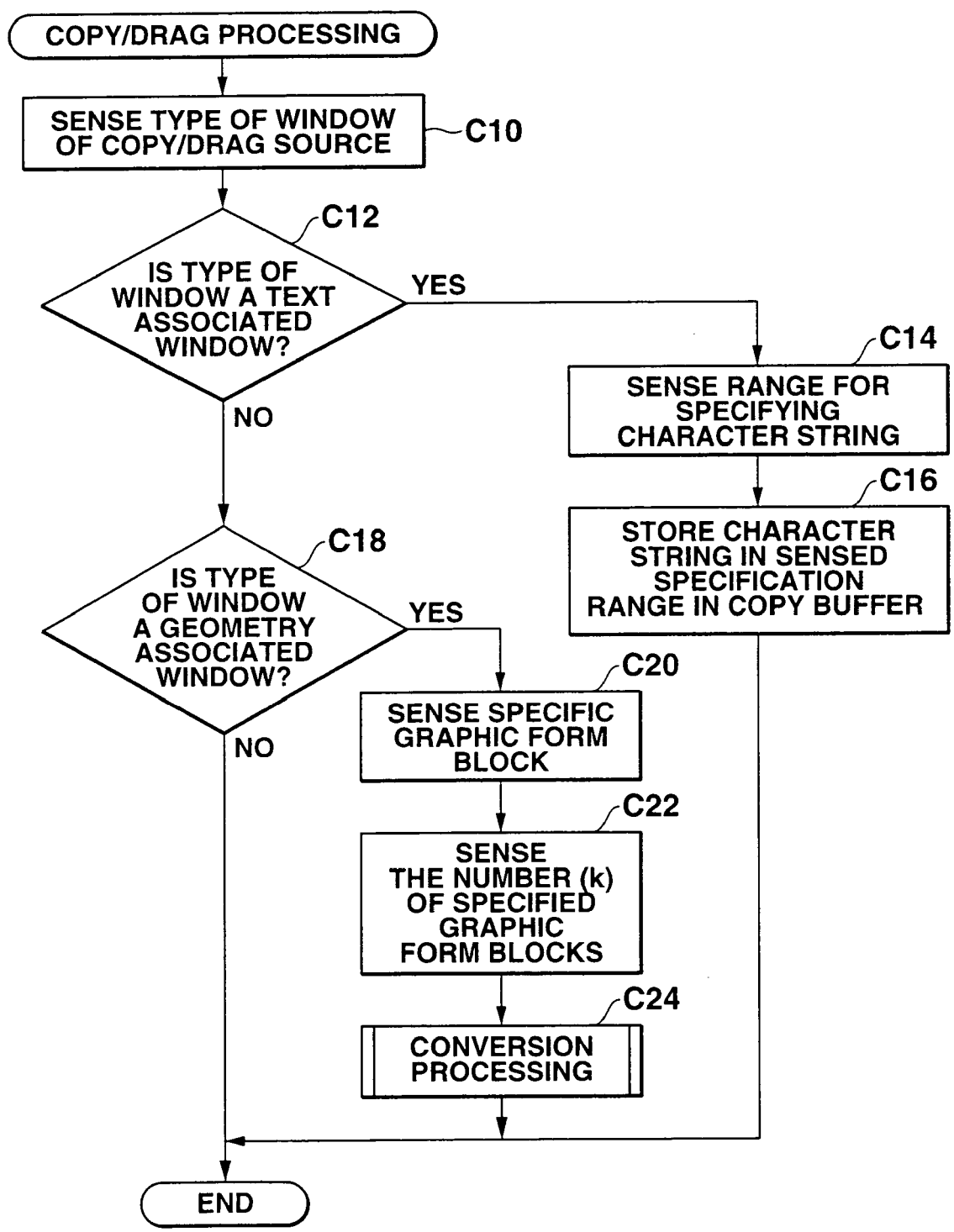
FIG. 8 is a view showing a flow of operation of the functional pocket calculator upon execution of copy/drag processing in the first embodiment.

A description of copy/drag processing will be given here. FIG. 8 is a flow chart showing an operation of the functional pocket calculator 1 upon execution of copy/drag processing. The CPU 10 senses type of window of a copy/drag source (step C10).

If type of window of the copy/drag source is a text associated window (for example, a calculation window) (step C12: YES), the CPU 10 senses a range of specifying a character string (step C14). Then, the CPU 10 stores the character string of the sensed specification range in a copy buffer 808 (step C16), and terminates this processing.

If type of window of the sensed copy/drag source is a geometry associated window (for example, a geometrical window) (step C18: YES), the CPU 10 senses the specified graphic form block (a geometrical graphic form) (step C20). The graphic form block used here is a synonym for an object. The CPU 10 senses the number (k) of the specified graphic form blocks (step C22). The CPU 10 executes conversion processing (step C24), and terminates this processing.

Figure 9:
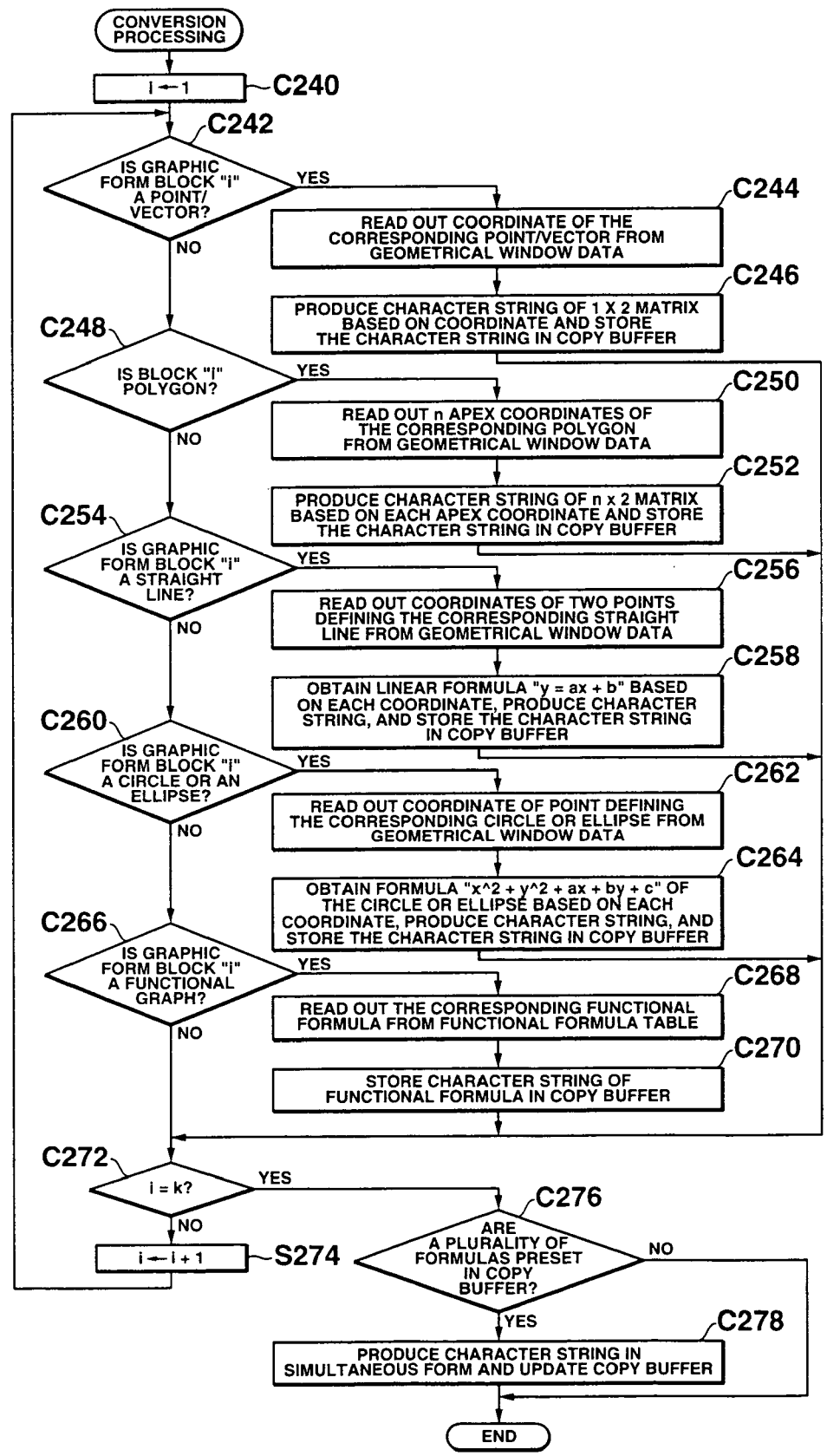
FIG. 9 is a view showing a flow of operation of the functional pocket calculator upon execution of conversion processing.

FIG. 9 is a flow chart showing an operation of the functional pocket calculator 1 upon execution of conversion processing. The CPU 10 substitutes "1" for variable "i" for determining whether or not processing is carried out for all of the sensed graphic form blocks (step C240).

If it is determined that an "i"-th graphic form block "i" is a point object or a vector object (step C242: YES), the CPU 10 reads out a coordinate of the corresponding point/vector coordinate from the window data 802 (step C244). Specifically, the CPU 10 refers to the geometrical window data 802, and reads out the corresponding coordinate based on the identifier D associated with the point object or vector object. The CPU 10 produces a character string of 1×2 matrix based on the read out coordinate, and stores the character string in a copy buffer 808 (step C246).

If the graphic form block "i" is determined to be a polygon object (step C248: YES), the CPU 10 reads out the coordinates of apexes of the corresponding polygon from the geometrical window data 802 (step C250). The CPU 10 produces a character string of n×2 matrix based on the read out apex coordinates each, and stores the character string in the copy buffer 808 (step C252).

If the graphic form block "i" is determined to be a straight line object (step C254: YES), the CPU 10 reads out a coordinate of two points which define the corresponding straight line from the geometrical window data 802 (step C256). The CPU 10 produces a character string by obtaining a formula "y=ax+b (where a and b are constants)" of the corresponding straight line based on each of the read out coordinates, and stores the produced character string in the copy buffer 808 (step C258).

If the graphic form block "i" is determined to be a circle object or an ellipse object (step C260: YES), the CPU 10 reads out a specific point coordinate which defines the corresponding circle or ellipse from the geometrical window data 802 (step S262). The CPU 10 produces a character string by obtaining a formula of the corresponding circle or ellipse ("$x^2+y^2+ax+by+c$ (where a, b, and c are constants) based on the read out specific point coordinate, and stores the produced character string in the copy buffer 808 (step C264).

If the graphical form block "i" is determined to be a functional graph object (step C266: YES), the CPU 10 reads out a functional formula from a functional formula table 806 (step C268: YES). Specifically, the CPU 10 refers to the functional formula table 806, and reads out the corresponding functional formula based on the identifier ID associated with the functional graph object. The CPU 10 produces a character string which indicates the read out functional formula, and stores the produced character string in the copy buffer 808 (step C270: YES).

After a value of a variable "i" and a value of the number "k" of graphic form blocks are compared with each other, and are determined, if the values are different from each other (step C272: NO), the variable "i" is incremented and updated (step C274). Then, processing returns to the step C242 in which the above described processing is repeated for a next graphic form block "i."

If the value of variable "i" and the value of the number "k" of the graphic form blocks are identical to each other (step C272: YES), the CPU 10 determines whether or not a plurality of formulas are stored in the copy buffer 808. If a plurality of formulas are stored (step C276: YES), the CPU 10 produces a character string in which the plurality of formulas are collected in a simultaneous form, updates the copy buffer 808 (step C278), and terminates this processing.

Figure 10:
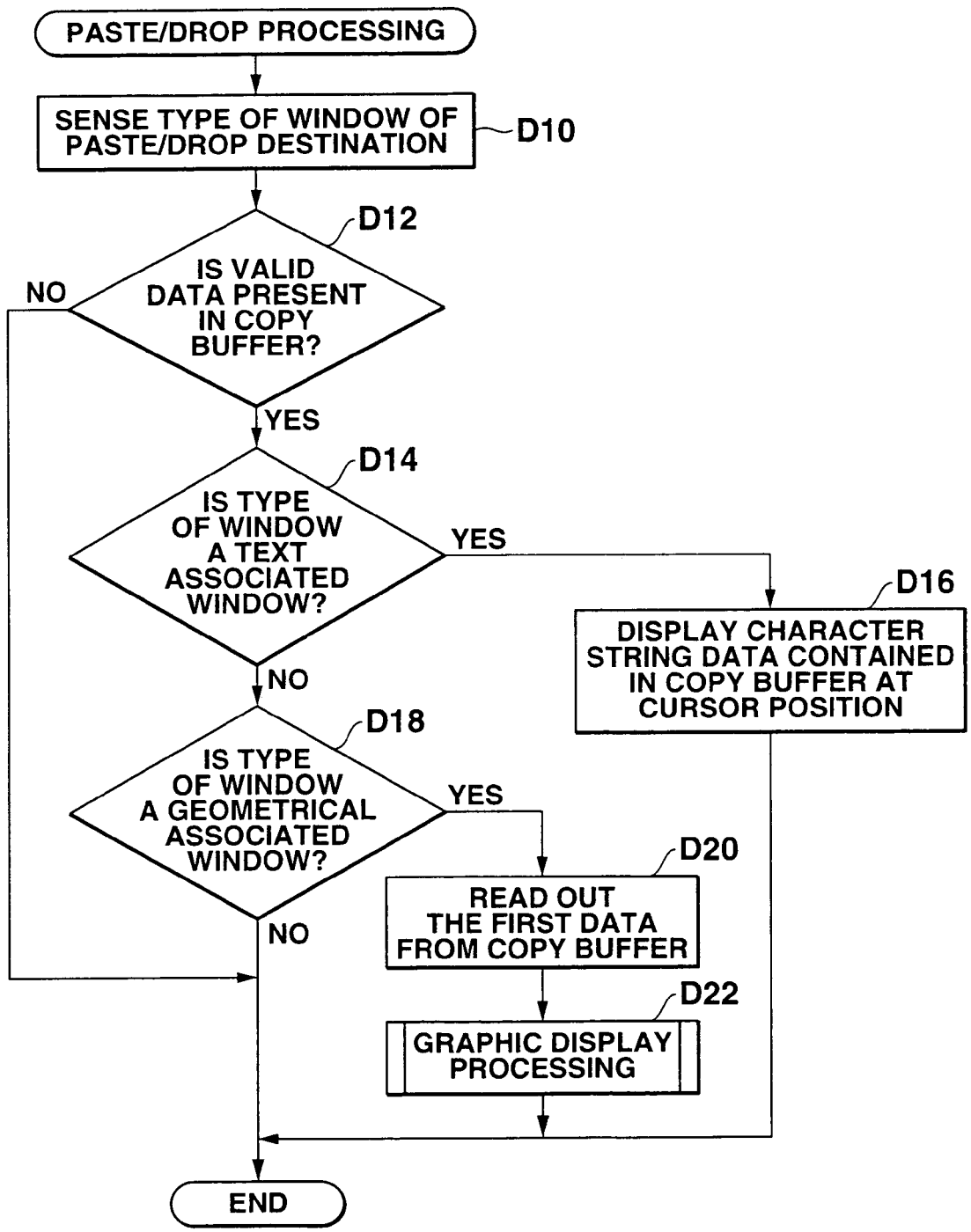
FIG. 10 is a view showing a flow of operation of the functional pocket calculator upon execution of paste/drop processing in the first embodiment.

A description of paste/drop processing will be described below. FIG. 10 is a flow chart showing an operation of a functional pocket calculator 1 upon execution of paste/drop processing. The CPU 10 senses type of window of a paste/drop destination (step D10). The CPU 10 determines whether or not valid data exists in a copy buffer 808 (step D12). If valid data is absent, the CPU 10 terminates this processing.

If valid data is present in the copy buffer 808 and if type of window of a paste/drop destination is a text associated window (for example, a calculation window) (step D14: YES), the CPU 10 causes a display device to display a character string stored in the copy buffer 808 at a cursor position (step D16), and terminates this processing.

If type of window of the sensed paste/drop destination is a geometry associated window (for example, a geometrical window) (step D18: YES), the CPU 10 reads out the first data stored in the copy buffer 808 (step D20), executes graphic display processing (step D22), and terminates this processing.

Figure 11:
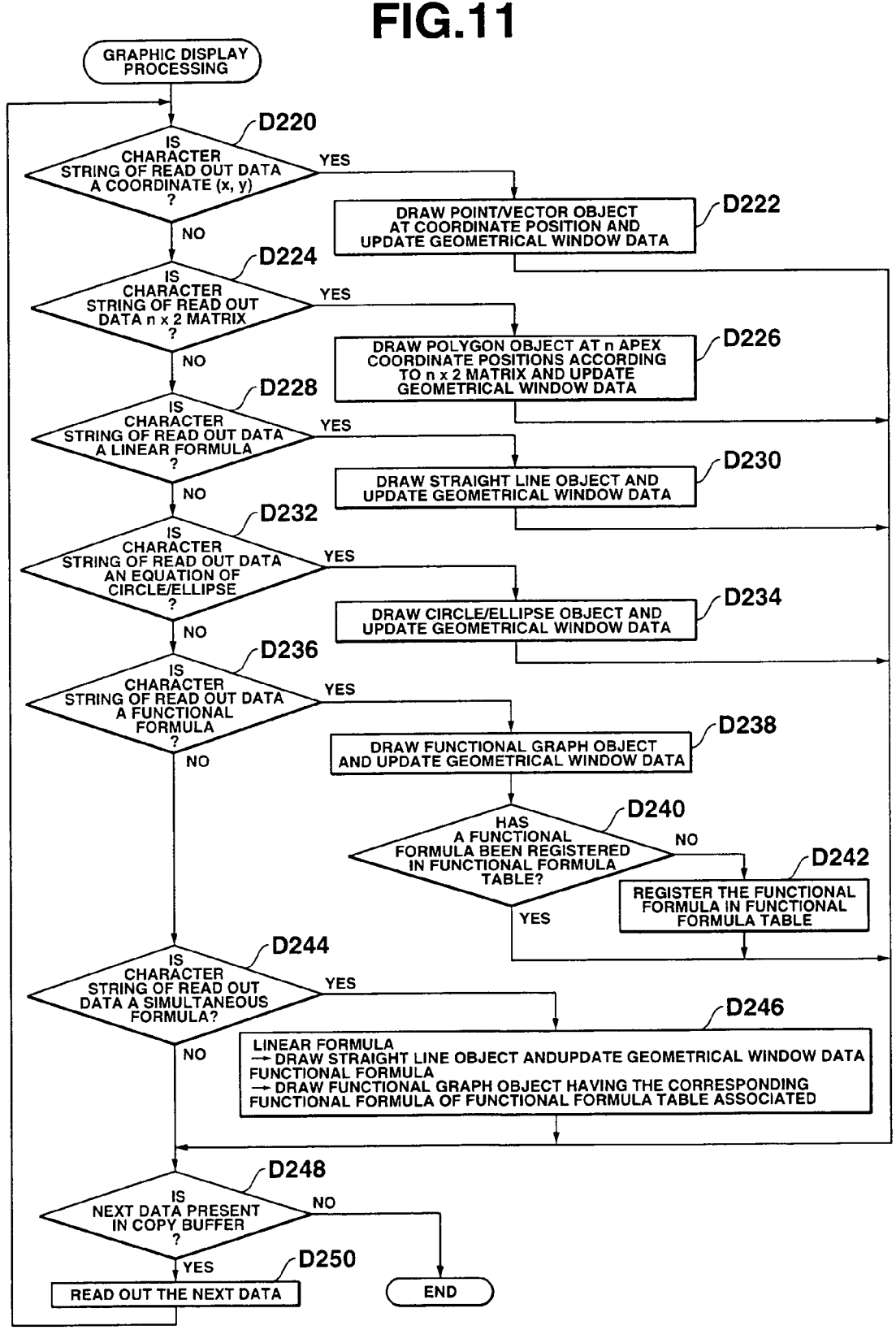
FIG. 11 is a view showing a flow of operation of the functional pocket calculator upon execution of graphical display processing.

FIG. 11 is a flow chart showing an operation of the functional pocket calculator 1 upon execution of graphic display processing. If the read out data in the copy buffer 808 is a character string of a 1×2 matrix representing a coordinate which defines a point/vector (step D220), the CPU 10 draws a point object or a vector object at the coordinate position, and updates geometrical window data 802 (step D222). Specifically, the CPU 10 stores in the geometrical window data 802 the identifier ID assigned to the point/vector, the geometry type "point" or "vector," and the coordinate of the point/vector to be associated with each other.

If the read out data in the copy buffer 808 is a character string of an n×2 matrix which defines an "n"-rectangle (step D224), the CPU 10 draws an polygon object whose coordinates configuring the n×2 matrix are defined as apexes, and updates the geometrical window data 802 (step S226). Specifically, the CPU 10 stores in the geometrical window data 802 the identifier ID assigned to the polygon, the geometry type "polygon", and apex coordinates which define the polygon to be associated with each other.

If the read out data in the copy buffer 808 is a character string which represents a straight line formula (step D228: YES), the CPU 10 draws the corresponding straight line object, and updates the geometrical window data 802 (step D230). Specifically, the CPU 10 stores in the geometrical window data 802 the identifier ID assigned to the straight line, the geometry type "straight line", and the coordinate of two points which define the straight line to be associated with each other.

If the read out data in the copy buffer 808 is a character string which represents a formula of a circle or a formula of an ellipse (step D232: YES), the CPU 10 draws the corresponding circle object or ellipse object, and stores in the geometrical window data 802 specific point coordinate which defines the circle or ellipse (step S234). Specifically, the CPU 10 stores in the geometrical window data 802 the identifier ID assigned to the circle or ellipse, the geometry type "circle" or "ellipse," and the specific point coordinate by which defines the circle or ellipse to be associated with each other.

If the read out data in the copy buffer 808 is a character string which represents a functional formula (step D236: YES), the CPU 10 draws a functional graph object based on the functional formula, and updates the geometrical window data 802 (step, S238). Specifically, the CPU 10 stores in the geometrical window data 802 the identifier ID assigned to the functional formula and the geometry type "functional graph" to be assigned to each other.

After it is determined whether or not the corresponding functional formula is registered in the functional formula table 806 (step D240), if the determination result is negative, the CPU 10 registers the functional formula in the functional formula table 806 (step D242). Specifically, the CPU 10 stores in the functional formula table 806 the functional formula and the corresponding identifier ID to be associated with each other.

If the read out data in the copy buffer 808 is a character string which represents a simultaneous form (step F244: YES) or if a formula configuring the simultaneous form is a linear formula, the CPU 10 draws the corresponding straight line object, updates the geometrical window data 802. If a formula configuring the simultaneous form is a functional formula, the CPU 10 draws a functional graph object, updates the geometrical window data 802 and functional formula table 806, and associates the functional graph object with the functional formula stored in the functional formula table 806 (step D246).

If next data is present in the copy buffer 808 (step D248), the CPU 10 reads out the next data (step D250). Then, processing returns to the step D220 in which the above described processing is repeated for the read out next data.

A copy and paste operation between a geometrical window and a calculation window using a drag and drop operation will be described with reference to FIG. 12A and FIG. 12B to FIG. 21A, FIG. 21B and FIG. 21C.

Figure 12A:
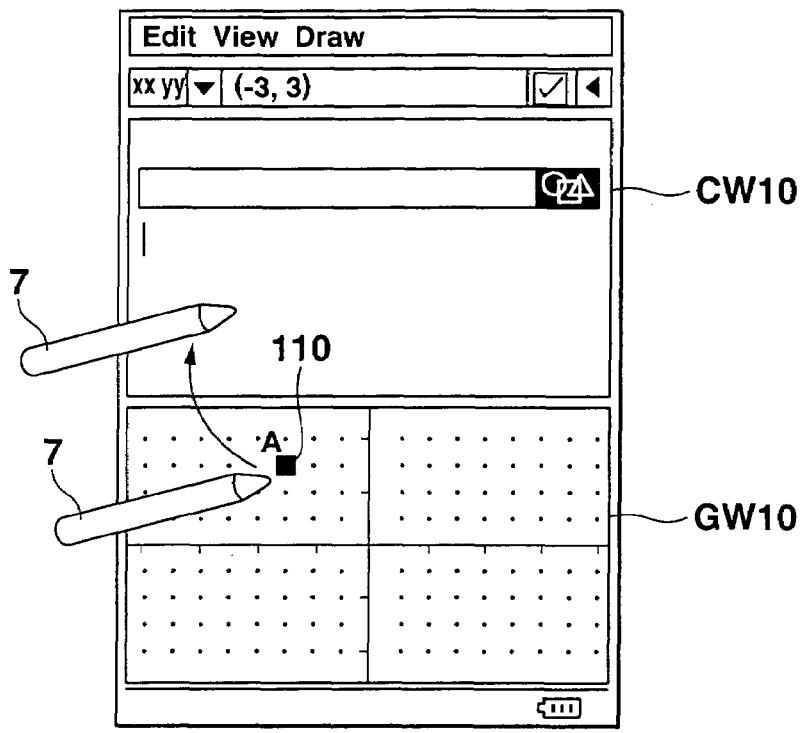
FIG. 12A and FIG. 12B are views each showing a screen change example when a point object drawn on a geometrical window is dragged and dropped on a calculation window.
Figure 12B:
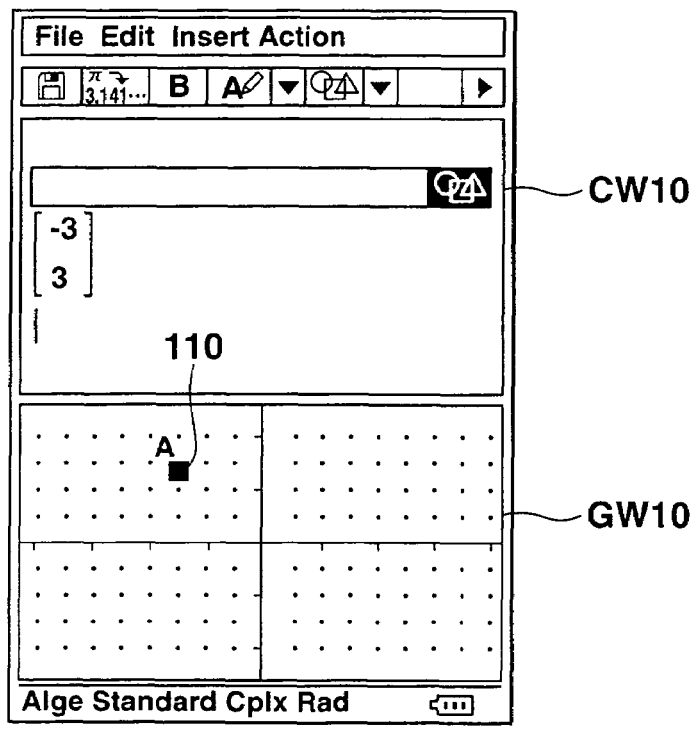

FIG. 12A and FIG. 12B are views each showing a screen change example when a point object 110 drawn in a geometrical window GW10 is dragged and dropped in a formula window CW10. In the geometrical window GW10 shown in FIG. 12A, a point drawing command is specified by using the input pen 7, a desired position is touched, and the point object 110 is drawn (step A10 of FIG. 6: YES→step A12, step B16 of FIG. 7: YES→step B18→step B20: NO). After, the point object 110 is specified for a copy target by using the input pen 7, when a drag operation is started, copy/drag processing is carried out, the specified point object 110 is converted into a point coordinate, and the converted coordinate is stored in the copy buffer 808 (step A14 of FIG. 6: YES→step A16, step C10 of FIG. 8→step C12: NO→step C18: YES→step C20→step C22→step C24, step C240 of FIG. 9→step C242: YES→step C244→step C246→step C272: YES→step C276: NO).

When the point object 110 in which the drag operation is started is operated to be dropped by specifying a position on a formula window CW10 (step A18 of FIG. 6: YES→step A20, step D10 of FIG. 10→step D12: YES→step D14: YES), as shown in FIG. 12B, a 1×2 matrix representing a coordinate (−3, 3) of point A is displayed to be pasted on a cursor position of the formula window CW10 (step D16 of FIG. 10).

Figure 13A:
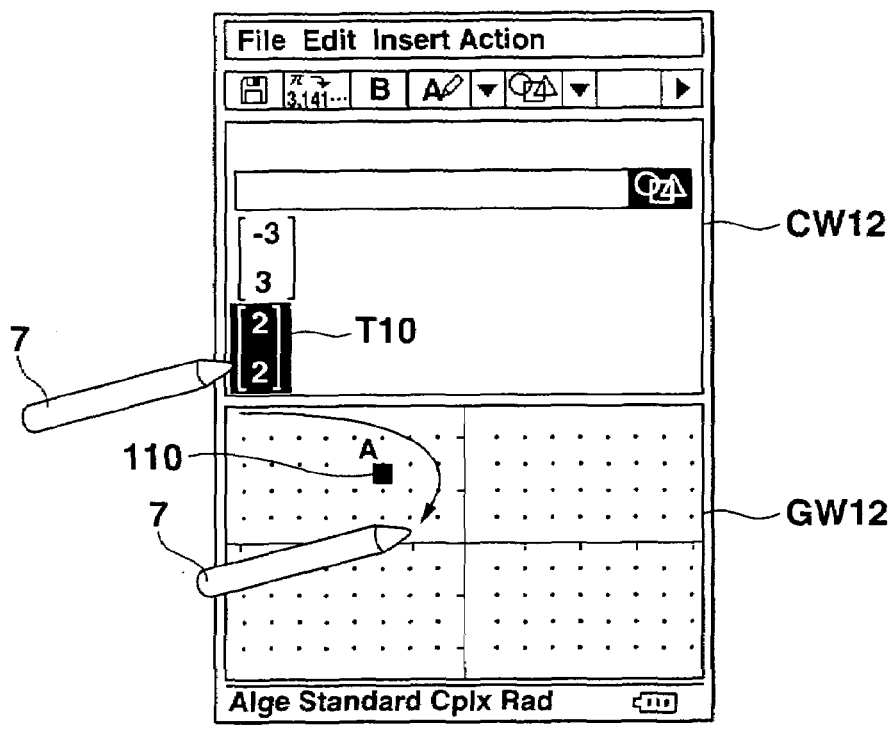
FIG. 13A and FIG. 13B are views each showing a screen change example when a point coordinate displayed on a calculation window is dragged and dropped on a geometrical window.
Figure 13B:
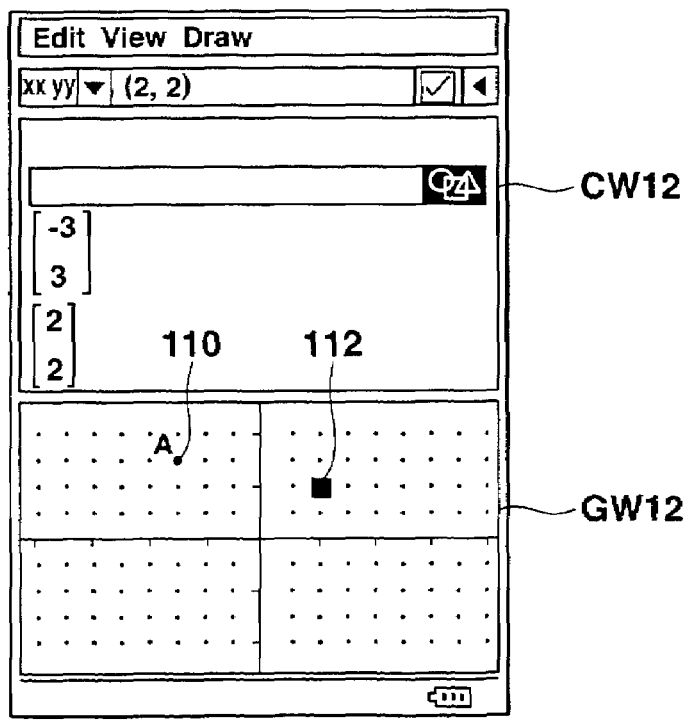

FIG. 13A and FIG. 13B are views each showing a screen change example when a point coordinate displayed on a formula window CW12 is dragged and dropped on a geometrical window GW12. In the formula window CW12 shown in FIG. 13A, a point coordinate (2, 2) is input by using the input pen 7 (step A10 of FIG. 6: YES→step A12, step B10 of FIG. 7: YES→step B12: YES→step B14). After a character string region T10 is displayed in a reverse video by means of an operation for specifying a range using the input pen 7, and is specified for a copy target, when a drag operation is started, copy/drag processing is carried out, and the specified point coordinate is stored in the copy buffer 808 (step A14 of FIG. 6: YES→step A16, step C10 of FIG. 8→step C12: YES→step C14→step C16).

When the character string area T10 in which the drag operation is started is operated to be dropped on the geometrical window GW12 (step A18 of FIG. 6: YES→step A20, step D10 of FIG. 10→step D12: YES→step D14: YES→step D18: YES→step D20→step D22, step D220 of FIG. 11: YES), as shown in FIG. 13A and FIG. 13B, a point object 112 based on the specified point coordinate is drawn on the geometrical window GW12 (step D222 of FIG. 11→step D248: NO).

Figure 14A:
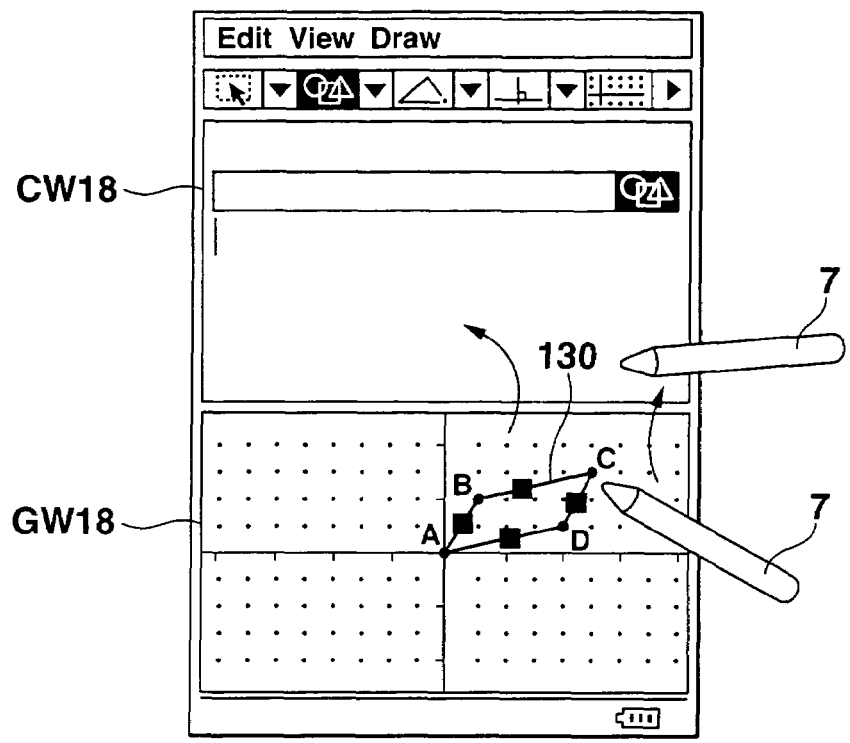
FIG. 14A and FIG. 14B are views each showing a rectangular object drawn on a geometrical window is dragged and dropped on a calculation window.
Figure 14B:
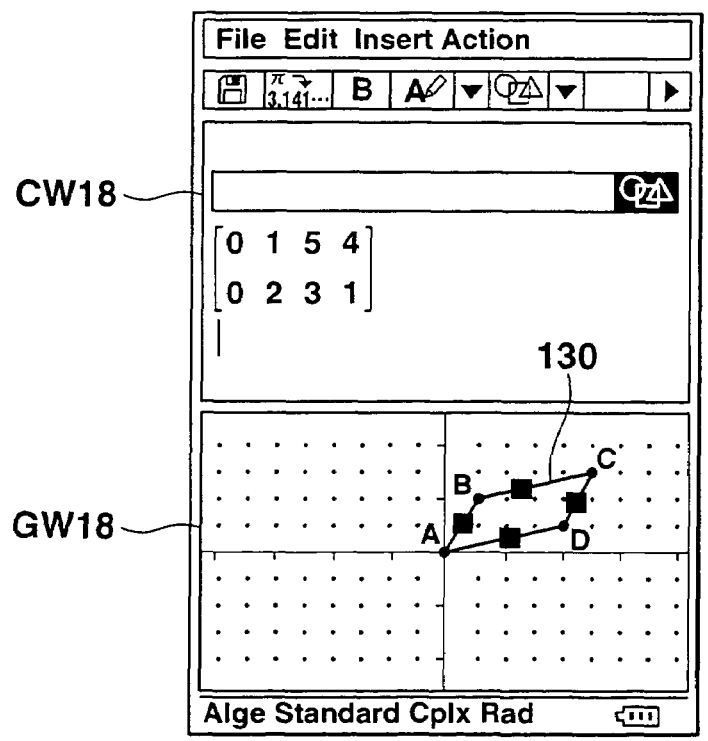

FIG. 14A and FIG. 14B are views each showing a screen change example when a square object 130 drawn on the geometrical window GW18 is dragged and dropped on the formula window CW18. In the geometrical window GW18 shown in FIG. 14A, the square object 130 is specified by using the input pen 7, a desired position is touched, and the square object 130 is drawn (step A10 of FIG. 6: YES→step A12, step B16 of FIG. 7: YES→step B18→step B20: NO). After the square object 130 is specified for a copy target by using the input pen 7, when a drag operation is started, copy/drag processing is carried out. Then, the specified square object 130 is converted into a 4×2 matrix based on the coordinates of apexes A to B of the square object 130, and the converted matrix is stored in the copy buffer 808 (step A14 of FIG. 6: YES→step A16, step C10→step C12: NO→step C18: YES→step C20→step C22→step C24, step C240 of FIG. 9→step C242: NO→step C248: YES→step C250→step C252→step C272: YES→step C276: NO). The square object 130 displayed on the geometrical window GW18 can be specified for a copy target by specifying each four side, for example, by the input pen 7.

After the square object 130 in which the drag operation is started is operated to be dropped by specifying a position on the formula window CW18 (step A18 of FIG. 6: YES→step A20, step D10→D12 of FIG. 10: YES→step D14: YES), as shown in FIG. 14B, a 4×2 matrix representing the coordinates of apexes A to B of the square object 130 is displayed to be pasted on a cursor position of the formula window CW18 (step D16 of FIG. 10).

Figure 15A:
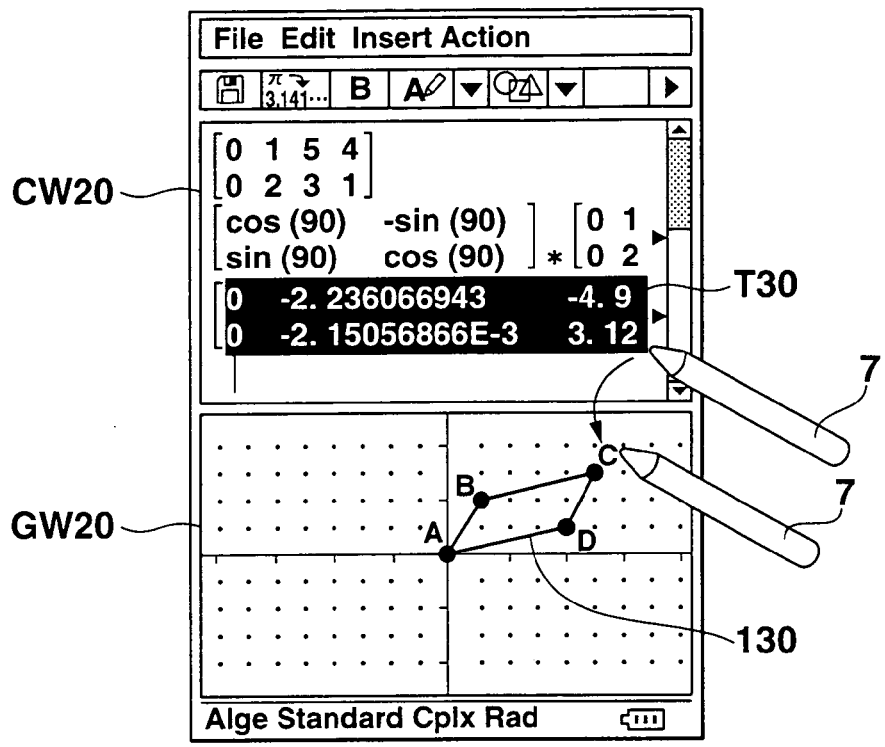
FIG. 15A and FIG. 15B are views each showing a screen change example when a 4×2 matrix displayed on a calculation window is dragged and dropped on a geometrical window.
Figure 15B:
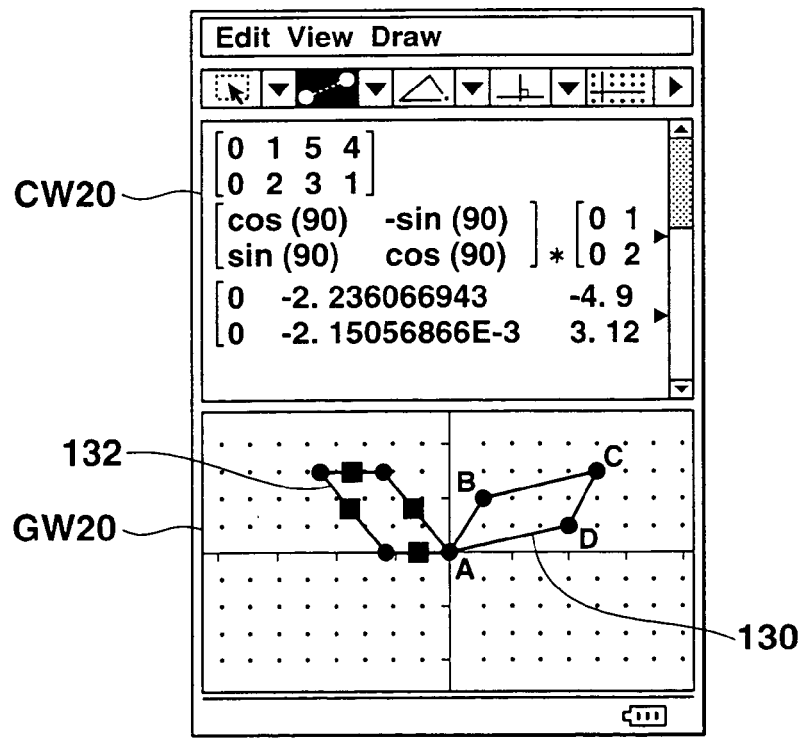

FIG. 15A and FIG. 15B are views each showing a screen change example when a 4×2 matrix displayed on a calculation window CW20 is dragged and dropped on a geometrical window GW20. In the calculation window CW20 shown in FIG. 15A, a 4×2 matrix based on the coordinates of apexes of the square is input by using the input pen 7 (step A10 of FIG. 6: YES→step A12, step B10 of FIG. 7: YES→step B12: YES→step B14). After, a character string region T30 of the text input 4×2 matrix is displayed in inverted manner by means of an operation for specifying a range using the input pen 7, and is specified for a copy target, when a drag operation is started, copy/drag processing is carried out, and the specified 4×2 matrix is stored in the copy buffer 808 (step A14 of FIG. 6: YES→step A16, step C10→step C12 of FIG. 8: YES→step C14→step C18).

When the character string region T30 in which the drag operation is started is operated to be dropped on the geometrical window GW20 (step A18 of FIG. 6: YES→step A20, step D10→D12 of FIG. 10: YES→step D18: YES→step D20→step D22, step D224 of FIG. 11: YES), as shown in FIG. 15B, a square object 132 based on the specified 4×2 matrix is drawn on the geometrical window GW20 (step D226→C248: NO of FIG. 11).

FIG. 16A to FIG. 16D are views each showing a screen change example according to a drag and drop operation between a geometrical window GW22 and a calculation window CW22. In the geometrical window GW 22 shown in FIG. 16A, a line segment drawing command is specified by using the input pen 7, a desired position is touched, and a line segment object 140 is drawn (step A10 of FIG. 6: YES→step A12, step B16 of FIG. 7: YES→step B18→step B20: NO). After the line segment object 140 is specified for a copy target by using the input pen 7, when a drag operation is started, copy/drag processing is carried out. Then, the specified line segment object 140 is converted into a linear formula, and is stored in the copy buffer 808 (step A14 of FIG. 6: YES→step A16, step C10→C12 of FIG. 8: NO→step C18: YES→step C20→step C22→step C24, step C240 of FIG. 9: NO→step C242: NO→step C248: NO→step C254: YES→step C256→step C258→step C272: YES→step C276: NO). The line segment object 140 displayed on the geometrical window GW22 can be specified for a copy target by specifying proper two points on the line segment object 140, for example, by the input pen 7.

Figure 16A:
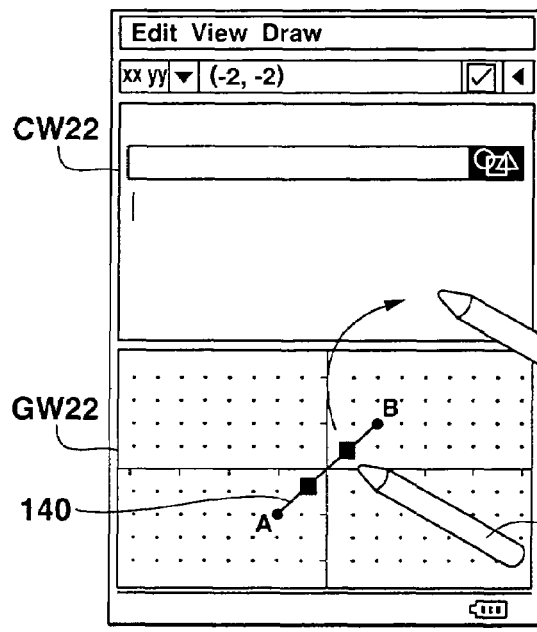
FIG. 16A, FIG. 16B, FIG. 16C and FIG. 16D are views each showing a screen change example according a drag and drop operation between a geometrical window and a calculation window.
Figure 16B:
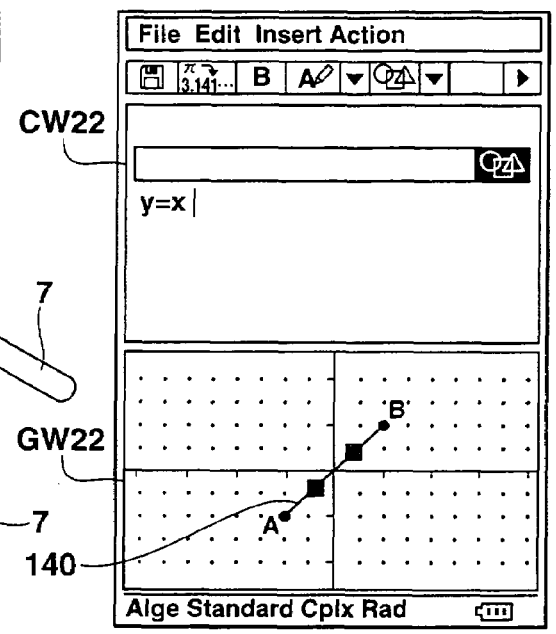

After the line segment object 140 in which the drag operation is started is operated to be dropped by specifying a position on the calculation window CW22 (step A18 of FIG. 6: YES→step A20, step D10→D12 of FIG. 10: YES→step D14: YES), as shown in FIG. 16B, a linear formula "y=x" is displayed to be pasted on a cursor position of the calculation window CW22 (step D16 of FIG. 10).

Figure 16C:
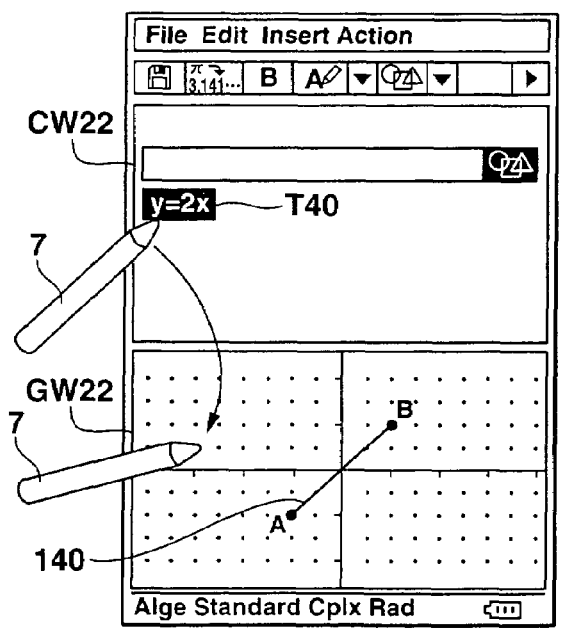

As shown in FIG. 16C, in the calculation window CW22, for example, after a linear formula is changed by using the input pen 7 (step A10 of FIG. 6: YES→step A12, step B10 of FIG. 7: YES→step B12: YES→step B14), when a character string region T40 of the changed linear formula "y=2x" is displayed in inverted manner by specifying the region by an operation for specifying a range using the input pen 7, and is specified for a copy target, and a drag operation is started, copy/drag processing is carried out, and the specified linear formula is stored in the copy buffer 808 (step A14 of FIG. 6: YES→step A16, step C10→C12 of FIG. 8: YES→step C14→step C16).

Figure 16D:
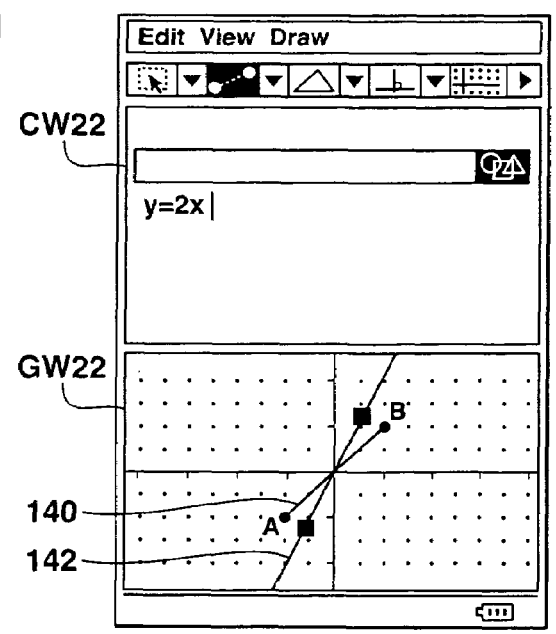

When the character string region T40 in which the drag operation is started is operated to be dropped on the geometrical window GW22 (step A18 of FIG. 6: YES→step A20, step D10→D12 of FIG. 10: YES→step D18: YES→step D20→step D22, step D228 of FIG. 11: YES), as shown in FIG. 16D, a straight line object 142 based on the specified linear formula is drawn on the geometrical window GW22 (step D230→D248 of FIG. 11: NO).

Figure 17A:
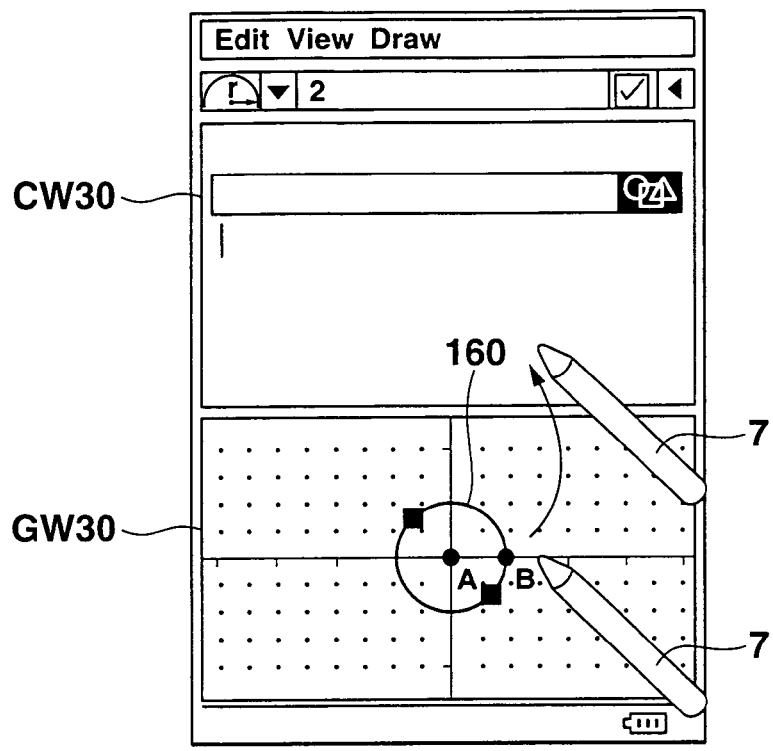
FIG. 17A and FIG. 17B are views each showing a screen change example when a circular object drawn on a geometrical window is dragged and dropped on a calculation window.
Figure 17B:
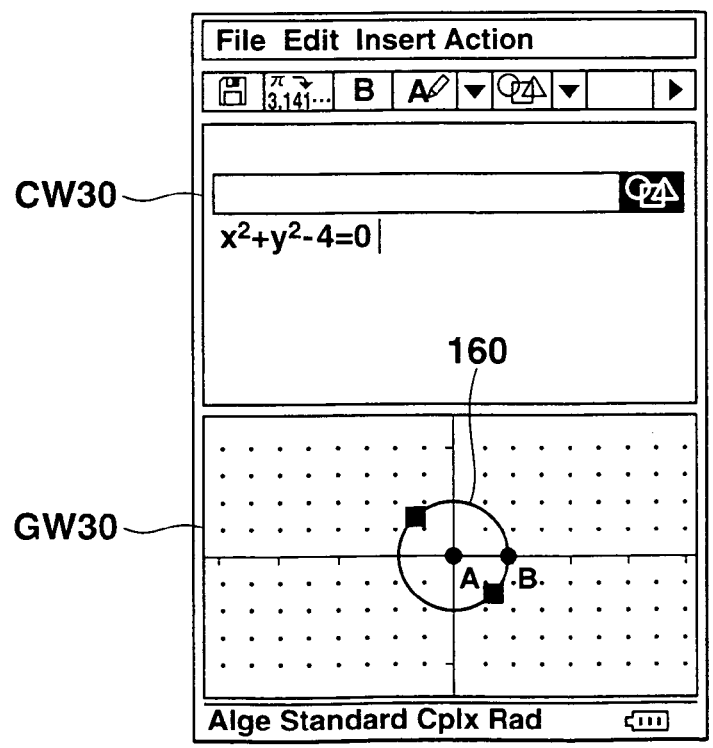

FIG. 17A and FIG. 17B are views each showing a screen change example when a circle object 160 drawn on a geometrical window GW3 is dragged and dropped on a calculation window CW30. In the geometrical window GW30 shown in FIG. 17A, a circle drawing command is specified by using the input pen 7, a desired position is touched, and a circle object 160 is drawn (step A10 of FIG. 6: YES→step A12, step B16 of FIG. 7: YES→step B18→step B20: NO). After the circle object 160 is specified for a copy target by using the input pen 7, when a drag operation is started, copy/drag processing is carried out. Then, the specified circle object 160 is converted into a character string representing an equation of the corresponding circle, and is stored in the copy buffer 808 (step A14 of FIG. 6: YES→step A16, steps C10→C12 of FIG. 8: NO→steps C18: YES→steps C20→C22→C24, steps C240→C260 of FIG. 9: YES→steps C262→C264→C272: YES→C276: NO).

After the circle object 160 in which the drag operation is started is operated to be dropped by specifying a position on the calculation window CW30 (steps A18 of FIG. 6: YES→A20, steps D10→D12 of FIG. 10: YES→D14: YES), as shown in FIG. 17B, an equation of the circle "$x^2+y^2-4=0$" is displayed to be pasted on a cursor position of the calculation window CW30 (step D16 of FIG. 10).

Figure 18A:
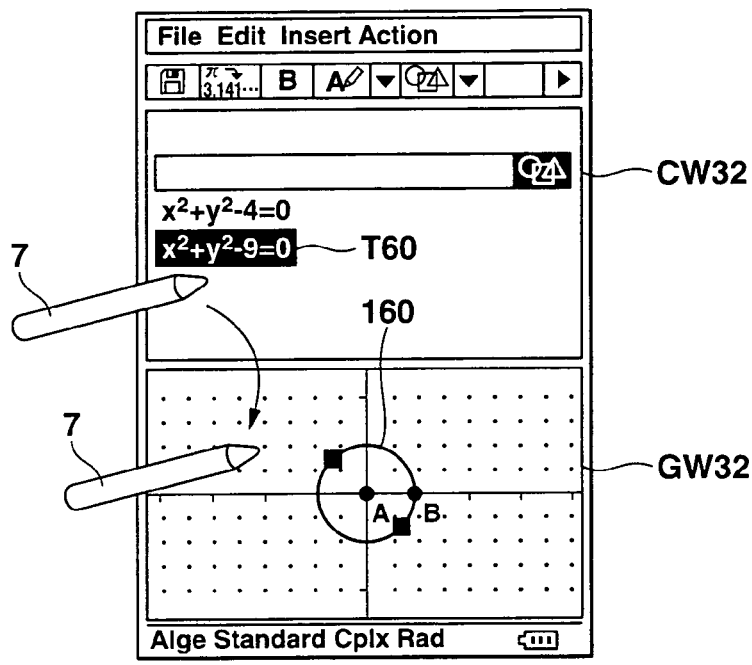
FIG. 18A, FIG. 18B and FIG. 18C are views each showing a screen change example when an equation of a circle displayed on a calculation window is dragged and dropped on a geometrical window.
Figure 18B:
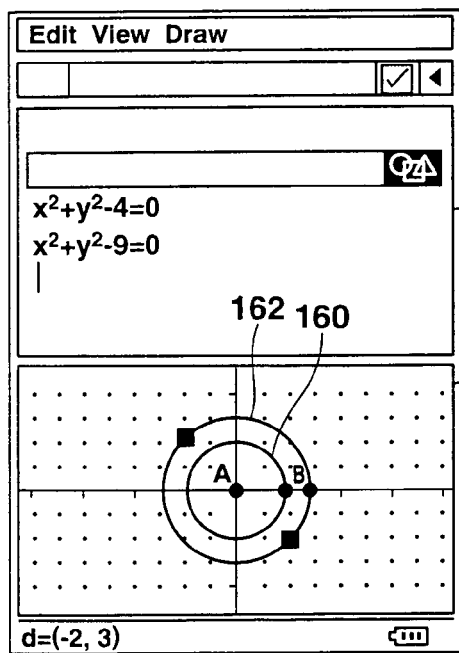
Figure 18C:
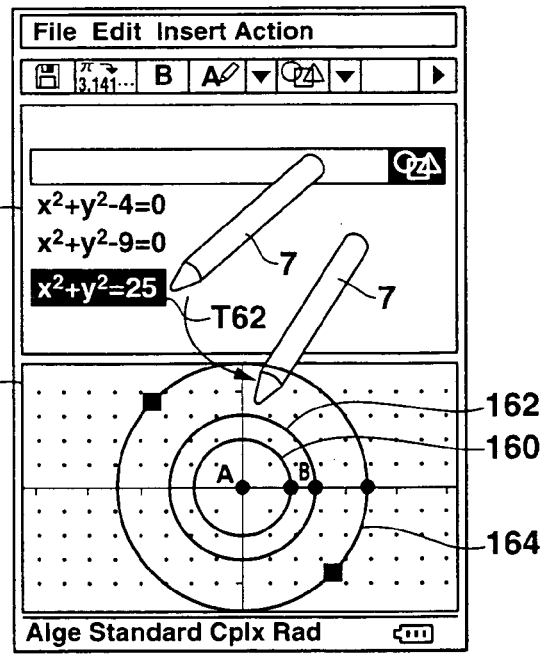

FIG. 18A to FIG. 18C are views each showing a screen change example when an equation of a circle displayed on a calculation window CW32 is dragged and dropped on a geometrical window GW32. In the calculation window CW32 shown in FIG. 18A, an equation of a circle is input by using the input pen 7 (steps A10 of FIG. 6: YES→A12, steps B10 of FIG. 7: YES→B12: YES→B14). After a character string region T60 of an equation "$x^2+y^2-9=0$" of the circle is displayed in inverted manner by an operation for specifying a range using the input pen 7, and is specified for a copy target, when a drag operation is started, copy/drag operation is carried out, and the equation of the specified circle is stored in the copy buffer 808 (steps A14 of FIG. 6: YES→A16, steps C10→C12 of FIG. 8: YES→C14→C16).

When the character string region T60 in which the drag operation is started is operated to be dropped on the geometrical window GW32 (steps A18 of FIG. 6: YES→A20, steps D10→D12 of FIG. 10: YES→D18: YES→D20→D22, step D232 of FIG. 11: YES), as shown in FIG. 18B, the circle object 160 based on the equation of the specified circle is drawn on the geometrical window GW32 (steps D234→D248 of FIG. 11: NO).

As shown in FIG. 18C, in the calculation window CW32, after an equation of a circle is added by using the input pen 7, and a character string region T62 of an equation "$x^2+y^2=25$" of the added circle is displayed in inverted manner by specifying the region by an operation for specifying a range using the input pen 7, and is specified for a copy target, when a drag operation is started, copy/drag processing is carried out, and the equation of the specified circle is stored in the copy buffer 808.

Figure 19A:
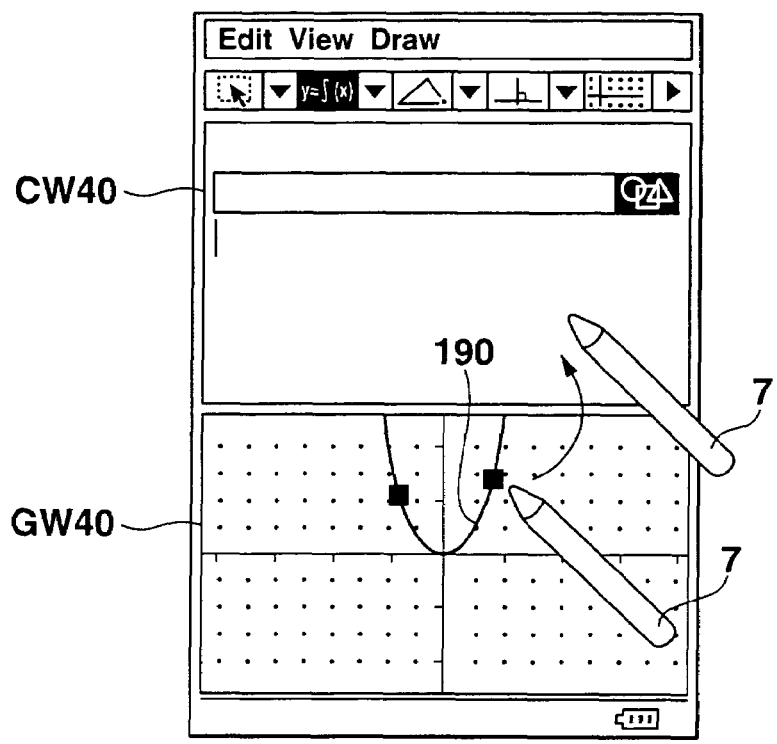
FIG. 19A and FIG. 19B are views each showing a screen change example when a functional graph object drawn on a geometrical window is dragged and dropped on a calculation window.
Figure 19B:
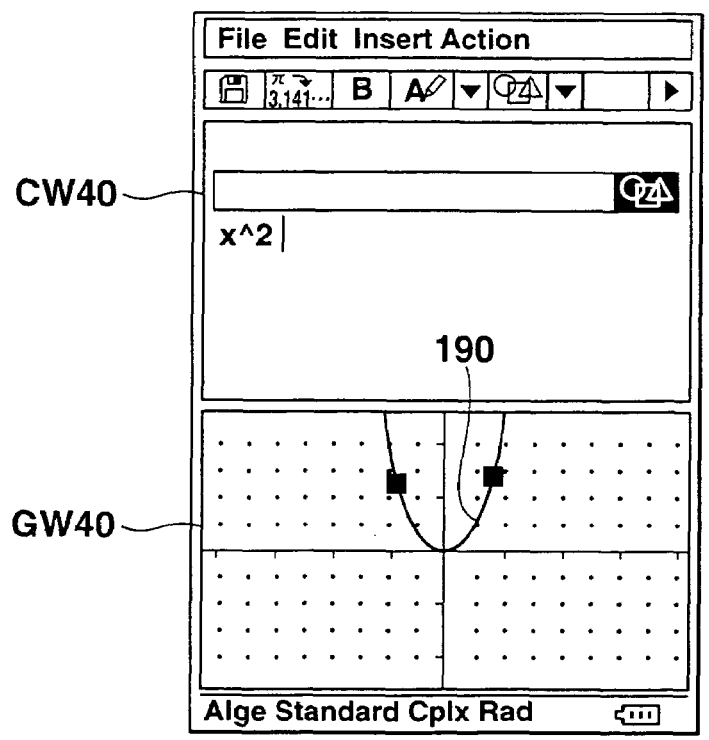

FIG. 19A and FIG. 19B are views each showing a screen change example when a functional graph object 190 drawn on a geometrical window GW40 is dragged and dropped on a calculation window CW40. In the geometrical window GW40 shown in FIG. 19A, a functional graph drawing command is specified by using the input pen 7, a desired position is touched, and the functional graph object 190 is drawn (steps A10→A12 of FIG. 6, steps B16 of FIG. 7: YES→B18→B20: NO) After the functional graph object 190 is specified for a copy target by using the input pen 7, when a drag operation is started, copy/drag processing is carried out, the specified functional graph object 190 is converted into the corresponding functional formula, and the converted functional formula is stored in the copy buffer 808 (steps A14→A16 of FIG. 6, steps C10→C12 of FIG. 8: NO→C18: YES→C20→C22→C24, steps C240→C266 of FIG. 9: YES→C268→C270→C272: YES→C276: NO).

After the functional graph object 190 in which the drag operation is started is operated to be dropped by specifying a position on the calculation window CW40 (steps A18 of FIG. 6: YES→A20, steps D10→D12 of FIG. 10; YES→S14: YES), as shown in FIG. 19B, a functional formula "$x^2$", is displayed to be-pasted on a cursor position of the calculation window 40 (step D16 of FIG. 10).

Figure 20A:
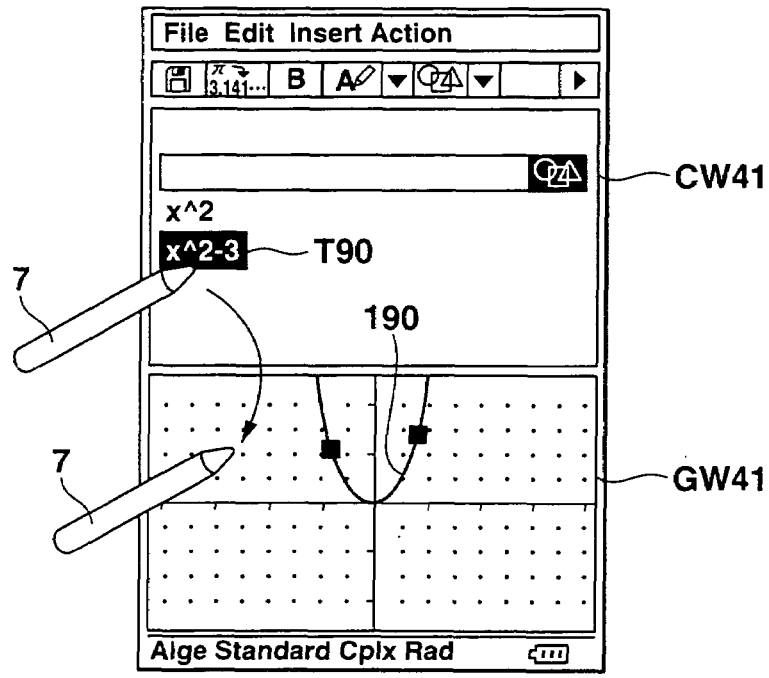
FIG. 20A, FIG. 20B and FIG. 20C are views each showing a screen change example when a functional formula displayed on a calculation window is dragged and dropped on a geometrical window.
Figure 20B:
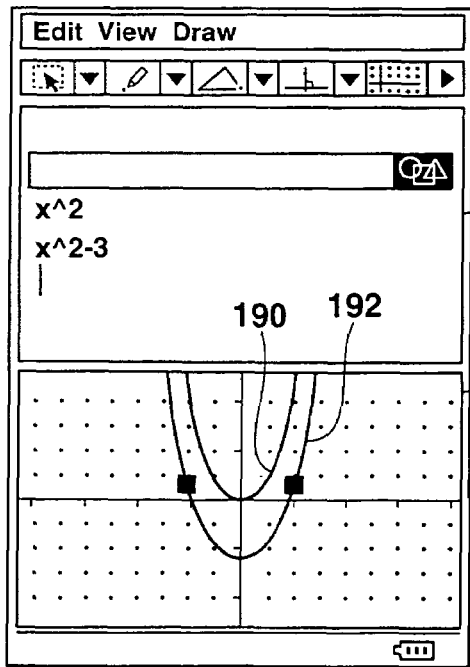
Figure 20C:
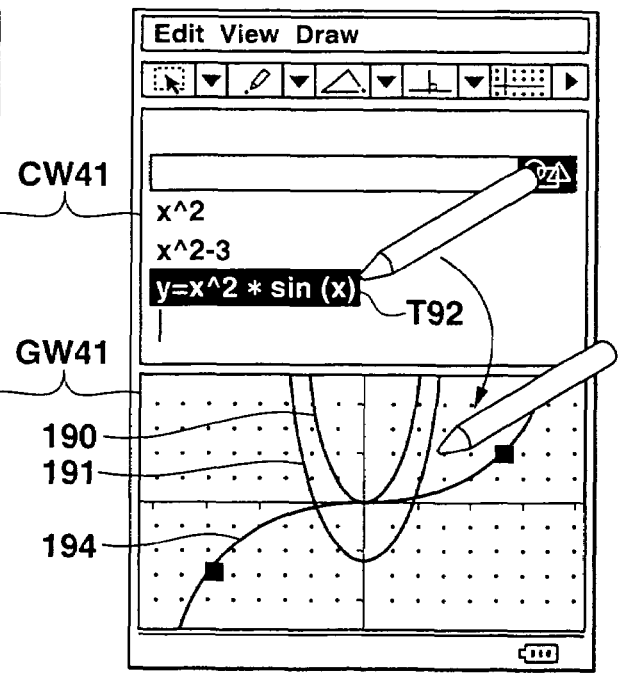

FIGS. 20A to FIG. 20C are views each showing a screen change example when a functional formula displayed on a calculation window CW41 is dragged and dropped on a geometrical window GW41. In the calculation window CW41 shown in FIG. 20A, a functional formula is input by using the input pen 7 (steps A10 of FIG. 6: YES→A12, steps B10 of FIG. 7: YES→B12: YES→B14). After a character string region T90 of the text input functional formula "$x^2-3$" by an operation for specifying a range using the input pen 7 is displayed in inverted manner, and is specified for a copy target, when a drag operation is started, copy/drag processing is carried out, and the specified functional formula is stored in the copy buffer (steps A14 of FIG. 6: YES→A16, steps C10→C12 of FIG. 8; YES→C14→C16).

When the character string region T90 in which the drag operation is started is operated to be dropped on the geometrical window GW41 (steps A18 of FIG. 6: YES→A20, steps D10→D12 of FIG. 10: YES→D18: YES→D20→D22, step D236 of FIG. 11: YES), as shown in FIG. 20B, a functional graph object 192 based on the specified functional formula is drawn on the geometrical window GW41 (steps D238→D240 of FIG. 11: NO→D242→D248: NO).

As shown in FIG. 20C, in the calculation window CW41, after a function formula is added by using the input pen 7, a character string region T92 of the added functional formula "$x^2 \times \sin(x)$" is displayed in inverted manner by specifying the region by an operation for specifying a range using the input pen 7, and is specified for a copy target, when a drag operation is started, copy/drag processing is carried out, and the specified functional formula is stored in the copy buffer 808.

When the character string region T92 in which the drag operation is started is operated to be dropped on the geometrical window GW41, a functional graph object 194 based on the specified functional formula is drawn on the geometrical window GW41.

Figure 21A:
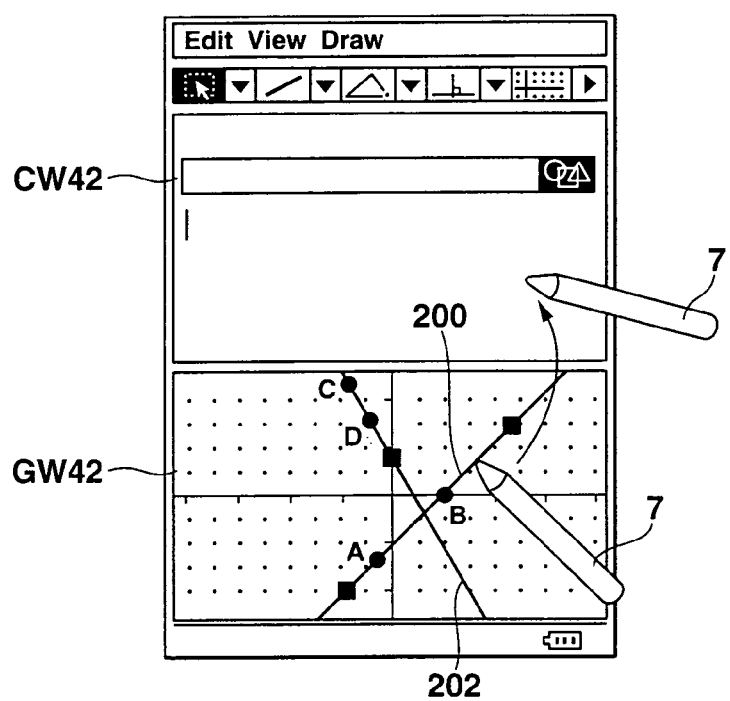
FIG. 21A, FIG. 21B and FIG. 21C are views each showing a screen change example when a plurality of straight line objects drawn on a geometrical window are dragged and dropped on a calculation window.
Figure 21B:
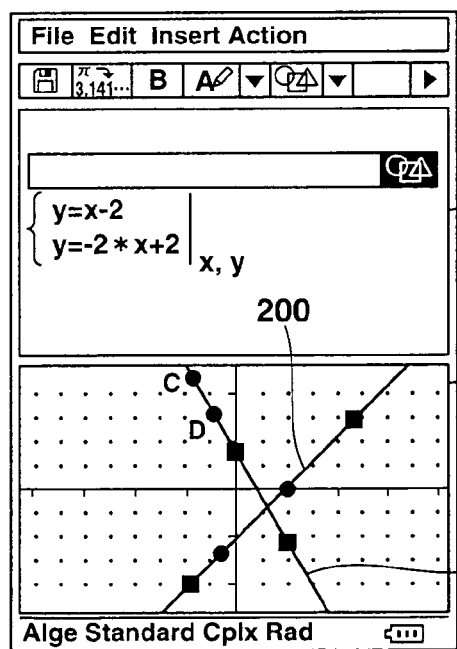
Figure 21C:
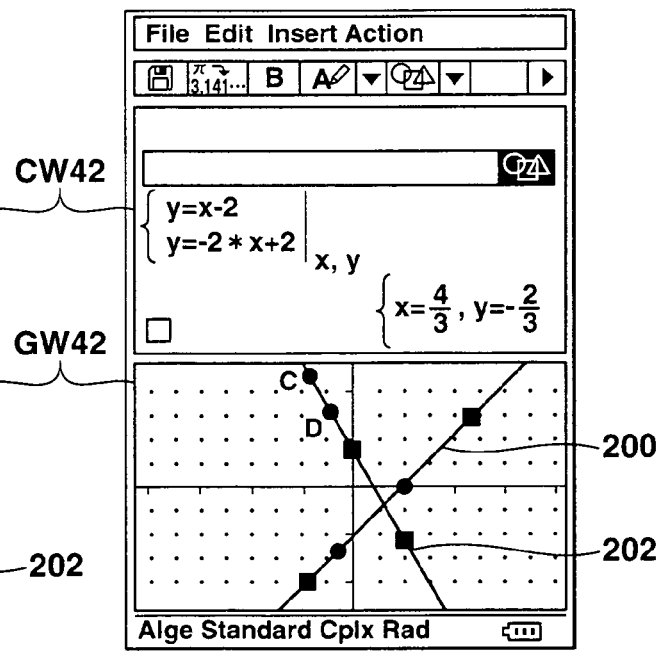

FIGS. 21A to FIG. 21C are views each showing a screen change example when straight line objects 200 and 202 drawn on a geometrical window GW42 are dragged and dropped on a calculation window CW42. In the geometrical window GW42 shown in FIG. 21A, a straight line drawing command is specified by using the input pen 7, a predetermined position is touched, and the two straight line objects 200 and 202 are drawn (steps A10 of FIG. 6: YES→A12, steps B16 of FIG. 7: YES→B18→B20: NO). After the two straight line objects 200 and 202 are specified for copy targets by using the input pen 7, when a drag operation is started, copy/drag processing is carried out, the specified straight line objects 200 and 202 are converted into the corresponding linear formulas, respectively, and the converted formulas are stored in the copy buffer 808 (steps A14 of FIG. 6: YES→A16: steps C10→C12 of FIG. 8: NO→C18: YES→C20→C22→C24, steps C240→C254 of FIG. 9: YES→C256→C258→C272: NO→C276: YES→C278). The two straight line objects 200 and 202 displayed on the geometrical window GW42 can be specified for a copy target by specifying two proper points on the straight line objects 200 and 202, respectively, for example.

When the straight line objects 200 and 202 in which the drag operation is started are operated to be dropped by specifying positions on the calculation window CW42 (steps A18 of FIG. 6: YES→A20, steps D10→D12 of FIG. 10: YES→D14: YES), as shown in FIG. 21B, straight line formulas "$y=x-2$" and "$y=-2x+2$" of the straight line objects 200 and 202 are each pasted on the cursor position of the calculation window CW42, and are displayed in a simultaneous form (step D16 of FIG. 10).

When an instruction for executing a simultaneous equation is input in the calculation window CW42 shown in FIG. 21B, processing for instructing calculation of a solution of the simultaneous equation is executed, and the calculation window CW42 is displayed and updated, as shown in FIG. 21C.

As is described above, according to the first embodiment, after the screen display content of either of the geometrical window and calculation window which are different from each other in display mode is selected, and a copy operation is made, when the other screen is specified and a paste operation is made, the display content of the selected one screen can be displayed according to the display mode of the other screen.

For example, a geometrical graphic form object displayed on a geometrical window is selected, and the selected object is moved on a calculation window by a drag and drop operation, whereby calculation data (formula) corresponding to the selected geometrical graphic form object on the geometrical window can be displayed at a cursor position of the calculation window. The calculation data (formula) displayed on the calculation window is selected, and the selected data is moved onto a geometrical window by the drag and drop operation, whereby the geometrical graphic form object based on the calculation data (formula) selected on the calculation window can be displayed on the geometrical window.

For example, after a geometrical graphic form object displayed on a geometrical window is selected, and a display position is changed by inputting a parallel moving operation, when the geometrical graphic form object is copied to a calculation window, the calculation data after parallel moving operation can be displayed on the calculation window. The calculation data obtained by carrying out edit and/or calculation processing on the calculation window is copied to a geometrical window, whereby the geometrical graphic form object corresponding to the calculation data can be displayed on the geometrical window. Therefore, a copy and paste operation can be used for study of a change in calculation data (such as formula or coordinate) after parallel moving operation of a geometrical graphic form object or a change in a geometrical form object after edit and/or calculation processing of the calculation data.

In the first embodiment, although a description is given with respect to a case in which copy data stored in the copy buffer 808 is defined as text data, the copy data may be stored in the copy buffer 808 in a data format of a geometrical graphic form object.

The geometry type of a geometrical graphic form object displayed by a geometrical application may be a curve in a negative function form or in a parameter form and a three-dimensional graphic form or the like, for example, without being limited to the above described form.

Other embodiments of the graphic display control apparatus according to the present invention will be described. The same portions as those of the first embodiment will be indicated in the same reference numerals and their detailed description will be omitted.

Second Embodiment

A second embodiment according to the present invention will be described here. A configuration of a functional pocket calculator in the second embodiment is identical to that of the functional pocket calculator 1 shown and described in FIG. 3 in the first embodiment in that the ROM 700 is replaced with a ROM 720 shown in FIG. 22A and the RAM 800 is replaced with a RAM 820 shown in FIG. 22B.

The functional pocket calculator 1 in the second embodiment according to the present invention incorporates a geometrical application program and a calculation application program as in the first embodiment. In particular, the geometrical application comprises a graph drawing function for displaying a graph in a coordinate system based on a specified display range.

Specifically, when an operation for selecting a graph mode is made in a geometrical window, an operating mode is set to the graph mode. For example, when a variety of setting items are input according to graph drawing on a formula input screen for specifying a graphic formula of a graph to be displayed or a display range setting screen for setting a display range or the like, a graph of the specified graphic formula can be dot-drawn as a bit mapped image in a coordinate system based on the set display range. Hereinafter, a geometrical window on which a graph mode is set is referred to as a "graph window."

Figure 22A:
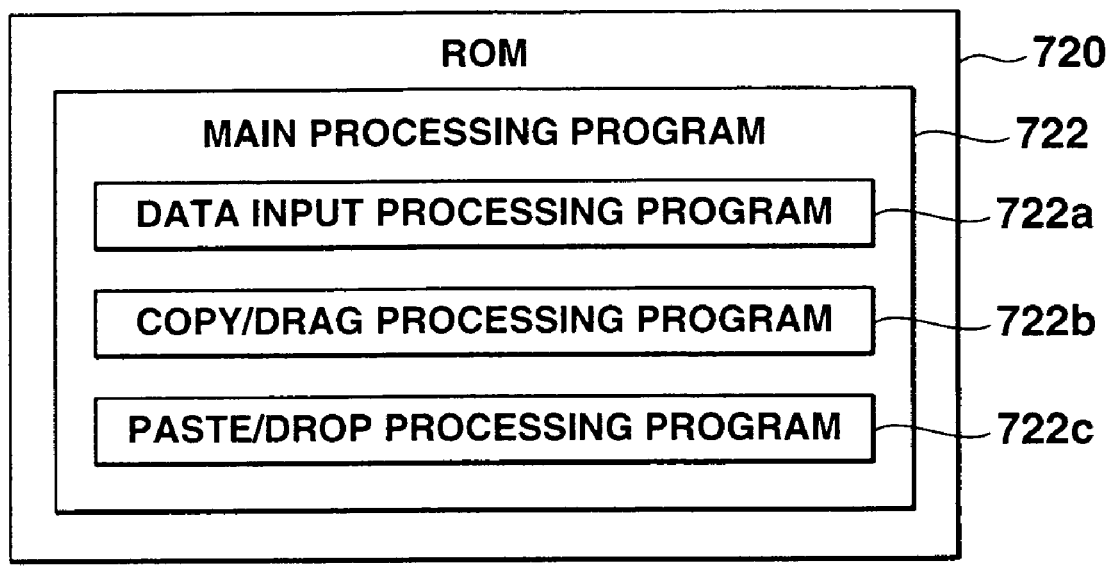
FIG. 22A is a view showing an example of configuration of a ROM in a second embodiment.
Figure 22B:
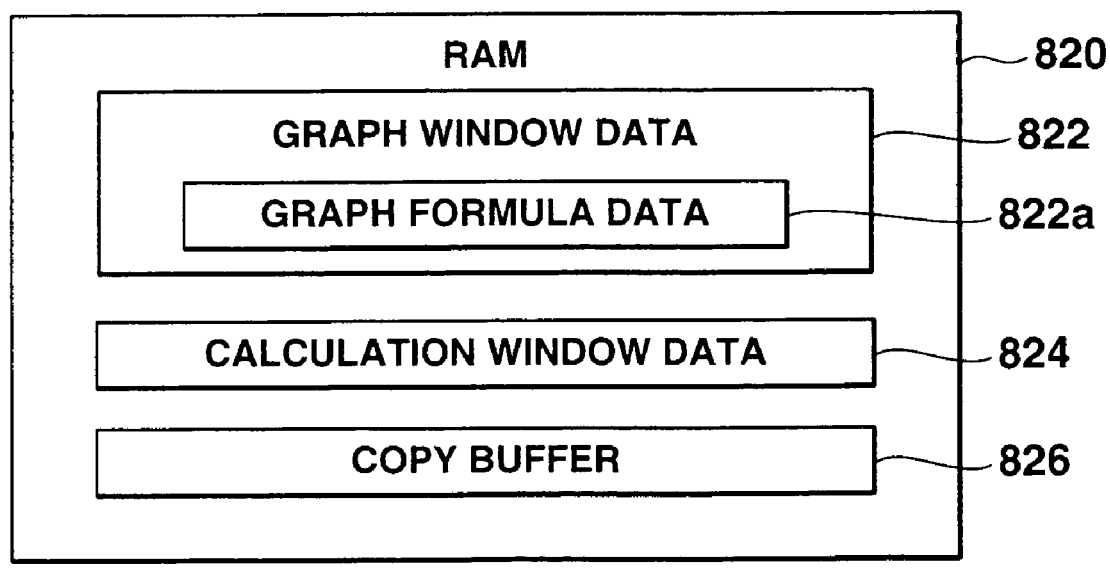
FIG. 22B is a view showing an example of configuration of a RAM in the second embodiment.

A configuration of the ROM 720 and the RAM 820 in the second embodiment according to the present invention will be described with reference to FIG. 22A and FIG. 22B. FIG. 22A shows a configuration of the ROM 720, and FIG. 22B shows a configuration of the RAM 820, respectively. As shown in FIG. 22A, a main processing program 722 is stored in the ROM 720. The main processing program 722 includes a copy/drag processing program 722b and a paste/drop processing program 722c.

As shown in FIG. 22B, the RAM 820 comprises: graph window data 822 which stores dot data on a graph drawn on a graph window; calculation window data 824; and a copy buffer 826. The graph window data 822 stores graphical formula data 822a on a graph to be drawn.

In the second embodiment according to the present invention, a copy and paste function is achieved between a graph window and a calculation window. The CPU 10 executes processing in accordance with the main processing program 722.

Specifically, the CPU 10 executes data input processing based on the data input processing program 722a if a user data input operation is sensed via the input device 20 or the tablet 30, as shown and described in FIG. 6 in the first embodiment. When the user copy operation or drag operation is sensed, the CPU 10 executes copy/drag processing based on the copy/drag processing program 722b. If the user paste operation or drag operation is sensed, the CPU 10 executes paste/drop processing based on the paste/drop processing program 722c. If the user terminating operation is sensed, the CPU 10 termites the processing. Hereinafter, the data input processing, copy/drag processing, and paste/drop processing each in the second embodiment will be described with reference to FIG. 23 to FIG. 25.

Figure 23:
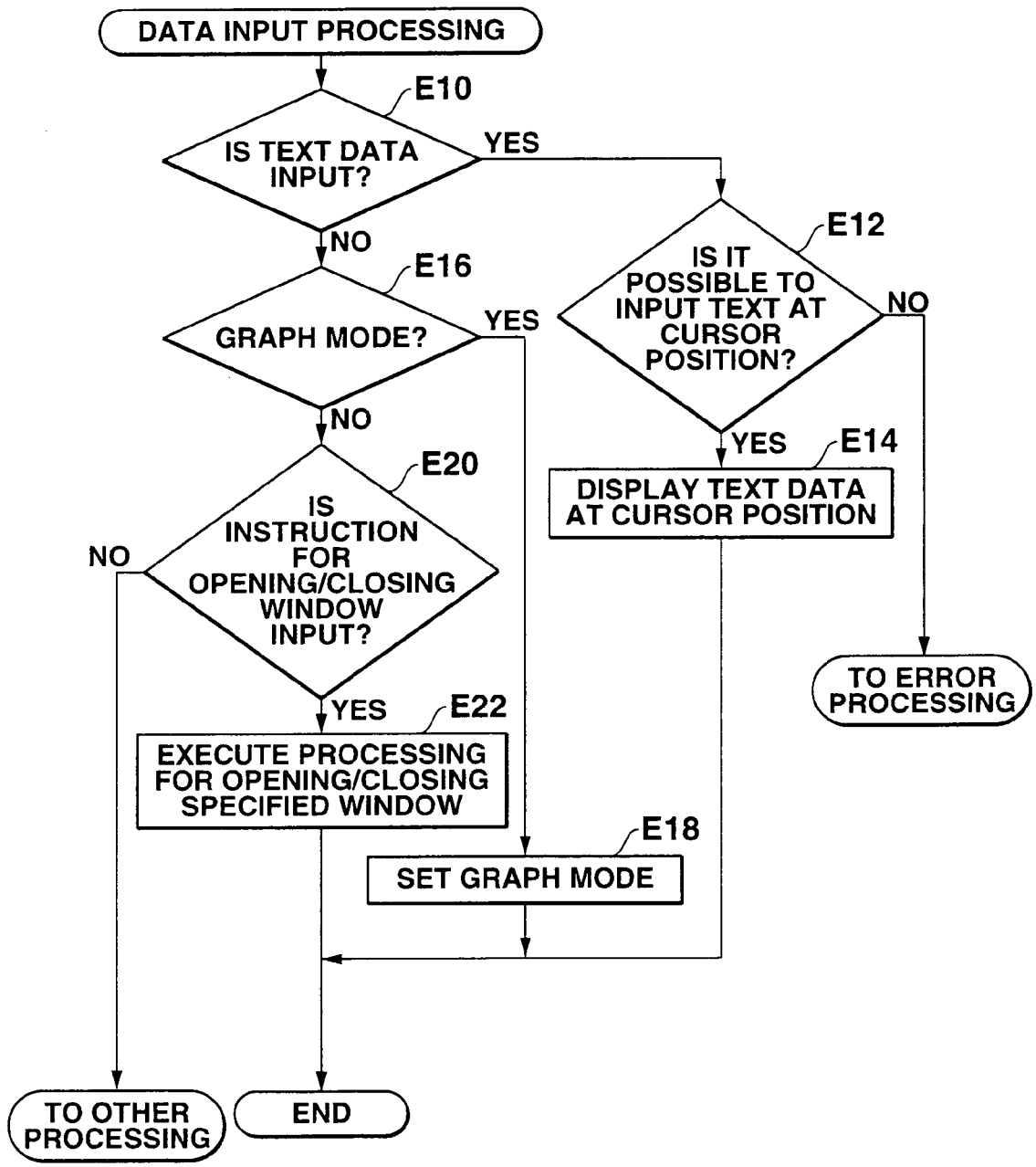
FIG. 23 is a view showing a flow of operation of a functional pocket calculator upon execution of data input processing in the second embodiment.

First, the data input processing will be described. FIG. 23 is a flow chart showing an operation of the functional pocket calculator 1 upon execution of the data input processing. If text data is input (step E10: YES), the CPU 10 determines whether or not a cursor position of a specified window to which the text data is input is a text input enabling position (step E12). If text input to the cursor position is impossible (step E12: NO), the CPU 10 executes error processing. If text input to the cursor position is possible (step E12: YES), the input text data is displayed at a cursor position of the specified window (step E14).

After the case where a mode switch operation is input, if a graph mode setting operation is sensed (step E16: YES), the CPU 10 sets a geometrical window mode to a graph mode (step E18). Specifically, the CPU 10 executes a predetermined program according to graph mode setting, and causes to be displayed on a graph window a graph according to an input of setting item associated with graph drawing such as an input of a formula or display range of a graph to be drawn.

If an instruction for opening/closing a window is input (step E20: YES), the CPU 10 executes processing for opening/closing the specified window (step E22). If other input operations have been made, the CPU 10 moves to the corresponding other processing, and executes them.

Figure 24:
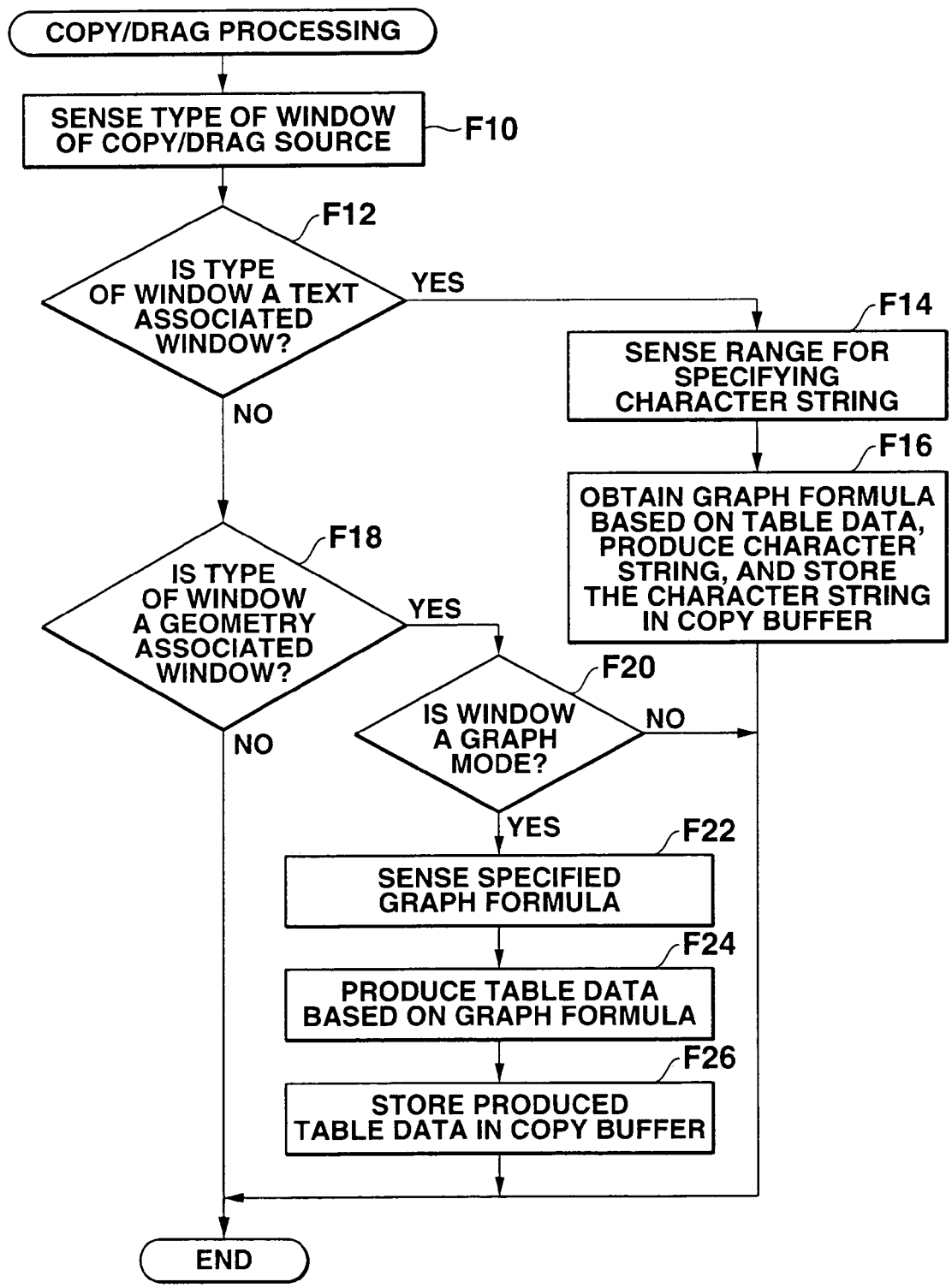
FIG. 24 is a view showing a flow of operation of the functional pocket calculator upon execution of copy/drag processing in the second embodiment.

A description of copy/drag processing will be given here. FIG. 24 is a flow chart showing an operation of the functional pocket calculator 1 upon execution of the copy/drag processing. The CPU 10 senses type of window of a copy/drag source (step F10).

If type of window of the copy/drag source is a text associated window (for example, a calculation window) (step F12: YES), the CPU 10 senses a range of specifying a character string (step F14). The CPU 10 produces a character string by obtaining a graphic formula based on table data in the sensed range of specification, stores the character string in a copy buffer 826 (step F16), and terminates this processing.

If type of window of the sensed copy/drag source is a geometry associated window (for example, a geometrical window) (step F18: YES) and if the window mode is a graph mode (graph window) (step F20: YES), the CPU 10 senses the specified graphical formula (step F20: YES). The CPU 10 produces table data based on the sensed graphic formula (step F24). The CPU 10 produces a character string of a matrix form based on the produced table data, stores the character string in the copy buffer 826 (step F26), and terminates this processing.

Figure 25:
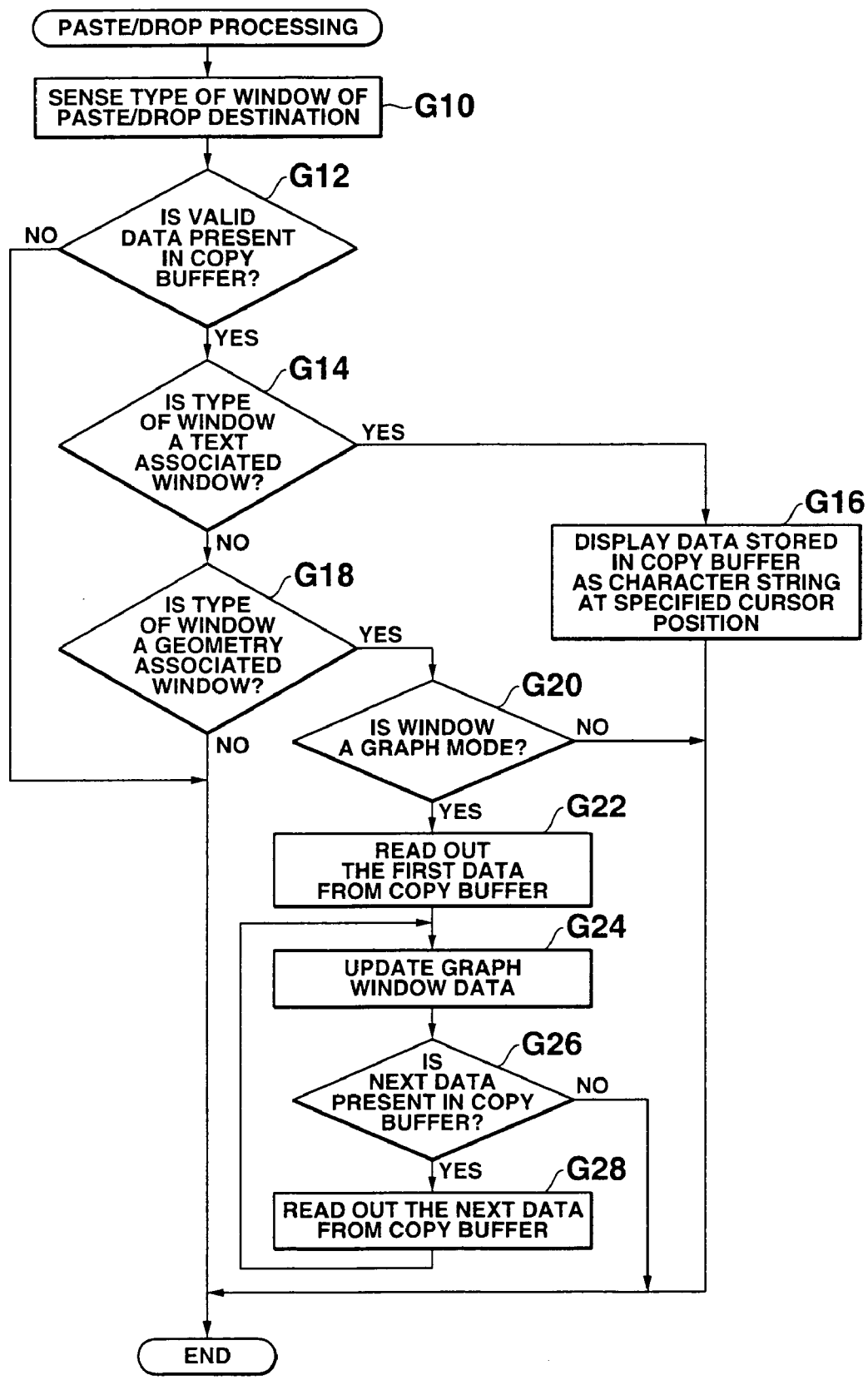
FIG. 25 is a view showing a flow of operation of the functional pocket calculator according to paste/drop processing in the second embodiment.

A description of paste/drop processing will be given here. FIG. 25 is a flow chart showing an operation of the functional pocket calculator 1 upon execution of the paste/drop processing. The CPU 10 senses type of window of a paste/drop destination (step G10). The CPU 10 determines whether or not valid data is present in the copy buffer 826. In no valid data is present (step G12: NO), the CPU 10 terminates this processing.

If valid data is present in the copy buffer 826 (step G12: YES) and if type of window of the paste/drop destination is a text associated window (for example, a calculation window) (step G14: YES), the CPU 10 causes to be displayed at a cursor position a character string stored in the copy buffer 826 (step G16), and terminates this processing.

If type of window of the sensed paste/drop destination is a geometry associated window (for example, a geometrical window) (step G18: YES) and if a mode of the geometry associated window is a graph mode (graph window) (step G20: YES), the CPU reads out the first data stored in the copy buffer 826 (step G22).

The CPU 10 updates graph window data based on a graphic formula represented by the read out data in the copy buffer 826 (step G24). Specifically, for example, if a formula input screen is displayed on a graph window, the CPU 10 causes the graphic formula to be displayed at a cursor position. If a graph screen is displayed on a graph window, the CPU 10 draws a graph based on the graphic formula.

If next data is present in the copy buffer 826 (step G26: YES), the CPU 10 reads out the next data (step G28). Then, processing returns to the step G24 in which the above described processing is repeated for the read out next data.

A copy and paste operation between a graph window GW and a calculation window by a drag and drop operation will be described with reference to FIG. 26A, FIG. 26B, FIG. 27A, and FIG. 27B.

Formula Input Screen on Graph Window

Figure 26A:
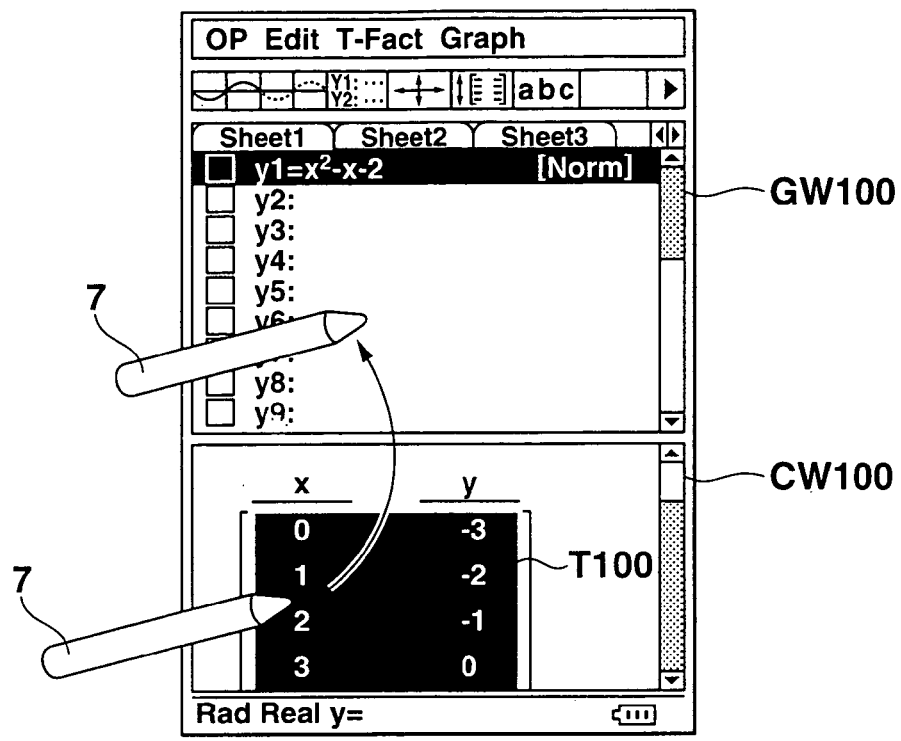
FIG. 26A and FIG. 26B are views each showing a screen change example when table data displayed on a calculation window is dragged and dropped on a graph window.
Figure 26B:
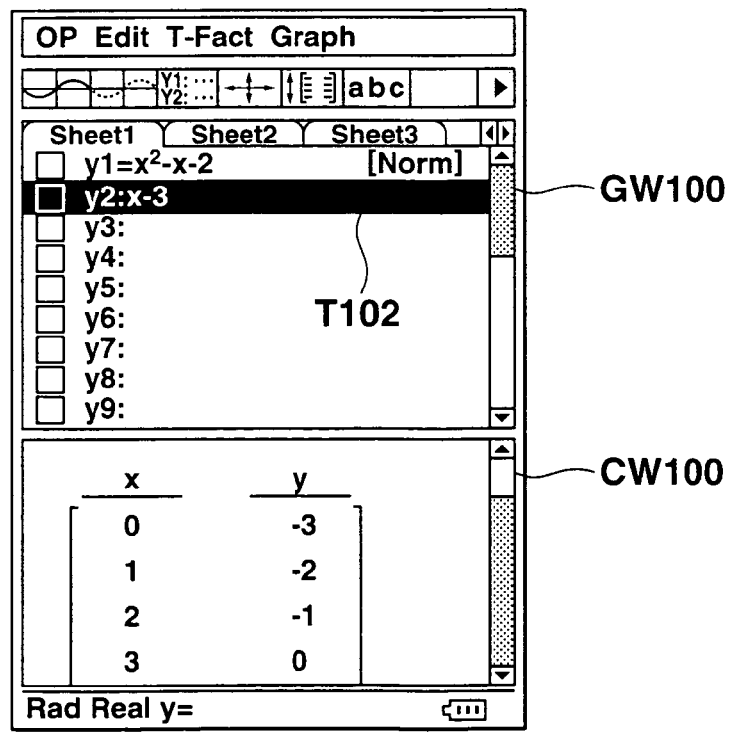

FIG. 26A and FIG. 26B are views each showing a screen change example when table data displayed on a formula window CW 100 is dragged and dropped on a graph window GW100. A formula input screen for specifying a graphic formula of a graph displayed on a graph screen is displayed on the graph window GW100. In FIG. 26A, a table data producing command is specified by using the input pen 7, and a character string of table data is input to the formula input window CW100 (steps E10 of FIG. 23: YES→E12: YES→E14). The character string of the table data displayed on the formula window CW100 is specified by an operation for specifying a range using the input pen 7, and is displayed in inverted manner. When a drag operation is started, copy/drag processing is carried out. Then, a graphic formula is obtained based on the data contained in a specified region T100, and is stored in the copy buffer (steps F10→F23 of FIG. 24: YES→F14→F16). When the specified region T100 in which dragging is started is operated to be dropped on the graph window GW100, paste/drop processing is carried out (steps G10→G18 of FIG. 25: YES→G20: YES→G22→G24). As shown in FIG. 26B, a graphic formula obtained based on the table data is added (pasted), and is displayed in inverted manner.

Figure 27A:
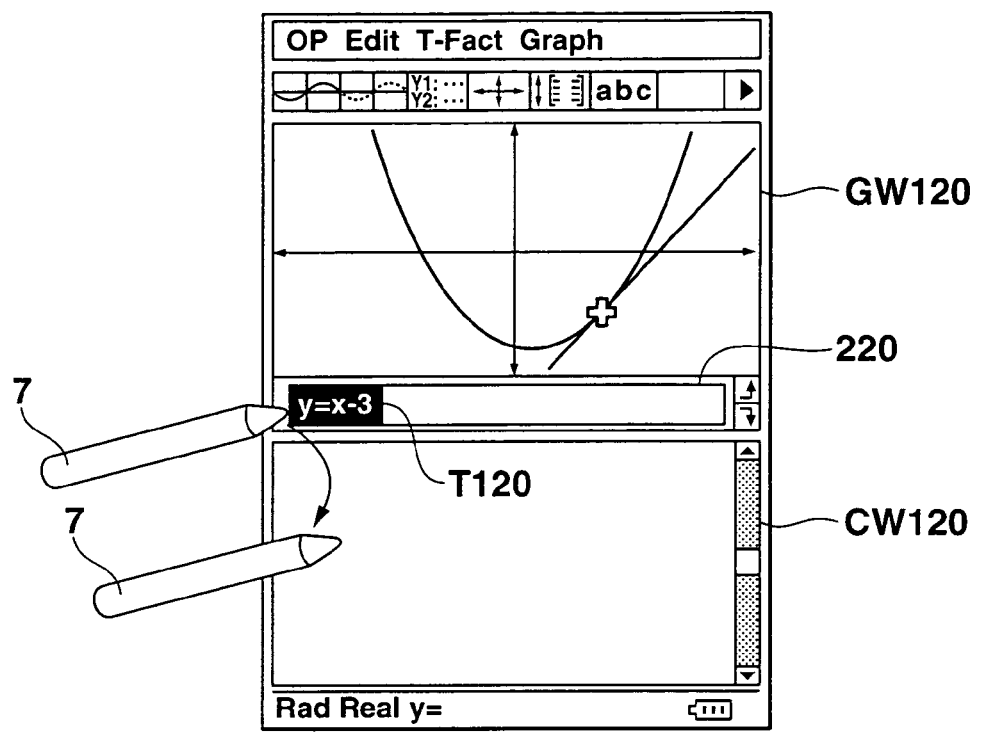
FIG. 27A and FIG. 27B are views each showing a screen change example when graphical formula data displayed on a graph window is dragged and dropped on a calculation window.
Figure 27B:
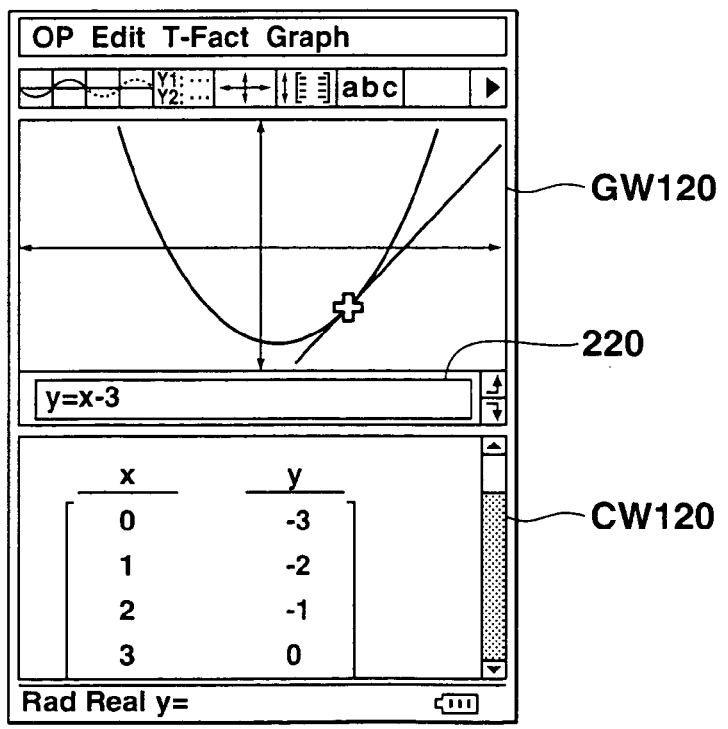

FIG. 27A and FIG. 27B are views each showing a screen change example when the graphic formula data displayed on a graph window GW120 is dragged and dropped on a formula window CW120. A graph screen having displayed therein a graph based on the specified graphic formula is displayed on a graph window GW120. In FIG. 27A, a graphic formula display area 220 is operated to be touched by using the input pen 7 in a graph mode, and a character string is input, thereby inputting a graphic formula (step E16 of FIG. 23: YES→E18). A graphic formula displayed in the graphic formula display area 220 on the graph window GW 120 is specified by an operation for specifying a range using the input pen 7, and is displayed in inverted manner. When the drag operation is started, copy/drag processing is carried out. Then, the table data based on the specified graphic formula is produced, and is stored in a copy buffer (steps F10→F18 of FIG. 24: YES→F20: YES→F22→F24→F26).

When the specified region T120 in which dragging is started is operated to be dropped on the formula window CW120, paste/drop processing is carried out (steps G10→G14 of FIG. 25: YES→G16). As shown in FIG. 27B, the table data produced based on the graphic formula is displayed to be pasted on a cursor position of the formula window CW120.

For example, after table data is edited in the formula window CW120 shown in FIG. 27B, when the table data is displayed in inverted manner by specifying the table data by an operation for specifying a range using the input pen 7, and is moved onto the graph window GW120 by a drag and drop operation, a graphic formula display area 220 is updated by the graphic formula based on the table data. In addition, the graph window GW120 is re-drawn, whereby the graph based on the graphic formula may be drawn.

As is described above, according to the second embodiment, after the screen display content of either of the graph window and calculation window is selected, and a copy operation is made, when the other screen is specified, and a paste operation is made, the screen display content of the selected one can be displayed according to a display mode of the other screen.

For example, the graphic formula data displayed on a graph window is selected, and the selected data is moved onto a calculation window by a drag and drop operation, whereby the table data based on the graphic formula selected on the graph window can be displayed at a cursor position of the calculation window. The table data displayed on the calculation window is selected, and the selected data is moved onto a graphic window by a drag and drop operation, whereby a graphic formula based on the table data selected on the calculation window or a graph based on the graphic formula can be displayed on the graph window.

Third Embodiment

Figure 28:
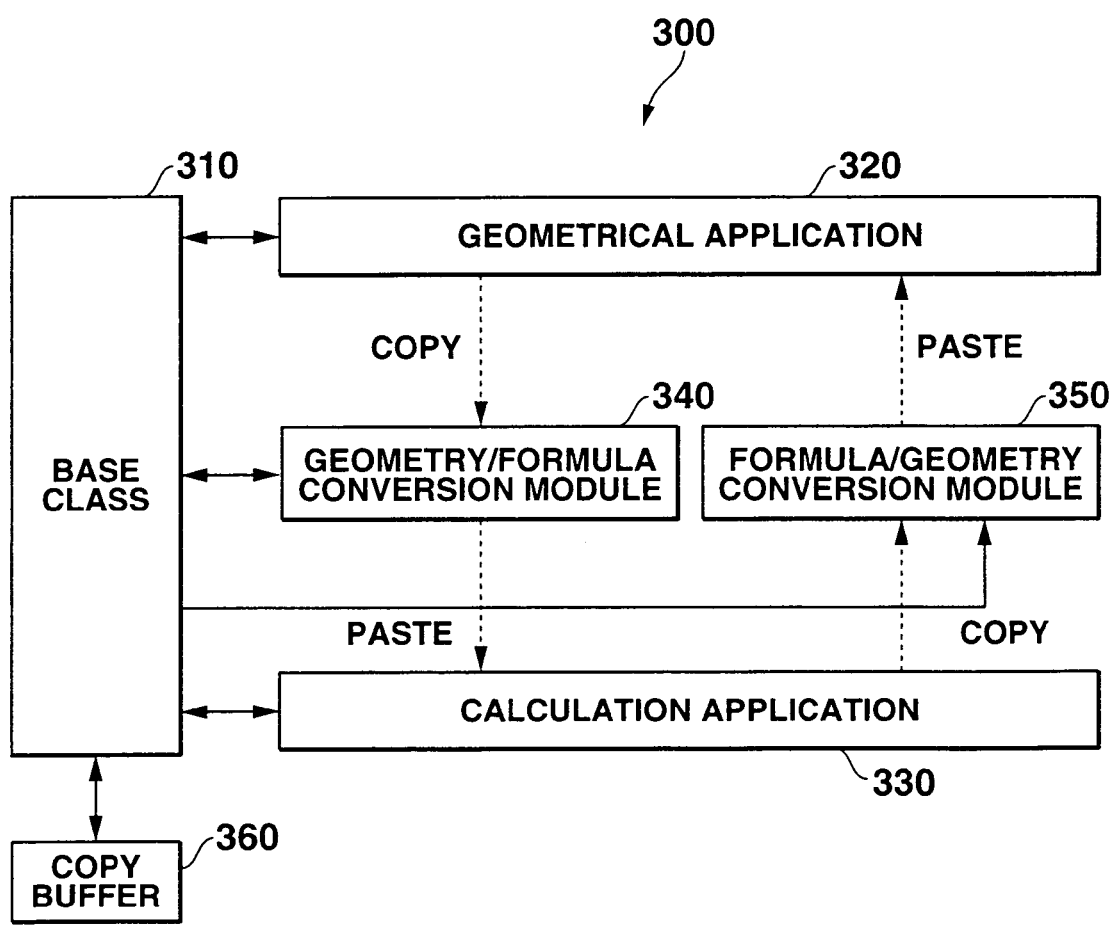
FIG. 28 is a view showing a conceptual drawing of a functional pocket calculator in a third embodiment.

A third embodiment according to the present invention will be described here. FIG. 28 is a conceptual view showing a functional pocket calculator 300 according to the third embodiment. The functional pocket calculator 300 includes programs executed by a CPU such as a base class 310, a geometrical application program 320, a calculation application program 310, a geometry/formula conversion module 340 and a formula/geometry conversion module 350. When these programs are executed, the CPU carries out processing by using a copy buffer 360 which is a part of RAM. Hereinafter, these programs are primarily described for clarity. In actuality, these programs are executed and achieved by the CPU.

The base class 310 is a program for integrally managing a variety of applications and a variety of modules included in the functional pocket calculator 300, and controlling an operation of the functional pocket calculator 300. In particular, the base class 310 monitors a copy and paste instruction by a drag and drop operation and the like between a geometrical window and a calculation window displayed on a display screen. If a copy and paste operation from the geometrical window to the calculation window is sensed, the base class 310 starts up the geometry/formula conversion module 340. If a copy and paste operation from the geometrical window to calculation window is sensed, the base class 310 starts up the formula/geometry conversion module 350.

The geometry application 320 is an application program which has a variety of geometrical graphic form drawing functions, and handles a geometrical model described in a data format which can be utilized by the geometrical application program 320.

The calculation application program 330 is an application program which has a variety of calculation functions, and handles a formula model described in a data format which can be utilized by the calculation application program 330.

The geometry/formula conversion module 340 is an interface program when a geometrical model produced by the geometrical application is passed to the calculation application program 330. That is, the geometry/formula conversion module 340 converts the geometrical model stored in the copy buffer 360 into a formula model according to a copy and paste instruction to the calculation application program 330 of the geometrical model produced by the geometrical application program 320.

The formula/geometry conversion module 350 is an interface program when the formula model produced by the calculation application program is passed to the geometrical application program 320. That is, the formula/geometry conversion module 350 converts the formula model stored in the copy buffer 360 into the geometrical model according to the copy and paste instruction to the geometrical application of the formula model produced by the calculation application program.

The copy buffer 360 is a storage region for temporarily storing the geometrical model copied by the geometrical application program 320 or the formula model copied by the calculation application program 320. This copy buffer is used as a work region when the geometry/formula conversion module 340 converts the geometrical model into the formula model or when the formula/geometry conversion module 350 converts the formula model into the geometrical model.

Figure 29:
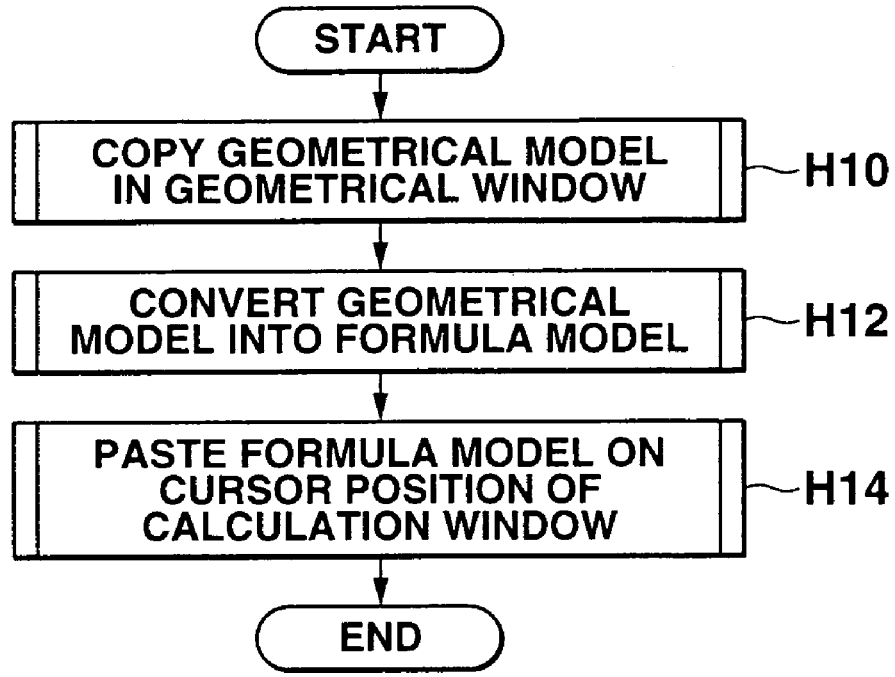
FIG. 29 is a flow chart showing an operation of the functional pocket calculator when a geometrical model copied by a geometrical application is pasted on a calculation application.

FIG. 29 is a flow chart showing an operation of the functional pocket calculator 300 when the geometrical model copied by the geometrical application program 320 is pasted on the calculation application program 330. When the base class 310 has sensed a copy operation of the geometrical model on a geometrical window, as shown in FIG. 29, the geometrical application program 320 copies the selected geometrical model, and stores the model in the copy buffer 360 via the base class 310 (step H10). The geometry/formula conversion module 340 converts the geometrical model stored in the copy buffer 360 into the formula model, and updates the copy buffer 360 (step H12). The calculation application program 330 reads out the formula model of the copy buffer 360, pastes the model to a cursor position of a calculation window, and causes the formula model to be displayed on the calculation window (step H14).

Figure 30:
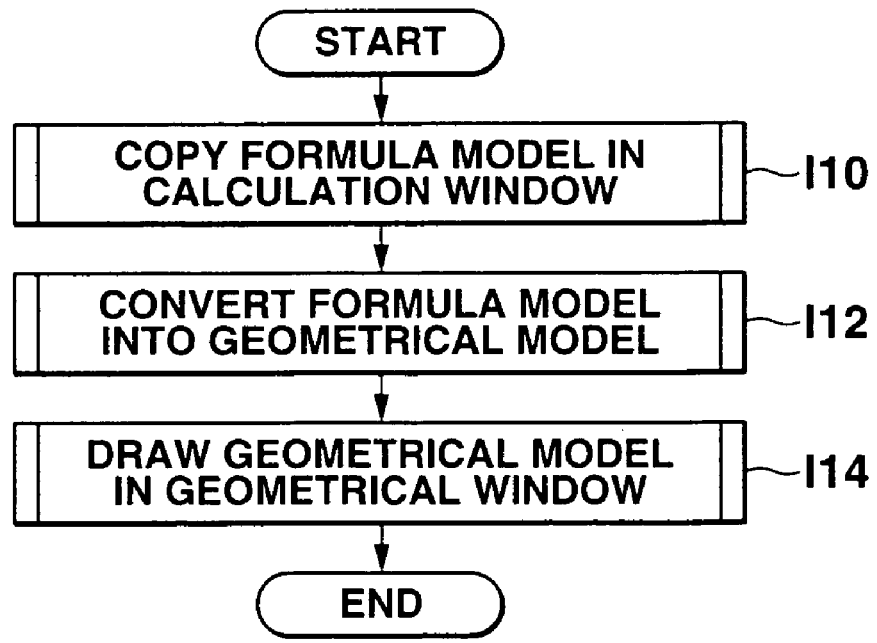
FIG. 30 is a flow chart showing an operation of the functional pocket calculator when a formula model copied by a calculation application is pasted on a geometrical application.

FIG. 30 is a flow chart showing an operation of the functional pocket calculator 330 when the formula model copied by the calculation application 330 is pasted on the geometrical application 320. When the base class 310 has sensed a copy operation of the formula model on a calculation window, as shown in FIG. 30, the calculation application 330 copies the selected formula model, and stores the model in the copy buffer 360 via the base class 310 (step I10). The formula/geometry conversion module 350 converts the formula model stored in the copy buffer 360 into the geometrical model, and updates the copy buffer 360 (step I12). The geometrical application 320 draws the formula model of the copy buffer 360 on the geometrical window, and causes the geometrical model to be displayed on the geometrical window (step I14).

As is described above, according to the third embodiment, the conversion modules having described therein processing for converting a display mode of data on an application of a copy source into a display mode of data on an application of a copy destination are each provided, thereby achieving a copy and paste function between the applications which are different from each other in display mode.

In the third embodiment, although the copy and paste operation between the geometrical application and the calculation application is described, a copy and paste operation between applications which are different from each other in display mode such as word processor software, table calculation software, paint software, or statistics software, for example, can be achieved by adding a conversion module having described therein processing for converting a display mode of an application of a copy source into a display mode of an application of a copy destination.

For example, a conversion module for converting a geometrical model into a bit map image and a conversion module for converting a bit map image into a geometrical model are added to the functional pocket calculator 300, whereby a copy and paste function between the geometrical application and a drawing application which handles the bit map image such as paint software can be achieved.

In the first to third embodiments, although a description is given with respect to a case in which two applications, i.e., a geometrical application and a calculation application are started up, whereby two screens of the geometrical window and calculation window are displayed on a display screen, of course, three or more applications are started up, whereby a screen of a copy source and a screen of a copy destination may be properly selected.

Although the three embodiments have been described by way of example where the present invention is applied to the functional pocket calculator, of course, a graphic display control apparatus according to the present invention can be achieved by a general-purpose computer or a personal computer and the like. Specifically, the above described programs each are configured as software running under an operating system (OS), and are stored in a variety of storage mediums such as a hard disk, a magnetic disk, or an optical disk. In this case, for example, a copy and paste instruction is input by a drag and drop operation using a pointing device such as a mouse.

Fourth Embodiment

A fourth embodiment according to the present invention will be described here. A configuration of a functional pocket calculator in the fourth embodiment is identical to that of the functional pocket calculator 1 shown and described in FIG. 3 in the first embodiment in that the ROM 700 is replaced with a ROM 740 shown in FIG. 31A and the RAM 800 is replaced with a RAM 840 shown in FIG. 31B. Hereinafter, like constituent elements are designated by like reference numerals. A duplicate description is omitted here.

A functional pocket calculator 1 in the fourth embodiment incorporates a graph drawing application and a calculation application as in the first embodiment. In particular, when an operation for selecting a statistic mode is input on a calculation window, an operating mode of the functional pocket calculator 1 is set to the statistic mode. Then, a screen for carrying out a variety of statistic processes (hereinafter, referred to as an "statistic window") is displayed. In this statistic window, data or an instruction for executing statistic processing is input, whereby statistic processing for input data can be carried out.

When an instruction for regression calculation is input in the statistic mode, a table window is displayed. Then, a regression calculation result for input data can be displayed on the table window.

Figure 31A:
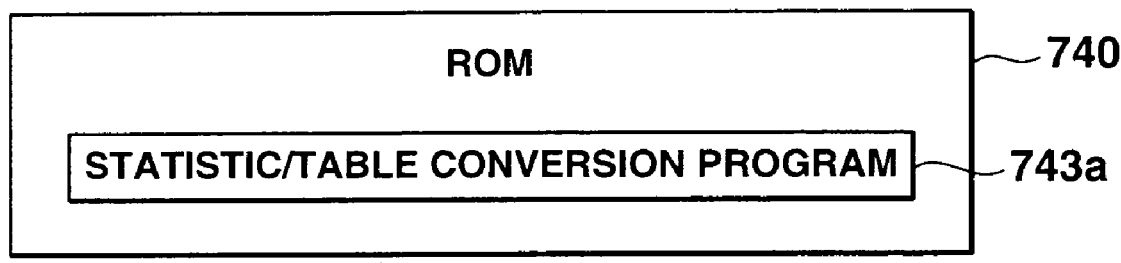
FIG. 31A is a view showing an example of configuration of a ROM in a fourth embodiment.
Figure 31B:
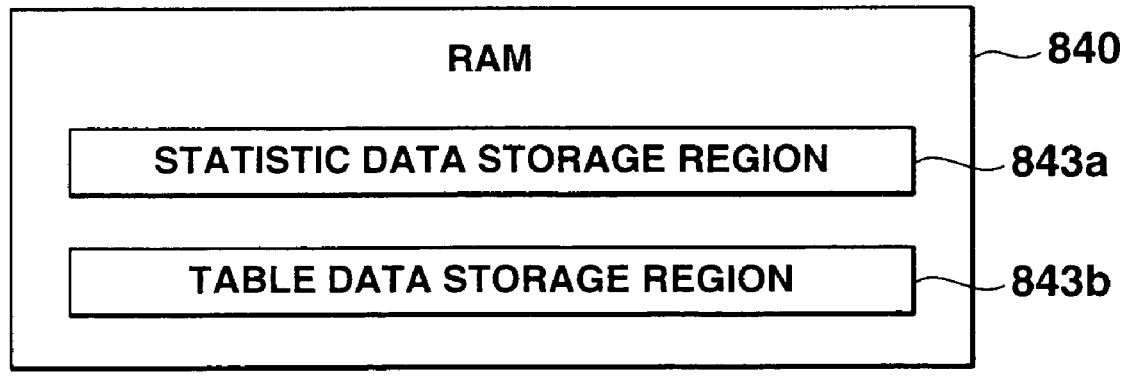
FIG. 31B is a view showing an example of configuration of a RAM in the fourth embodiment.

A configuration of the ROM 740 and the RAM 840 each in the fourth embodiment according to the present invention will be described with reference to FIGS. 31A and 31B. FIG. 31A shows a configuration of the ROM 740, and FIG. 31B shows a configuration of the RAM 840, respectively. As shown in FIG. 31A, the ROM 740 stores a statistic/table conversion program 743*a*.

The CPU 10 executes statistic table conversion processing in accordance with this statistic/table conversion program 743*a*. Specifically, if the CPU 10 has sensed a drag and drop operation onto a table window of the statistic data produced by a statistic window, the CPU 10 applies a predetermined regression formula to the statistic data, thereby preparing interpolation data, and causing the data to be displayed on the table window.

The regression formula used here refers to a function indicating a correlation between a plurality of data. That is, this regression formula is a functional formula such as a straight line or curve obtained by analyzing a data group consisting of a plurality of data, and utilizing a method of least square to determining a factor value which is the most approximate to all data configuring the group of data.

If the CPU 10 has sensed a drag and drop operation for a statistic window of the table data produced by a table window, the CPU 10 executes statistic data production processing based on the table data. Specifically, the CPU 10 generates random numbers (an integer value of 1 to 9) to determine a value of "x." In addition, the CPU 10 determines a corresponding value of "y" by the random numbers to produce candidate data, and applies a predetermined regression formula based on the candidate data to produce interpolation data. If the produced candidate data and interpolation data are equal to each other, the CPU 10 determines the candidate data as statistic data.

As shown in FIG. 31B, the RAM 840 comprises: a statistic data storage region 843*a*; and a table data storage region 843*b* which stores table data to be displayed on a table window.

Figure 32:
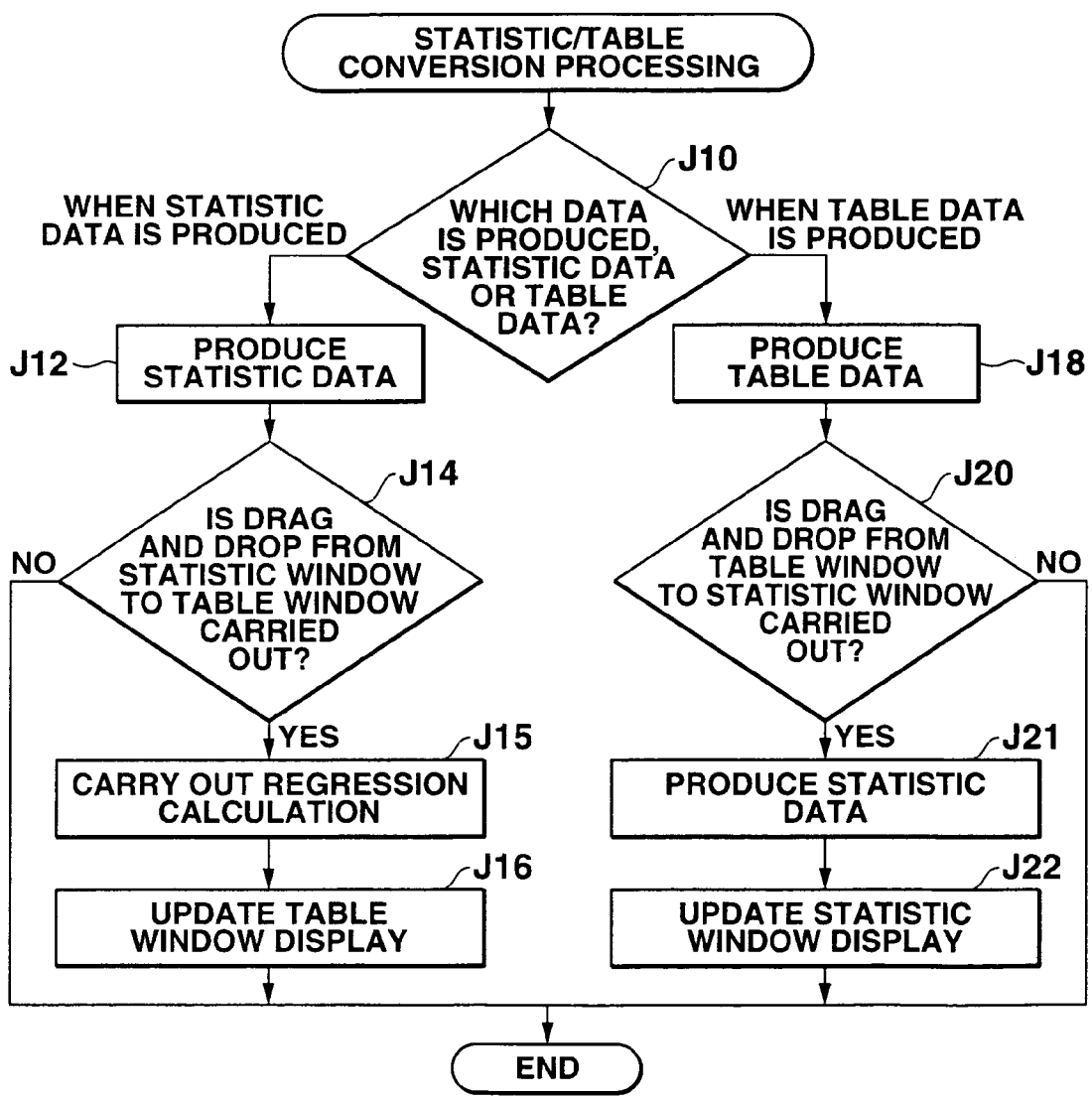
FIG. 32 is a flow chart showing an operation of the functional pocket calculator upon execution of table conversion processing.

Statistic/table conversion processing executed by the CPU 10 in accordance with a statistic/table conversion program 743*a* will be described with reference to FIG. 32 to FIG. 34A and FIG. 34B. FIG. 32 is a flow chart showing an operation of the functional pocket calculator 1 upon execution of statistic/table conversion processing. FIG. 33A, FIG. 33B, FIG. 34A and FIG. 34B are views each showing a change example of a screen displayed at a display device 50.

As shown in FIG. 32, the CPU 10 accepts input of an operation for producing statistic data or an operation for producing table data (step J10), and executes the corresponding processes, respectively, according to a case in which the operation for producing statistic data is input or a case in which the operation for producing table data is input. The CPU 10 produces statistic data according to the operation for producing statistic data in a statistic window (step J12).

FIG. 33A shows an example of a display screen 430 of the functional pocket calculator 1 displayed at this stage. A statistic window SW13 and a table window TW13 are displayed on the display screen 430, and statistic data is displayed on the statistic window SW13.

If the CPU 10 has sensed a drag and drop operation for a matrix window of the statistic data displayed on the statistic window (step J14: YES), the CPU 10 applies a predetermined regression formula to the statistic data stored in the statistic data storage region 843*a*, thereby producing table data and updating the table data storage region 843*b* (step J15). Then, the CPU 10 updates display of the table window (step J16), and terminates this processing.

For example, as shown in FIG. 33B, the statistic data displayed on the statistic window SW13 is specified by an operation for specifying a range using the input pen 7, and is displayed in inverted manner. When the specified region T13 is moved to the table window TW13 by a drag and drop operation, table data is displayed on the table window TW13, the table data being produced by applying a primary regression straight line to the statistic data displayed on the statistic window SW13.

Figures 34A, 34B:
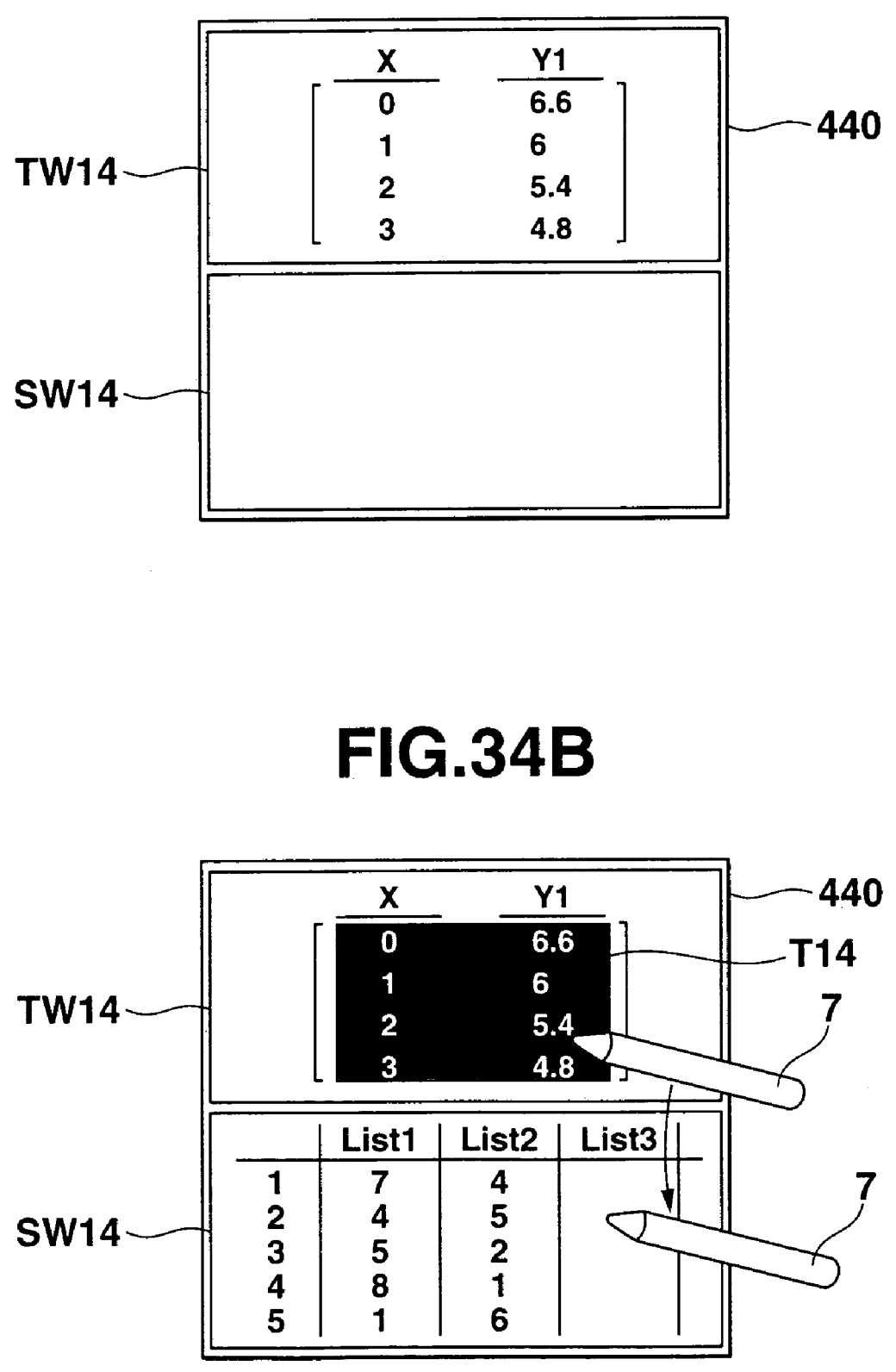

The CPU 10 produces table data according to an operation for producing table data in a table window (step J18). FIG. 34A shows an example of a display screen 440 of the functional pocket calculator 1 displayed at this stage. Table data is displayed in a table window TW14.

If the CPU 10 has sensed a drag and drop operation for a statistic window of the table data displayed on a table window (step J20: YES), the CPU 10 repeatedly executes processing for producing candidate data based on the table data stored in the table data storage region 843*b*, thereby producing statistic data and updating the statistic data storage region 843*a* (step J21). Then, the CPU 10 updates display of the statistic window (step J22), and terminates this processing.

For example, as shown in FIG. 34B, the table data displayed on the table window TW14 is specified by an operation for specifying a range using the input pen 7, and is displayed in inverted manner. When the specified region T14 is moved to the statistic window SW14 by a drag and drop operation, the statistic data produced based on the table data displayed on the table window TW14 is displayed on the statistic window SW14.

According to the fourth embodiment which is described above, a statistic window and a table window are displayed on a display screen at the same time, and statistic data on a statistic window is dragged and dropped on a table window, whereby a predetermined regression formula is applied to the statistic data to automatically carry out regression associated calculation, and a calculation result can be displayed on the table window. The table data on the table window is dragged and dropped on the statistic window, whereby processing for producing statistic data based on the table data is executed, and the produced statistic data can be automatically displayed on the statistic window.

Fifth Embodiment

Now, a fifth embodiment of a functional pocket calculator to which the present invention is applied will be described here.

According to the fifth embodiment, between one geometrical graphic form displayed on a screen (hereinafter, referred to as a "geometrical window") of a geometrical application and one set of calculation data displayed on a screen (hereinafter, referred to as a "calculation window") of a calculation application, when a link associating them with each other is formed, according to a change operation of either of them, the other is automatically changed to be displayed and updated.

In the fifth embodiment, a functional pocket calculator 1 comprises a copy and paste function for, when the screen display content of either of the geometrical window and calculation window is selected, a copy operation is made, the other screen is specified, and a paste operation is made, controlling the screen display content of the selected one to be displayed according to a display mode of the other screen, wherein, when the copy and paste operation is input, a link associating the display content selected on such one screen with the content displayed on the other screen is automatically formed.

Figure 35A:
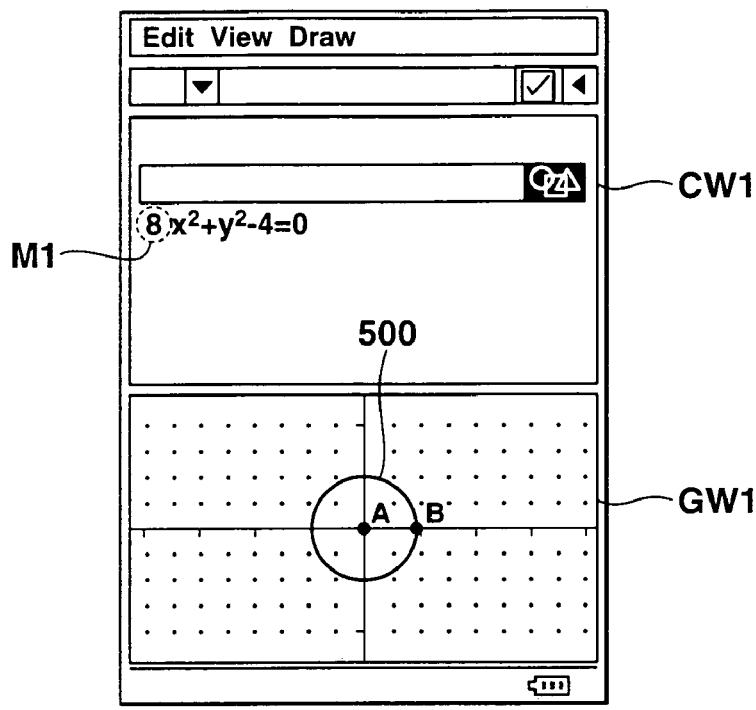
FIG. 35A, FIG. 35B and FIG. 35C are views each showing a screen change example of a display screen of a functional pocket calculator in a fifth embodiment.
Figure 35B:
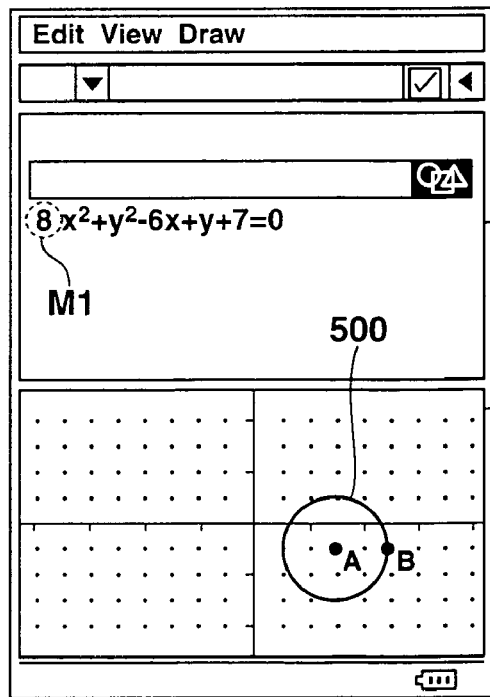
Figure 35C:
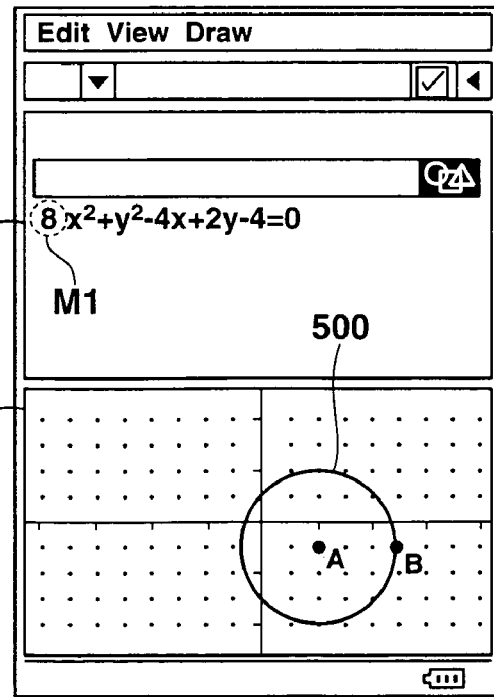

FIG. 35A to FIG. 35C each show a screen change example of a display screen of the functional pocket calculator 1 in the fifth embodiment according to the present invention. In FIG. 35A to FIG. 35C, a formula window CW1 and a geometrical window GW1 are displayed on the display screen. In the formula window CW1 shown in the figures, a user can cause a variety of calculation processes such as equation calculation, matrix calculation, and complex arithmetical operation to be carried out. In the geometrical window CW1, the user specifies geometry type of a graphic form to be drawn, and specifies a specific point of the geometrical graphic form (inputs a functional formula if the geometry type is a functional graph), whereby the corresponding geometrical graphic form object can be displayed on the geometrical window GW1.

The geometrical graphic form object displayed on the geometrical window GW1 is selected by an input pen or the like, and the geometrical graphic for object is rotated or moved in parallel.

By setting a link mode, between an arbitrary geometrical graphic form object displayed on the geometrical window GW1 and an arbitrary set of calculation data displayed on the formula window CW1, a link associating both of them with each other can be formed.

In the functional pocket calculator 1, after a geometrical application and a calculation application are started up, in a state in which the geometrical window GW1 and the formula window CW1 are displayed on a display screen, as described above, for example, if a circle drawing instruction is input and points A and B are indicated by an input pen or the like in the geometrical window GW1, a circle object 500 whose point B is defined as one point on a circumstance is drawn around point A.

For example, after the circle object 500 is selected, and a copy operation is input, when the geometrical window GW1 is specified, and a paste operation is input, an equation "$x^2+y^2-4=0$" of the corresponding circle is displayed at a cursor position of the formula window CW1. In the formula window CW1, after the equation "$x^2+y^2-4=0$" of a circle is input, the formula "$x^2+y^2-4=0$" is selected, and a copy operation is input, when the geometrical window GW1 is specified, and a paste operation is input, the circle object 500 based on the formula "$x^2+y^2-4=0$" is drawn on the geometrical window GW1.

In the geometrical window GW1 shown in FIG. 35A, after the circle object 500 is selected by using an input pen or the like, for example, when a move operation is input, and a display position of the circle object 500 is changed as shown in FIG. 35B, calculation data on the formula window CW1 is changed to an equation "$x^2+y^2-6x+y+7=0$" of a circle calculated based on the move operation amount. In the formula window CW1 shown in FIG. 35B, when the calculation data "$x^2+y^2-6x+y+7=0$" is changed to "$x^2+y^2-4x+2y-4=0$," the circle object 500 drawn on the geometrical window GW1 is deformed according to the deform operation, as shown in FIG. 35C.

Figure 36:
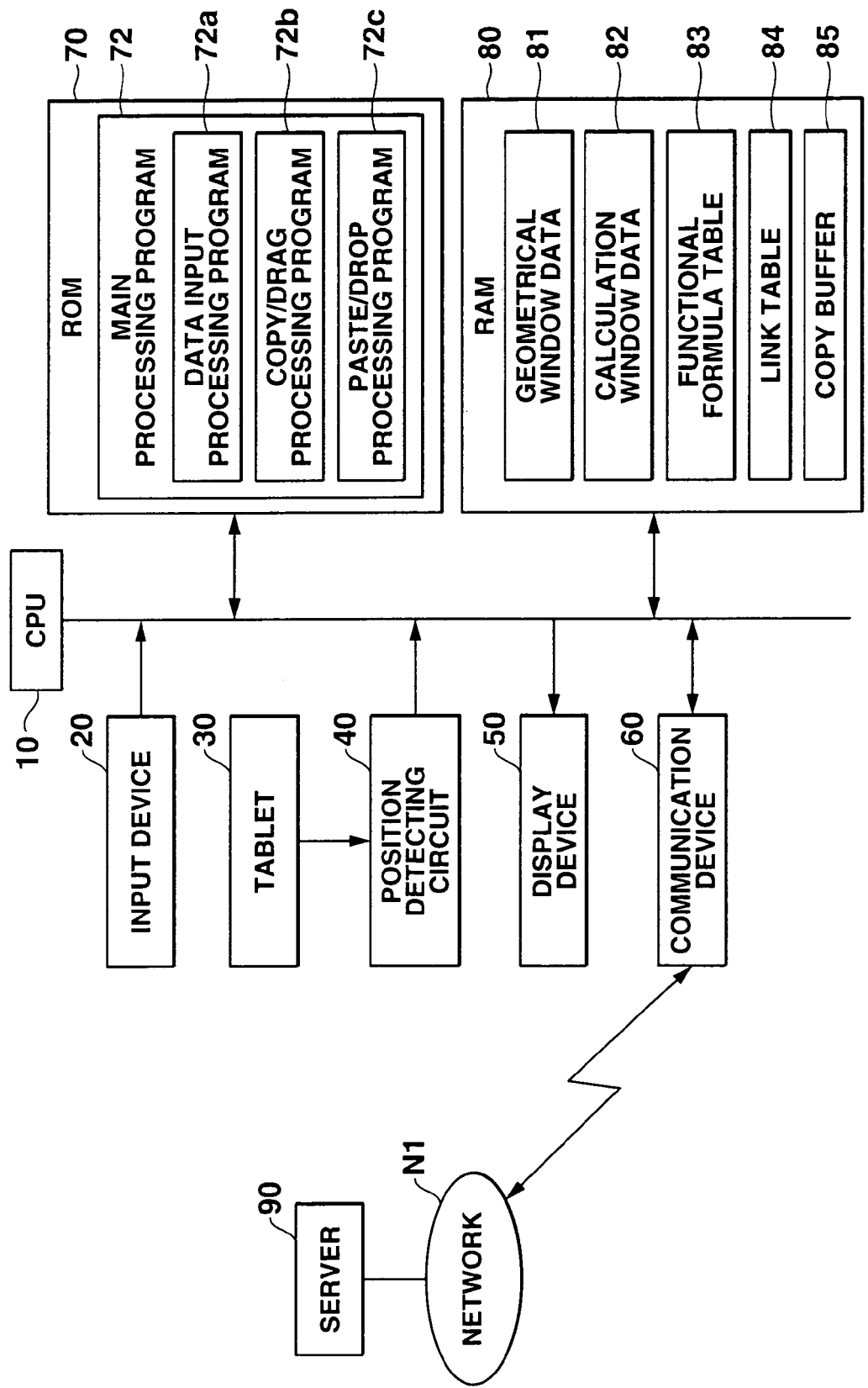
FIG. 36 is a view showing a configuration of the functional pocket calculator in the fifth embodiment.

FIG. 36 is a view showing an example of functional configuration of a functional pocket calculator 1. The functional pocket calculator 1 comprises functional portions such as the CPU 10, input device 20, tablet 30, position detecting circuit 40, display device 50, communication device 50, a ROM 70 and a RAM 80.

Like constituent elements in FIG. 3 are designated by common reference numerals. A duplicate description is omitted here.

The ROM 70 stores: application programs such as a geometrical application program and a calculation application program; a variety of processing programs according to operations of the functional pocket calculator 1 such as menu display processing and various setting processes; and programs or the like for achieving a variety of functions of the functional pocket calculator 1. In particular, the ROM 70 stores a main processing program 72. The main processing program 72 has a data input processing program 72a, a copy/drag processing program 72b and a paste/drop processing program 72c.

The CPU 10 executes processing in accordance with the main processing program 72. In particular, the CPU 10 starts execution of the data input processing program 72a according to a user data input operation, and carries out data input processing. The CPU 10 starts execution of the copy/drag processing program 72b according to the user copy/drag operation, and carries out copy/drag processing. The CPU 10 starts execution of the paste/drop processing program 72c according to the user paste/drop operation, and carries out paste/drop processing.

The RAM 80 comprises a memory region which temporarily stores a variety of programs which the CPU 10 executes or data and the like upon execution of these programs. In particular, the RAM 80 comprises: geometrical window data 81 which stores geometrical data drawn on a geometrical window; calculation window data 82 which stores calculation data displayed on a calculation window; a functional formula table 83 which stores functional formula data of a functional graph drawn on the geometrical window; a link table 84 which stores information on a link between a geometrical graphic form object displayed on a geometrical window and calculation data displayed on a calculation window; and a copy buffer 85 for temporarily storing data specified by a copy operation.

FIG. 37 shows an example of the geometrical window data 81. The geometrical window data 81 is a data table in which a geometrical graphic form ID, a geometry type, and a specific point coordinate are associated with each other. When an instruction for drawing a geometrical graphic form is input in a geometrical window, the CPU 10 draws the corresponding geometrical graphic form object based on a specified specific point coordinate. At this time, the CPU 10 assigns a specific geometrical graphic form ID to the geometrical graphic form object, and stores in the geometrical window data 81 the geometrical graphic form ID, geometry type, and specific point coordinate to be associated with each other.

That is, in the geometrical window data 81, a specific point coordinate of a geometrical graphic form other than a functional graph drawn on a geometrical window is stored, and the geometrical application draws a geometrical graphic form based on the specific point coordinate stored in the geometrical window data 81.

For example, if the geometry type is a "straight line," the coordinates of the two specified points in the geometrical window 81 are stored as a first specific point coordinate and a second specific point coordinate. If the geometry type is an "polygon," the specified n apex coordinates are stored as a first to n-th specific point coordinates. If the geometry type is a "circle," the coordinate of the specified center is stored as a first specific point coordinate, and the coordinate of one point on a circumstance is stored as a second specific point coordinate. If the geometry type is an "ellipse," the specified center coordinate is stored as a first specific point coordinate, the coordinate indicating a short radius is stored as a second specific point, and the coordinate indicating a long radius is stored as a third specific point. For example, in the geometrical window data 81 shown in FIG. 37, a first specific point (0, 0) which is a center coordinate and a second specific point (2, 0) which is a coordinate of one point on a circumstance are defined on a circle object to which a geometrical graphic form ID "ID_G028" is assigned.

If the geometry type of geometrical graphic form instructed to be drawn in a geometrical window is a "functional graph," the CPU 10 draws a functional graph object based on the specified functional formula. At this time the CPU 10 assigns a geometrical graphic form ID to the functional graph object, thereby updating geometrical window data 81 and updating a functional formula table 83.

FIG. 38 shows an example of the functional formula table 83. The functional formula table 83 is a data table in which a geometrical graphic form ID and a functional formula are associated with each other. When a functional graph object is drawn in a geometrical window, the CPU 10 associates the geometrical graphic form ID assigned to the functional graph object with the corresponding functional formula, and stores them in the functional formula table 83. For example, as shown in FIG. 38, in the functional formula table 83, a functional formula "$y=3x^2+2$" of the functional graph object to which the geometrical graphic form ID "ID_G030" is assigned in the geometrical window data 81 shown and described in FIG. 37 is stored to be associated with the geometrical graphic form ID "ID_G030."

FIG. 39 shows an example of calculation window data 82. The calculation window data 82 is a data table in which a formula ID and formula data are associated with each other. When calculation data is input in a calculation window, the CPU 10 assigns the specific formula ID to the input calculation data, associates the formula ID with formula data, and stores them in the calculation window data 82.

The CPU 10 determines whether or not a link relationship is set by referring to a link table 84.

FIG. 40 is a view showing an example of the link table 84. The link table 84 is a data table in which a geometrical graphic form ID and a formula ID are associated with each other. If copy and paste from a geometrical graphic form object to calculation data is carried out by a copy and paste operation, or alternatively, if copy and paste from calculation data to a geometrical graphic form object is carried out, the CPU 10 associates the geometrical graphic form ID of a geometrical graphic form object with the formula ID of calculation data, and stores them in the link table 84.

More specifically, when the CPU 10 temporarily stores the data selected during a copy operation in a copy buffer 85, the CPU stores information for determining whether or not a link is formed for the copy data to be associated with each other.

FIG. 41 shows an example of the copy buffer 85. The copy buffer 85 stores copy data to be associated with a calculation link flag and a geometrical link flag.

When copy data is stored in the copy buffer 85, if a link mode is set and if copy data is data operated to be copied in a calculation window, the CPU 10 sets a calculation link flag to "ON." If copy data is data operated to be copied in a geometrical window, the CPU 10 sets a geometrical link flag to "ON."

For example, when the geometrical graphic form object selected in the geometrical window is copied to the calculation window, if the geometrical link flag is set to "ON," the CPU 10 updates the link table 84. That is, the CPU 10 forms a link in which the corresponding geometrical graphic form object and calculation data are associated with each other according to a copy and paste operation between different applications including a case in which a copy and paste operation is input from a geometrical application to a calculation application or a case in which a copy and paste operation is input from a calculation application to a geometrical application.

An operation of the functional pocket calculator 1 in the fifth embodiment according to the present invention will be described here.

Figure 42:
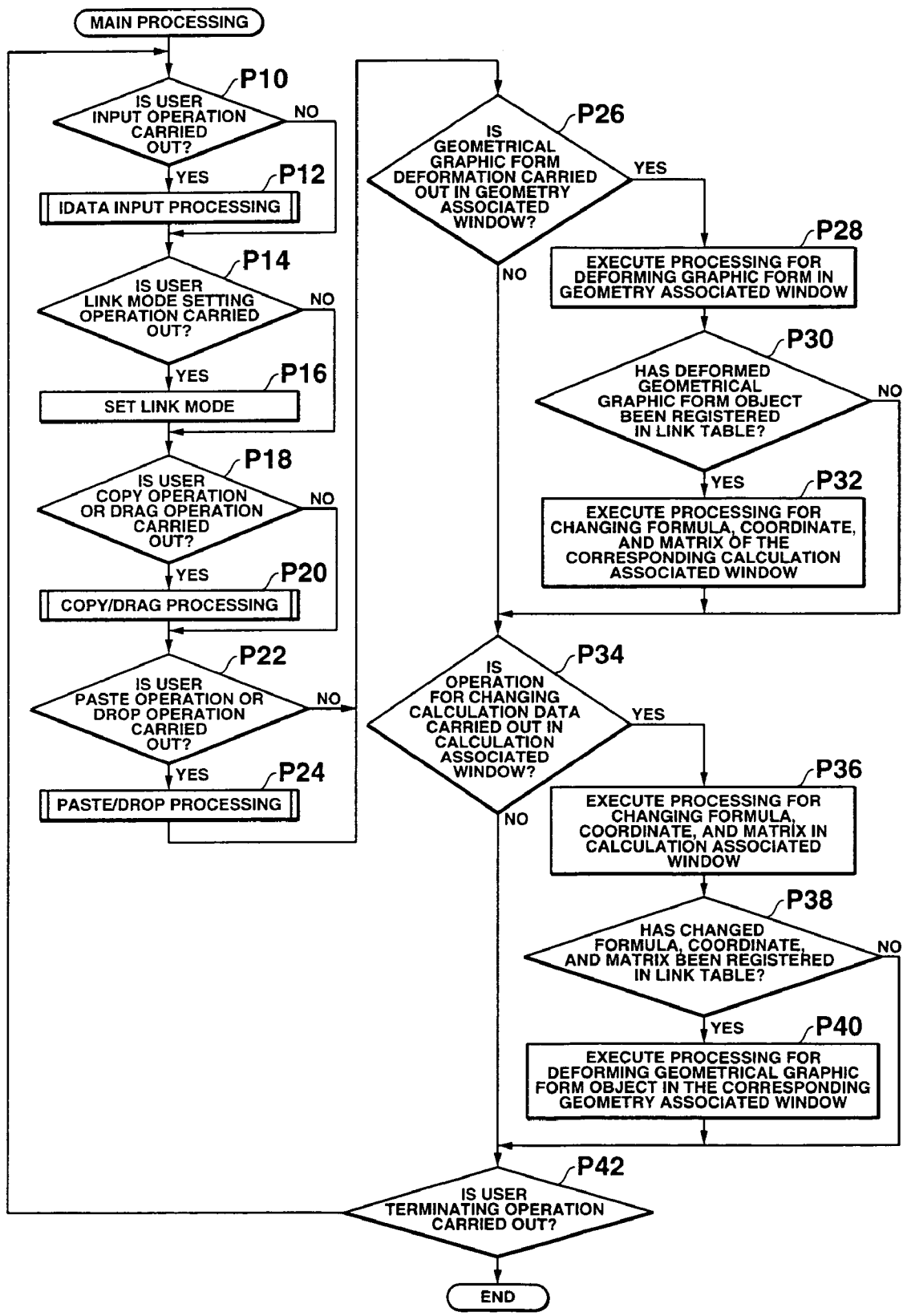
FIG. 42 is a view showing a flow of operation of the functional pocket calculator upon execution of main processing.

FIG. 42 is a flow chart showing an operation of the functional pocket calculator 1 upon execution of main processing. If the CPU 10 has sensed a user data input operation via an input device 20 or a tablet 30 (step P10: YES), the CPU 10 executes data input processing (step P12).

If the CPU 10 has sensed the user link mode setting operation (step P14: YES), the CPU 10 sets a link mode.

If the CPU 10 has sensed the user copy operation or drag operation (step P18: YES), the CPU 10 executes copy/drag processing (step P20).

If the CPU 10 has sensed the user paste operation or drag operation (step P22: YES), the CPU 10 execute paste/drop processing (step P24).

If the CPU 10 has sensed an operation for deforming a geometrical graphic form in a geometry associated window (for example, a geometrical window) (step P26: YES), the CPU 10 executes processing for deforming a graphic form according to the change operation (step P28), and updates geometrical window display.

The CPU 10 determines whether or not the deformed geometrical graphic form object is registered in the link table 84 (step P30). Specifically, this determination is made according to whether or not the geometrical graphic form ID assigned to the deformed geometrical graphic form object is stored in the link table 84. If the CPU 10 has determined that the deformed geometrical graphic form is registered in the link table 84, the CPU 10 executes processing for changing numeric values of the formula, coordinate, and matrix in the corresponding calculation associated window (step P32), and updates calculation window display.

If the CPU 10 has sensed an operation for changing calculation data in a calculation associated window (for example, a calculation window) (step P34: YES), the CPU 10 executes formula, coordinate, and matrix change processing according to the change operation (step P36), and updates calculation window display.

The CPU 10 determines whether or not the changed formula, coordinate, and matrix are registered in the link table 84 (step P38). Specifically, this determination is made according to whether or not the formula ID assigned to the changed formula, coordinate, and matrix are stored in the link table 84. If the CPU 10 determines that the changed formula, coordinate, and matrix are registered in the link table 84, the CPU 10 executes processing for deforming a geometrical graphic form object of the corresponding geometry associated window (step P40), and updates display of a geometrical window.

If the CPU 10 has sensed the user terminating operation (step P42: YES), the CPU 10 terminates this processing. Hereinafter, data input processing of the step P12, copy/drag processing of the step P20, and paste/drop processing of the step P24 will be described with reference to FIG. 43 to FIG. 47.

Figure 43:
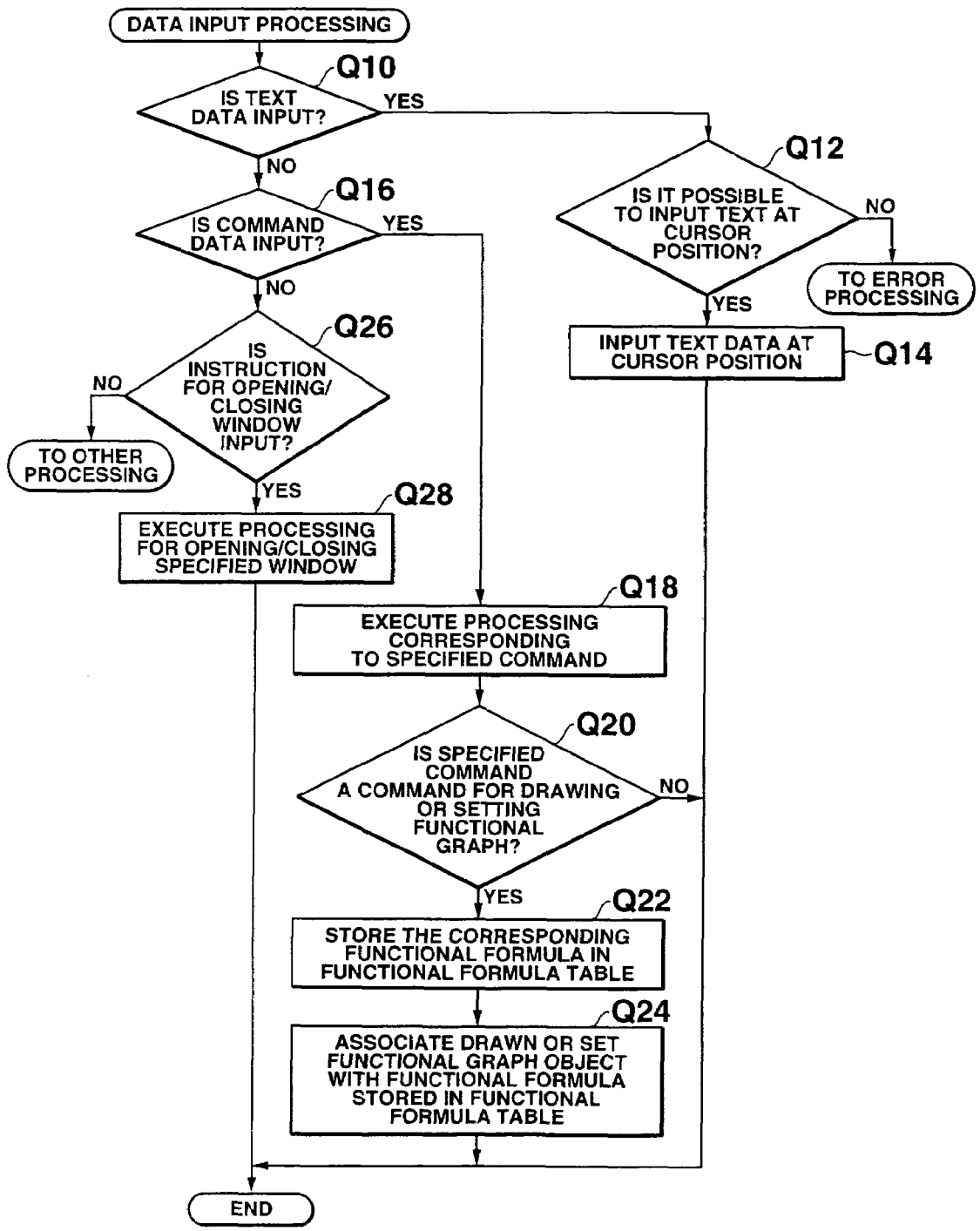
FIG. 43 is a view showing a flow of operation of the functional pocket calculator upon execution of data input processing.

First, the data input processing will be described here. FIG. 43 is a flow chart showing an operation of the functional pocket calculator 1 upon execution of the data input processing. If text data is input (step Q10: YES), the CPU 10 determines whether or not a cursor position of the specified window to which the text data is input can be input with text (step Q12). In the fifth embodiment, a case in which text data is input refers to a case in which a variety of formula data such as a coordinate value, a linear formula, an equation of circle/ellipse, and a functional formula are input to a calculation window.

If text input to a cursor position is impossible (step Q12: NO), the CPU 10 moves to error processing, and, for example, causes a display device 50 to display an error message and notify the fact. If text input to a cursor position is possible (step Q12: YES), the CPU 10 causes the input text data to be displayed at a cursor position of the specified window (step Q14).

If command data is input (step Q16: YES), the CPU 10 executes processing corresponding to the specified command with respect to the specified window to which the command data is input (step Q18). In the fifth embodiment, a case in which command data is input refers to a case in which commands for instructing drawing of a variety of geometrical graphic forms have been input to a geometrical window.

If the input command data is a command for drawing or setting a functional graph (step Q20: YES), the CPU 10 stores the corresponding functional formula in the functional formula table 83 (step Q22), and associates the functional graph object drawn or set in the specified window with the functional formula stored in the functional formula table 83 (step Q24). Specifically, the CPU 10 associates functional formula corresponding to the drawn or set functional graph object with the geometrical graphic form ID assigned to the functional formula, and stores them in the functional formula table 83. In addition, the CPU 10 associates the corresponding geometrical graphic form ID with the functional graph object drawn or set in the specified window.

If a window opening/closing instruction is input (step Q26: YES), the CPU 10 executes processing for opening/closing the specified window (step Q28). If the other input operations have been made, the CPU 10 moves to the corresponding other processing and executes them.

Figure 44:
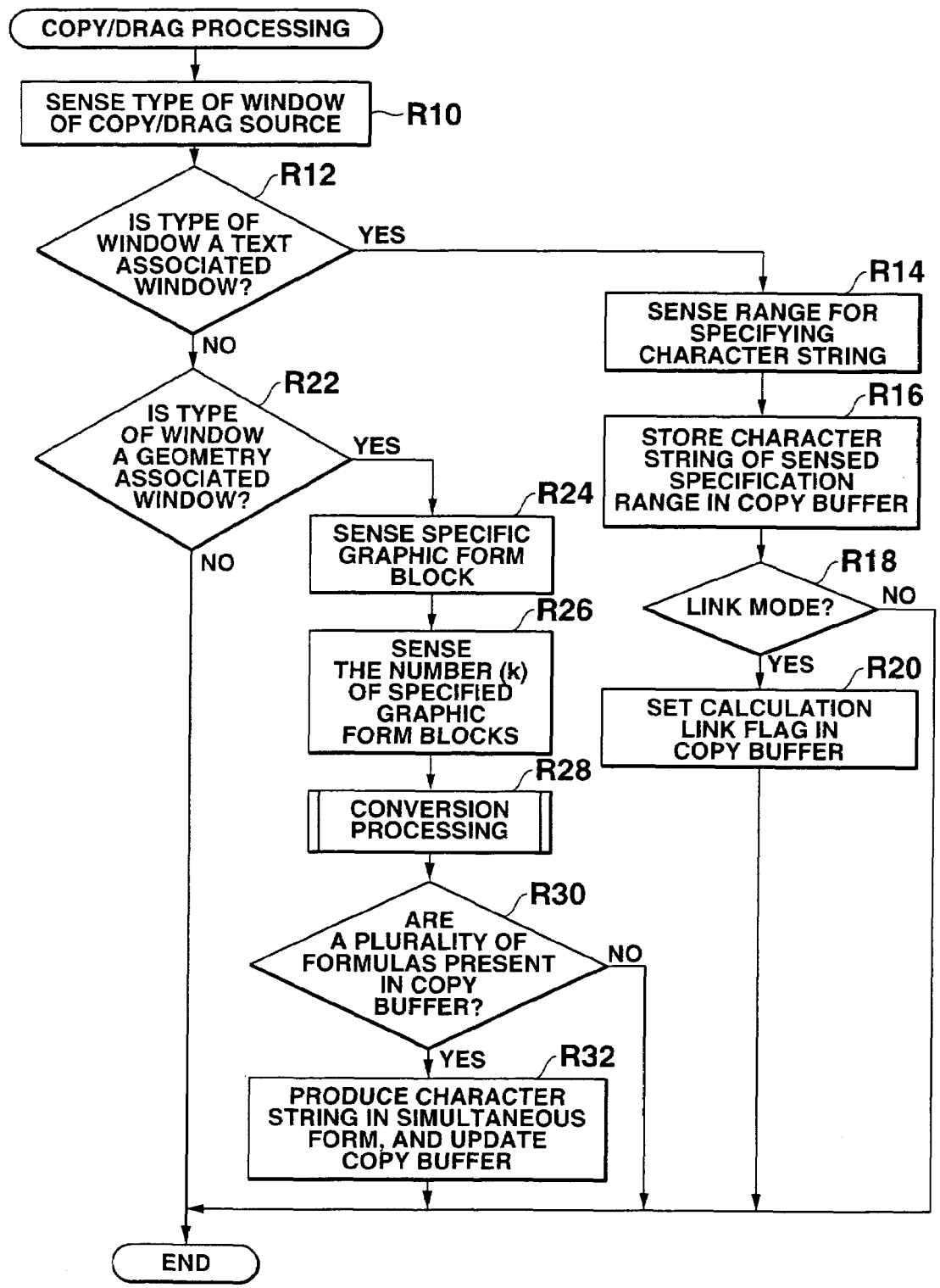
FIG. 44 is a view showing a flow of operation of the functional pocket calculator upon execution of copy/drag processing.

A description of the copy/drag processing will be given here. FIG. 44 is a flow chart showing an operation of the functional pocket calculator 1 upon execution of the copy/drag processing. The CPU 10 senses type of window of a copy/drag source (step R10).

If type of window of the copy/drag source is a text associated window (for example, a calculation window) (step R12: YES), the CPU 10 senses a range of specifying a character string (step R14). The CPU 10 stores the character string of the sensed specification range in the copy buffer 85 (step R16). If a link mode is set (step R18: YES), the CPU 10 sets the corresponding calculation link flag of the copy buffer 85 to "ON" (step R20), and terminates this processing.

If type of window of the sensed copy/drag source is a geometry associated window (for example, a geometrical window) (step R22: YES), the CPU 10 senses the specified graphic form block (a geometrical graphic form) (step R24). Hereinafter, type of configuration data of a graphic form block may be referred to as an object. After the CPU 10 has sensed the number (k) of the specified graphic form blocks (step R26), the CPU 10 executes conversion processing (step R28).

The CPU 10 determines whether or not a plurality of formulas are stored in the copy buffer 85. If a plurality of formulas are stored (step R30: YES), the CPU 10 produces a character string in which the plurality of formulas are expressed in a simultaneous form, updates the copy buffer 85 (step R32), and terminates this processing.

Figure 45:
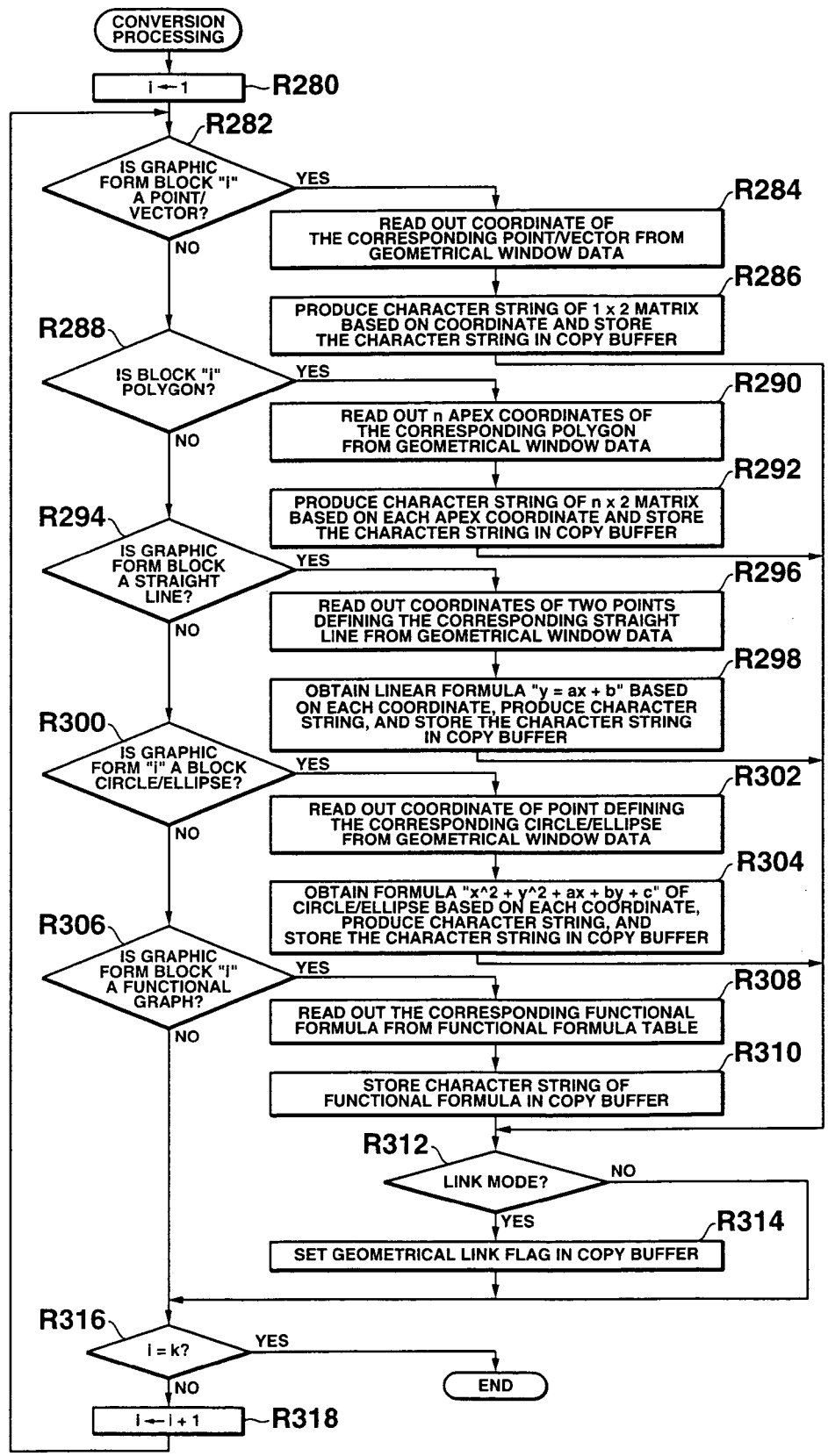
FIG. 45 is a view showing a flow of operation of the functional pocket calculator upon execution of conversion processing.

FIG. 45 is a flow chart showing an operation of the functional pocket calculator 1 upon execution of conversion processing. The CPU 10 substitutes "1" for variable "i" for determining whether or not processing is carried out for all of the sensed graphic form blocks (step R280).

If the CPU 10 determines that an "i"-th graphic foam block "i" is a point object or a vector object (step R282: YES), the CPU 10 reads out the coordinate of the corresponding point or the coordinate of the vector from geometrical window data 81 (step R284). Specifically, the CPU 10 refers to the geometrical window data 81, and reads out the corresponding coordinate based on the geometrical graphic form ID associated with the point object or vector object. The CPU 10 produces a character string of a 1×2 matrix based on the read out coordinate, and stores the character string in the copy buffer 85 (step R286).

If the CPU 10 determines that the graphic form block "i" is an polygon object (step R288: YES), the CPU 10 reads out the coordinates of apexes of the corresponding polygon from the geometrical window data 81 (step R290). The CPU 10 produces a character string of an n×2 matrix based on the read out apex coordinates, and stores the character string in the copy buffer 95 (step R292).

If the CPU 10 determines that the graphic form block "i" is a straight line object (step R294: YES), the CPU 10 reads out the coordinates of two points defining the corresponding straight line from the geometrical window data 81 (step R296). The CPU 10 obtains a formula "y=ax+b" (where "a" and "b" are constants) of the corresponding straight line based on the read out coordinates, produced a character string, and stores the character string in the copy buffer 85 (step R298).

If the CPU 10 determines that the graphic form block "i" is a circle object or an ellipse object (step R300: YES), the CPU 10 reads out a specific point coordinate defining the corresponding circle or ellipse from the geometrical window 81 (step R302). The CPU 10 obtains a formula "$x^2+y^2+ax+by+c$" (where "a," "b" and "c" are constants) of the corresponding circle or ellipse based on the read out specific point coordinate, produces a character string, and stores the character string in the copy buffer 85 (step R304).

If the CPU 10 determines that the graphic form block "i" is a functional graph object (step R306: YES), the CPU 10 reads out a functional formula from the functional formula table 806 (step R308: YES). Specifically, the CPU 10 refers to the functional formula table 806, and reads out the corresponding functional formula based on the geometrical graphic form ID associated with the functional graph object. The CPU 10 produces a character string indicating the read out functional formula, and stores the character string in the copy buffer 85 (step R310: YES).

After the CPU 10 has executed any processing from among the steps R286, R292, R298, R304 and R310, if a link mode is set (step R312: YES), the CPU 10 sets the corresponding geometrical link flag of the copy buffer 85 to "ON" (step R314).

After the CPU 10 has compared and determined a value of variable "i" and a value of the number "k" of graphic form blocks with each other, if the values are different from each other (step R316: NO), the CPU 10 increments "i," and updates it (step R318). Then, processing returns to the step R282 in which the above described processing is repeated for a next graphic form block "i."

If the values of the variable "i" and the number "k" of graphic form blocks are identical to each other (step R316: YES), the CPU 10 terminates this processing.

Figure 46:
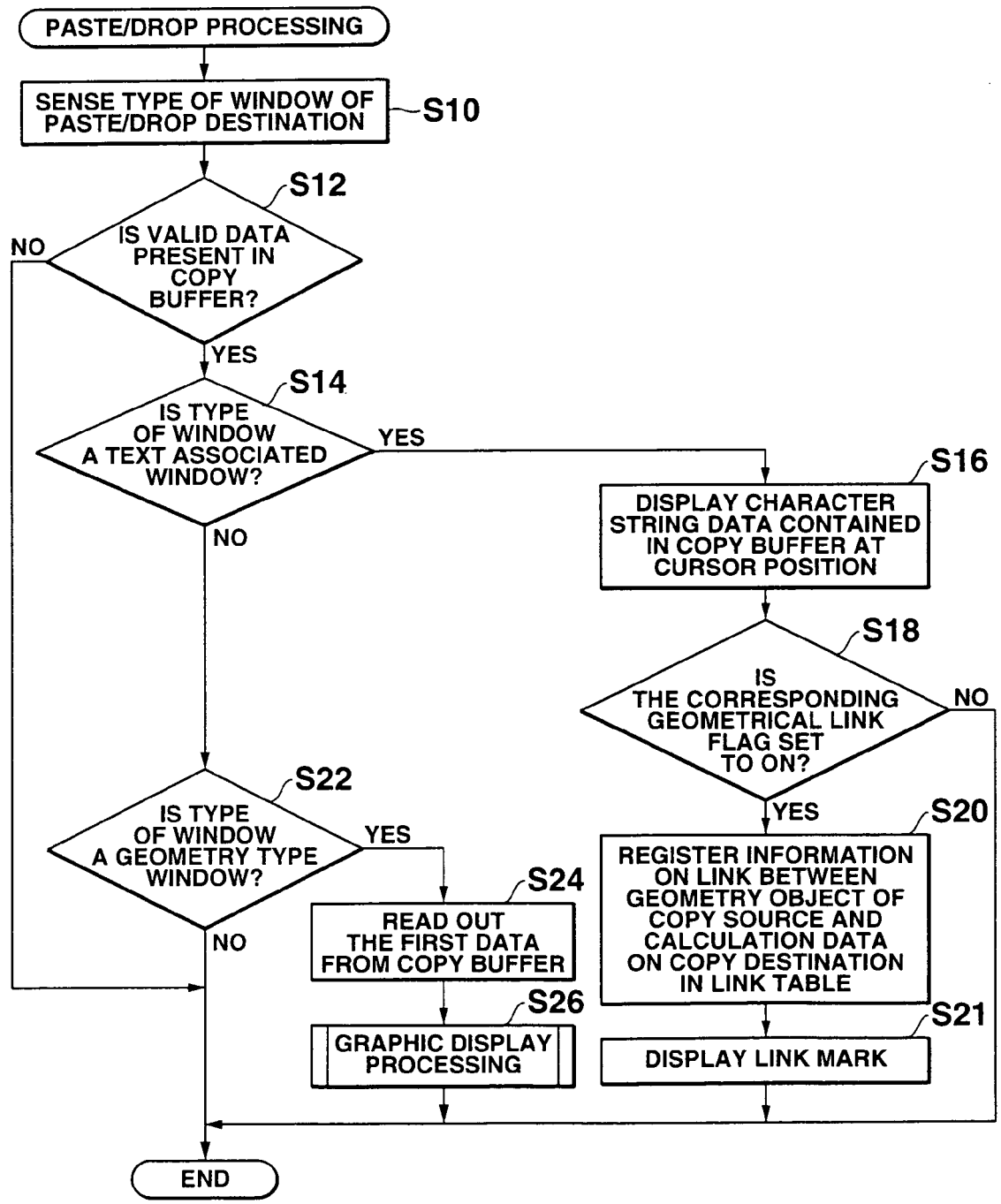
FIG. 46 is a view showing a flow of operation of the functional pocket calculator upon execution of paste/drop processing.

A description of paste/drop processing will be given here. FIG. 46 is a flow chart showing an operation of the functional pocket calculator 1 upon execution of the paste/drop processing. The CPU 10 senses type of window of a paste/drop destination (step S10). The CPU 10 determines whether or not valid data is present in the copy buffer 85 (step S12). If no valid data is present, the CPU 10 terminates this processing.

If valid data is stored in the copy buffer 85 and if type of window of the paste/drop destination is a text associated window (for example, a calculation window) (step S14: YES), the CPU 10 causes a character string stored in the copy buffer 85 to be displayed at a cursor position (step S16). At this time, the CPU 10 assigns the formula ID to the formula data corresponding to the character string, and updates the calculation window data 82.

If the geometrical link flag associated with the character string is set to "ON" in the copy buffer 85 (step S18: YES), the CPU 10 associates the geometrical graphic form ID of the geometrical graphic form object of the copy source with the formula ID of the calculation data, produces link information, and stores the link information in the link table 84 (step S20). The CPU 10 causes a link mark to be displayed at a predetermined position in the vicinity of the character string (step S21), and terminates this processing.

If type of window of the sensed paste/drop destination is a geometry associated window (for example, a geometrical window) (step S22: YES), the CPU 10 reads out the first data stored in the copy buffer 85 (step S24), executes graphic display processing (step S26), and terminates this processing.

Figure 47:
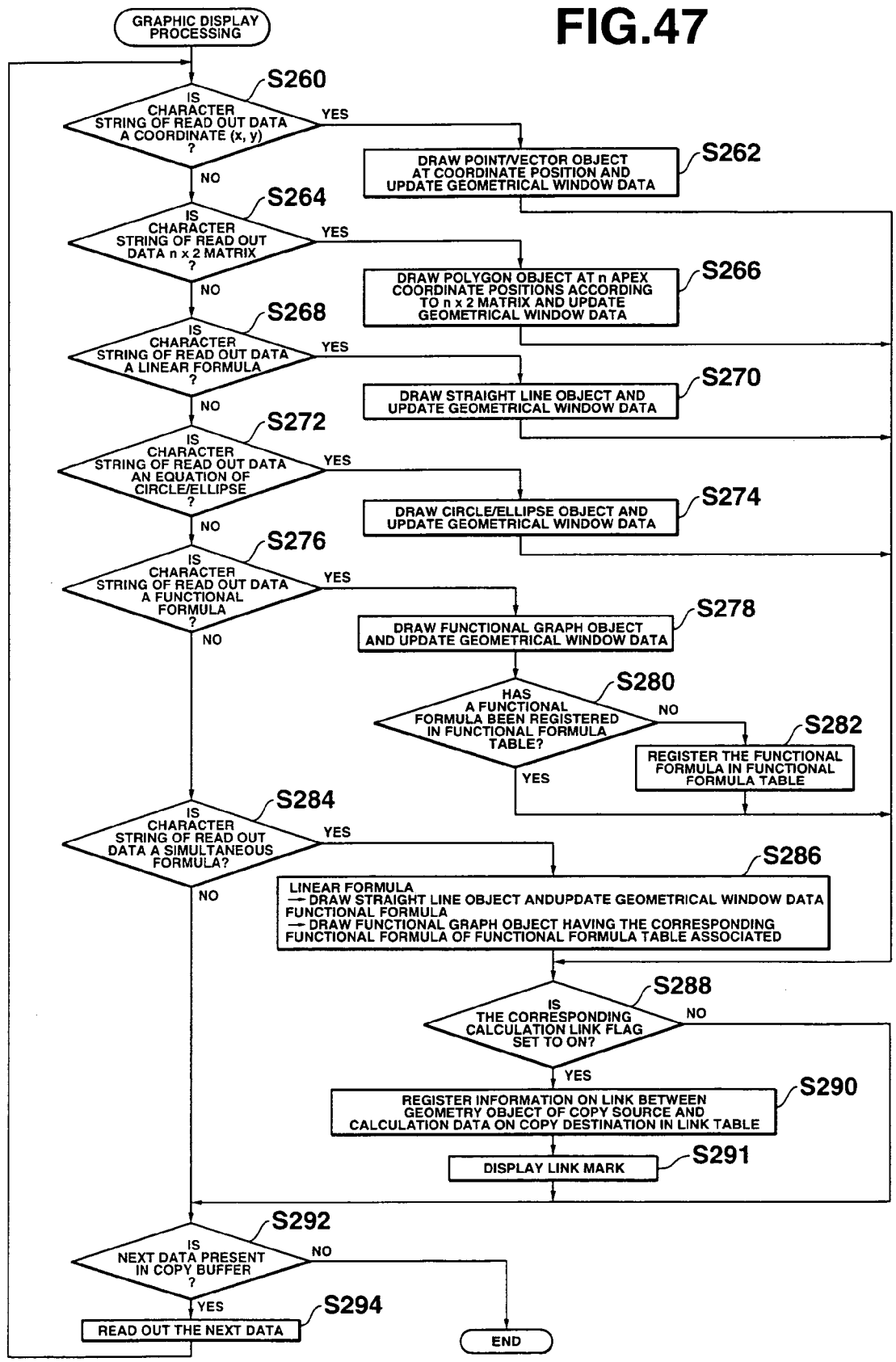
FIG. 47 is a view showing a flow of operation of the functional pocket calculator upon execution of graphical display processing.

FIG. 47 is a flow chart showing an operation of the functional pocket calculator 1 upon execution of the graphic display processing. If the read out data on the copy buffer 85 is a character string of a 1×2 matrix representing a coordinate which defines a point/vector (step S260: YES), the CPU 10 draws a point object or a vector object at the coordinate position, and updates the geometrical window data 81 (step S262). Specifically, the CPU 10 stores the geometrical graphic form ID assigned to the point/vector, geometry type "point" or "vector," and a coordinate of the point/vector to be associated with each other.

If the read out data in the copy buffer 85 is a character string of an n×2 matrix defining an polygon (step S264: YES), the CPU 10 draws an polygon object defining each coordinate configuring the n×2 matrix as an apex, and updates the geometrical window data 81 (step S266). Specifically, the CPU 10 stores in the geometrical window data 81 the geometrical graphic form ID assigned to the polygon, the geometry type "polygon," and apex coordinates each defining the polygon to be associated with each other.

If the read out data in the copy buffer 85 is a character string representing a linear formula (step S268: YES), the CPU 10 draws the corresponding straight line object, and updates the geometrical window data 81 (step S270). Specifically, the CPU 10 stores in the geometrical window data 81 the geometrical graphic form ID assigned to the straight line, the geometry type "straight line," and the coordinates of two points defining the straight line to be associated with each other.

If the read out data in the copy buffer 85 is a character string representing a formula of a circle or a formula of an ellipse (step S272: YES), the CPU 10 draws the corresponding circle object or ellipse object, and stores a specific point coordinate defining the circle or ellipse in the geometrical window data 81 (step S274). Specifically, the CPU 10 stores in the geometrical window data 81 the geometrical graphic form ID assigned to the circle or ellipse, the geometry type "circle" or "ellipse," and the specific point coordinate defining the circle or ellipse to be associated with each other.

If the read out data in the copy buffer 85 is a character string representing a functional formula (step S276: YES), the CPU 10 draws a functional graph object based on the functional formula, and updates the geometrical window data 81 (step S278). Specifically, the CPU 10 stores in the geometrical window data 81 the geometrical graphic form ID assigned to the functional formula and the geometrical type "functional graph" to be associated with each other.

The CPU 10 determines whether or not the corresponding functional formula is registered in a functional formula table 83 (step S280). If the determination result is negative, the CPU 10 registers the functional formula in the functional formula table 83 (step S282). Specifically, the CPU 10 stores in the functional formula table 83 the functional formula and the corresponding geometrical graphic formula ID to be associated with each other.

If the read out data in the copy buffer 85 is a character string representing a simultaneous form (step S284: YES) or if the formula configuring the simultaneous form is a linear formula, the CPU 10 draws the corresponding straight line object, and updates the geometrical window data 81. If the formula configuring the simultaneous form is a functional formula, the CPU 10 draws a functional graph object, updates the geometrical window data 81 and functional formula table 83, and associates the functional graph object with the functional formula stored in the functional formula table 83 (step S286).

After the CPU 10 has executed any processing in the steps S262, S266, S270, S274, S278 and S286, if the calculation link flag associated with the character string in the copy buffer 85 is set to "ON" (step S288: YES), the CPU 10 associates the formula ID of calculation data on a copy source with the geometrical graphic form ID of the geometrical graphic form object, produces link information, and stores the link information in a link table 884 (step S291). The CPU 10 causes a link mark to be displayed (step S291), and terminates this processing.

If next data is present in the copy buffer 85 (step S292: YES), the CPU 10 reads out the next data (step S294). Then, processing returns to the step S260 in which the above described processing is repeated for the read out next data.

Now, a description will be given with respect to a function for forming a link between a geometrical graphic form object of a geometrical window and calculation data on a calculation window.

Figure 48A:
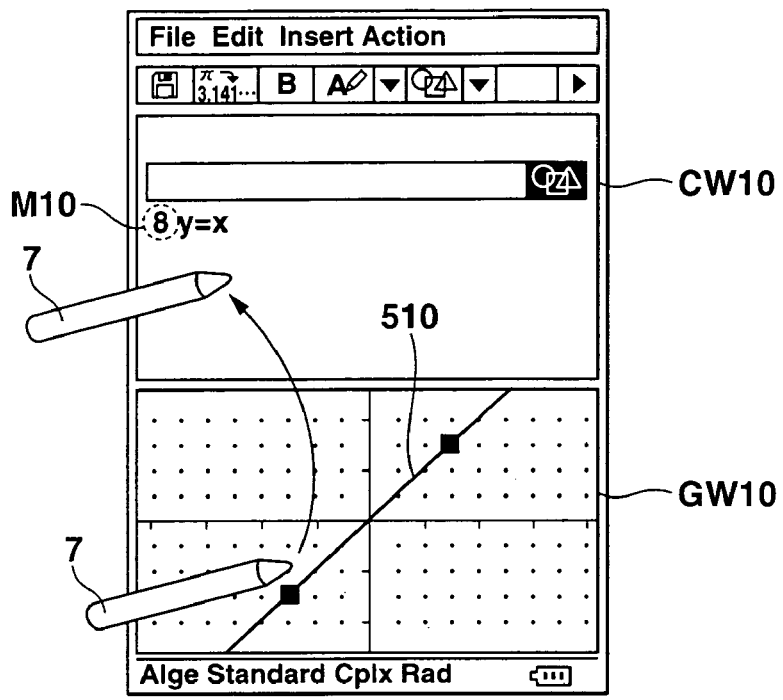
FIG. 48A, FIG. 48B and FIG. 48C are views for illustrating a link forming function.
Figure 48B:
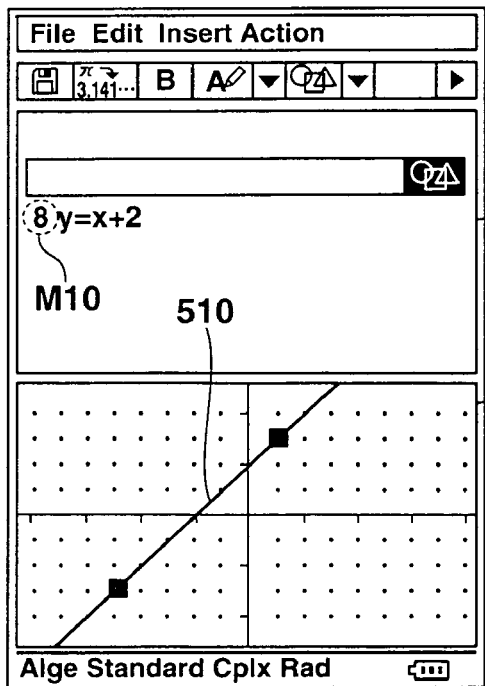
Figure 48C:
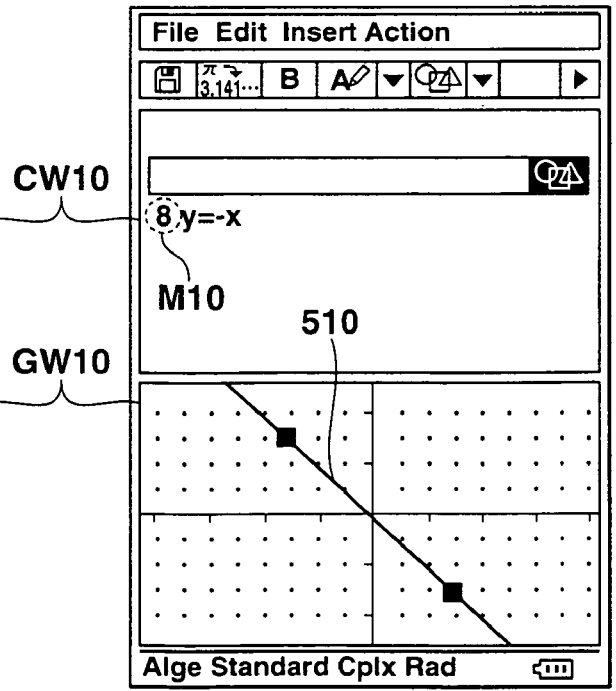

FIG. 48A to FIG. 48C are views for illustrating a link forming function in the fifth embodiment. For example, in a geometrical window GW10, a straight line drawing command is specified by using the input pen 7, a desired position is touched, and a straight line object 510 is drawn (step P10 of FIG. 42: YES→P12, step Q16 of FIG. 43: YES→Q18→Q20: NO). When an operation for setting a link mode is input by a button operation or the like using the input pen 7 (step P14 of FIG. 42), the link mode is set (step P16 of FIG. 42).

After the straight line object 510 is specified for a copy target by using the input pen 7, when a drag operation is started, copy/drag processing is carried out. Then, the specified straight line object 510 is converted into a linear formula, and is stored in the copy buffer 85 (step P18 of FIG. 42: YES→P20, steps R10→R12 of FIG. 44: NO→R22: YES→R24→R26→R28, steps R280→R294 of FIG. 45: YES→R296→R298→R312: YES→R314→R316: YES, step R30 of FIG. 44: NO).

When the straight line object 510 in which the drag operation is started is operated to be dropped by specifying a position on the formula window CW10 (step P22 of FIG. 42: YES→P24, steps S10→S12 of FIG. 46: YES→S14: YES), the linear formula "y=x" representing the segment object 180 is displayed to be pasted on a cursor position of the formula window CW10 (step S16 of FIG. 46), and a link mark M10 is displayed (step S18 of FIG. 46: YES→S20→S21).

For example, in the geometrical window GW10 shown in FIG. 48A, when the straight line object 510 is selected, a move operation is input, and a display position is changed to a position shown in FIG. 48B, calculation data "y=x+2" calculated based on the move operation amount is displayed in the formula window CW10 (step P26 of FIG. 42: YES→P28→P30: YES→P32).

Hereinafter, with reference to a screen change example shown in FIG. 49A to FIG. 53C, a description will be given with respect to a function for forming a link between a geometrical window and a calculation window, the geometrical window having displayed thereon geometrical graphic form objects which are different from each other in geometry type.

Figure 49A:
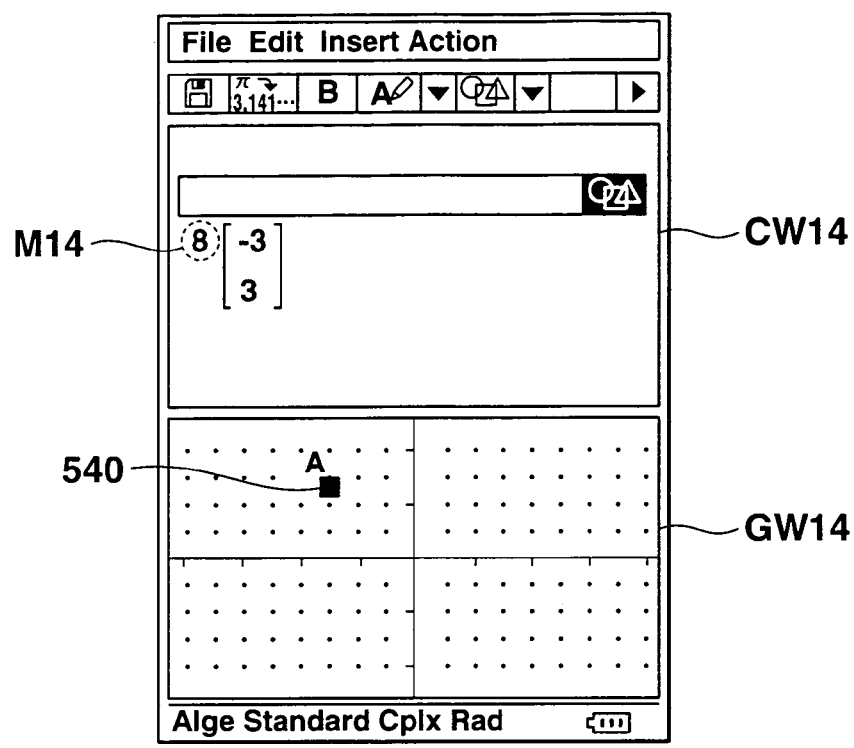
FIG. 49A and FIG. 49B are views each showing a screen change example when a link is formed.

For example, in the geometrical window GW14 shown in FIG. 49A, a point drawing command is specified by using an input pen or the like, a desired position is touched, and a point object 540 is drawn (step P10 of FIG. 42: YES→P12, step Q16 of FIG. 43: YES→Q18→Q20: NO). When an operation for setting a link mode is input by a button operation or the like using an input pen or the like (step P14 of FIG. 42), the link mode is set (step P16 of FIG. 42).

After the point object 540 is specified for a copy target by using an input pen or the like, when a drag operation is started, copy/drag processing is carried out. Then, the specified point object 540 is converted into a point coordinate, and is stored in the copy buffer 85 (step P18 of FIG. 42: YES→P20, steps R10→R12 of FIG. 44: NO→R22: YES→R24→R26→R28, steps R280→R282 of FIG. 45: YES→R284→R286→R312: YES→R314→R316: YES, step R30 of FIG. 44: NO).

When the point object 540 in which the drag operation is started is operated to be dropped by specifying a position on the formula window CW14 (step P22 of FIG. 42: YES→P24, steps S10→S12 of step S10: YES→S14: YES), a 1×2 matrix representing a coordinate (−3, 3) of point "A" is displayed to be pasted at a cursor position of the formula window CW14 (step S16 of FIG. 46), and a link mark M14 is displayed (step S18 of FIG. 46: YES→S20→S21).

Figure 49B:
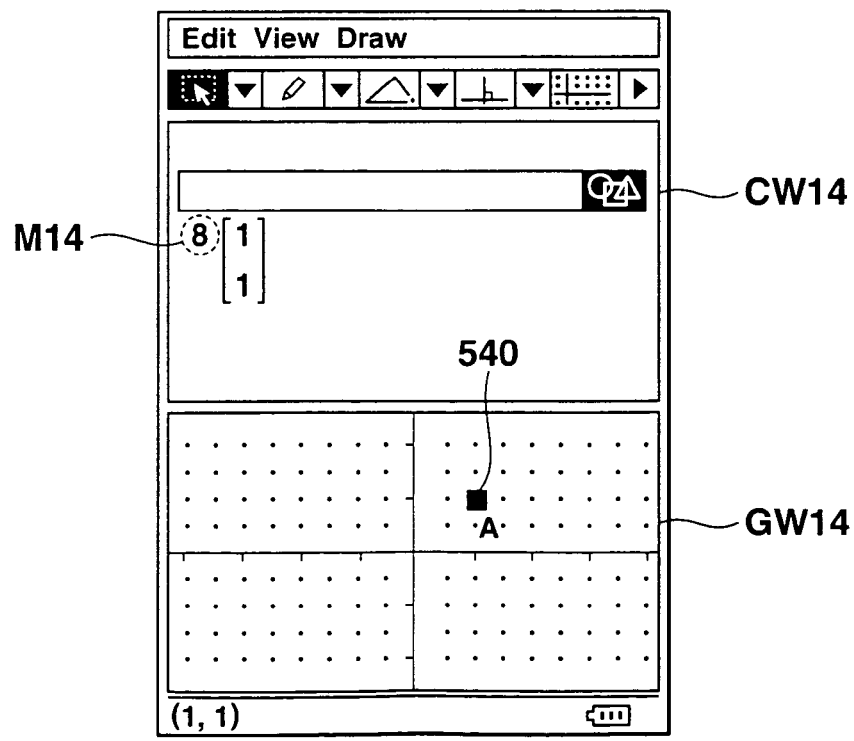

In the geometrical window GW14, after a move operation of a point object 540 is input, when a display position of the point object 540 is changed to a position shown in FIG. 49B, a 1×2 matrix is displayed based on a coordinate calculated based on a move operation amount (step P26 of FIG. 42: YES→P28→P30: YES→P32).

Figure 50A:
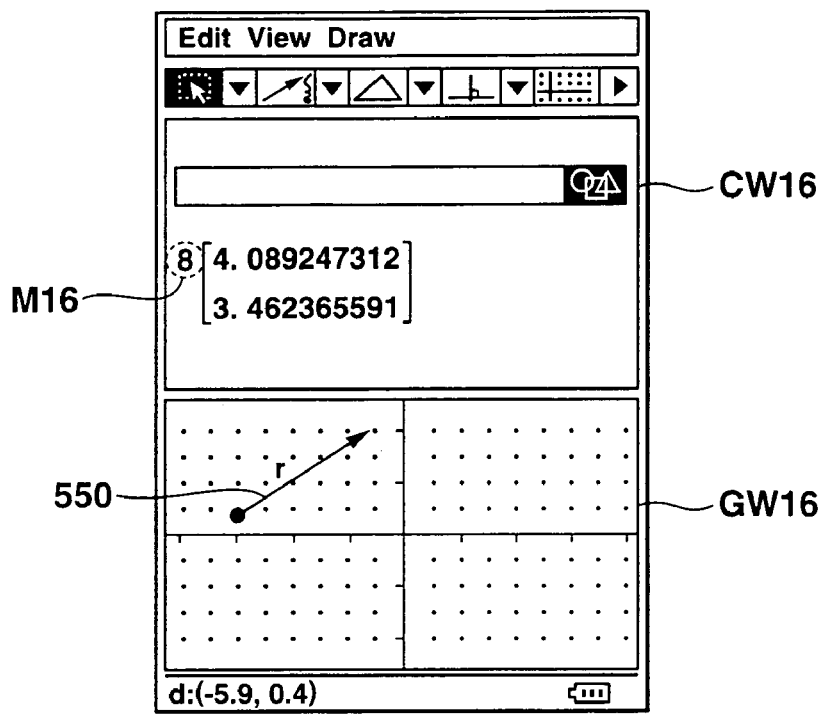
FIG. 50A, FIG. 50B and FIG. 50C are views each showing a screen change example when a link is formed.
Figure 50B:
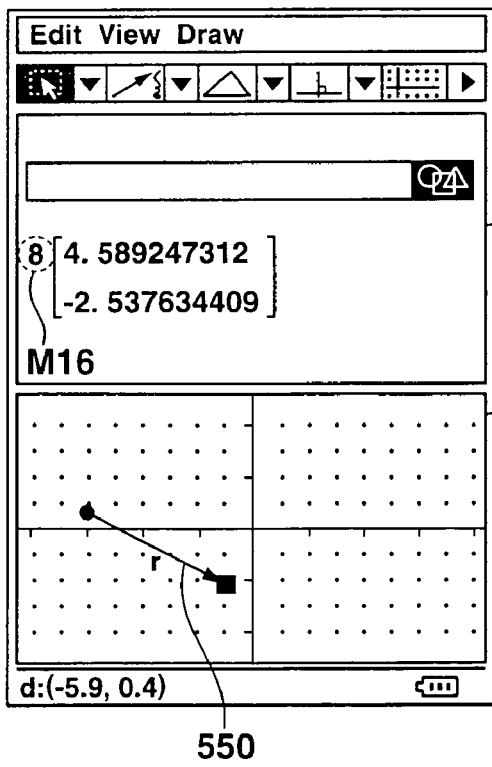
Figure 50C:
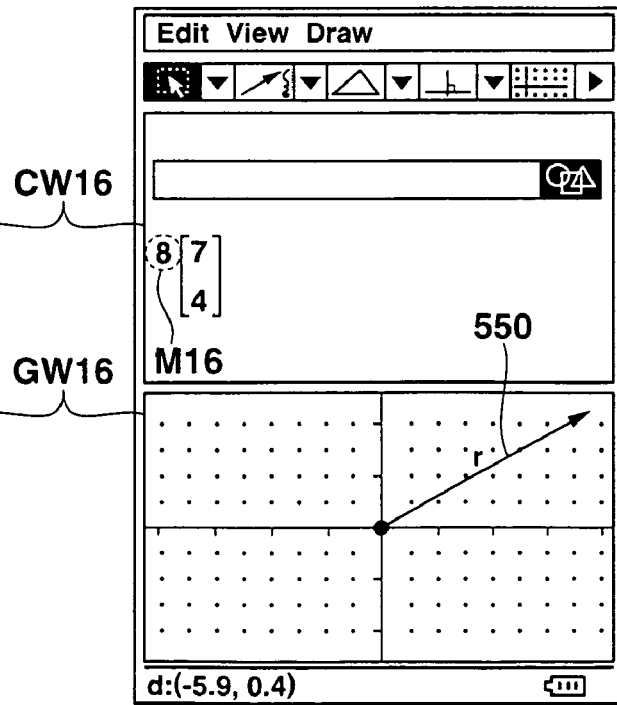

In the formula window CW16 shown in FIG. 50A, a vector drawing command is specified by using an input pen or the like, a desired position is touched, and a vector object 550 is drawn (step P10 of FIG. 42: YES→P12, step Q16 of FIG. 43: YES→Q18→Q20: NO) When an operation for setting a link mode is input by a button operation or the like using an input pen or the like (step P14 of FIG. 4), the link mode is set (step P16 of FIG. 42).

After a vector object 550 is specified for a copy target by using an input pen or the like, when a drag operation is started, a copy/drag processing is carried out. Then, the specified vector object 550 is converted into a vector coordinate, and is stored in the copy buffer 85 (step P18 of FIG. 42: YES→P20, steps R1→R12 of FIG. 44: NO→R22: YES→R24→R26→R28, steps R280→R282 of FIG. 45: YES→R284→R286→R312: YES→R314→R316: YES, step R30 of FIG. 44: NO).

After the vector object 550 in which the drag operation is started is operated to be dropped by specifying a position on the formula window CW16 (step P22 of FIG. 42: YES→P24, steps S10→S12 of FIG. 46: YES→S14: YES), a 1×2 matrix representing a vector coordinate is displayed to be pasted on a cursor position of the formula window CW16 (step S16 of FIG. 46), and a link mark M16 is displayed (step S18 of FIG. 46: YES→S20→S21).

Figure 51A:
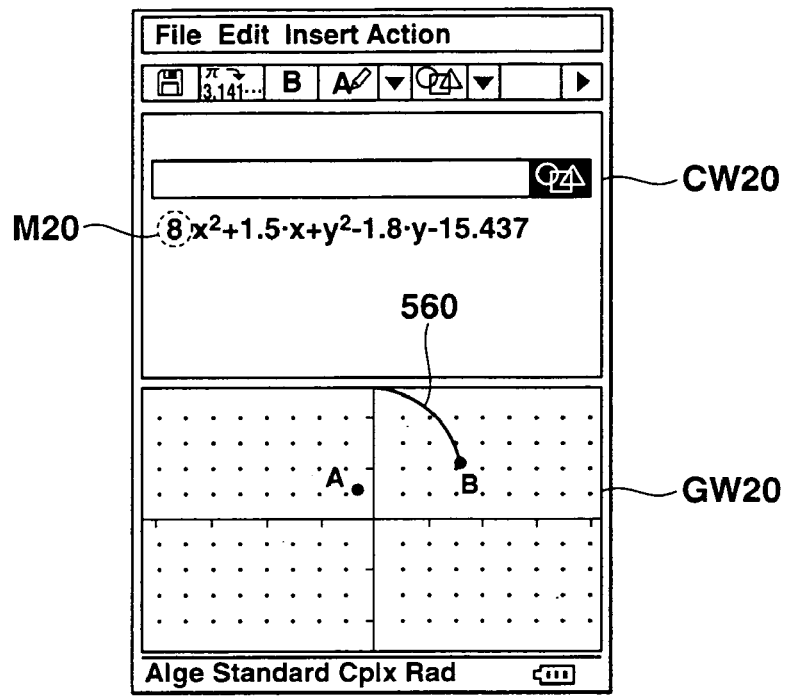
FIG. 51A, FIG. 51B and FIG. 51C are views each showing a screen change example when a link is formed.

In the geometrical window GW20 shown in FIG. 51A, an arc drawing command is specified by using an input pen or the like, a desired position is touched, and an arc object 560 is drawn (step P10 of FIG. 42: YES→P12, step Q16 of FIG. 43: YES→Q18→Q20: NO). When an operation for setting a link mode is input by a button operation or the like using an input pen or the like (step P14 of FIG. 42), the link mode is set (step P16 of FIG. 42).

After the arc object 560 is specified for a copy target by using an input pen or the like, when a drag operation is started, copy/drag processing is carried out. Then, the specified object 560 is converted into a circle formula and is stored in the copy buffer 85 (step P18 of FIG. 42: YES→P20, steps R10→R12 of FIG. 44: NO→r22: YES→R24→r26→R28, steps R280→R300 of FIG. 45: YES→R302→R304→R312: YES→R314→R316: YES, step R30 of FIG. 44: NO).

After the arc object 560 in which the drag operation is started is operated to be dropped by specifying a position on the calculation window CW20 (step P22 of FIG. 42: YES→P24, steps S10→S12 of FIG. 46: YES→S14: YES), an equation of a circle representing the arc object 560 is displayed to be pasted on a cursor position of the calculation window CW20 (step S16 of FIG. 46), and a link mark M20 is displayed (step S18 of FIG. 46: YES→S20→S21).

Figure 51B:
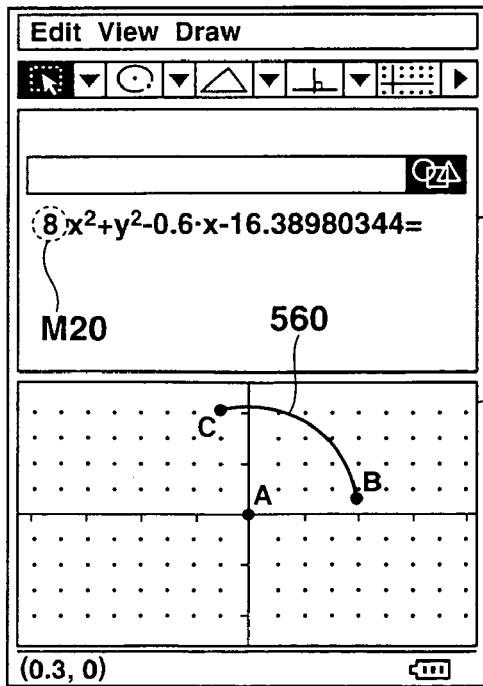
Figure 51C:
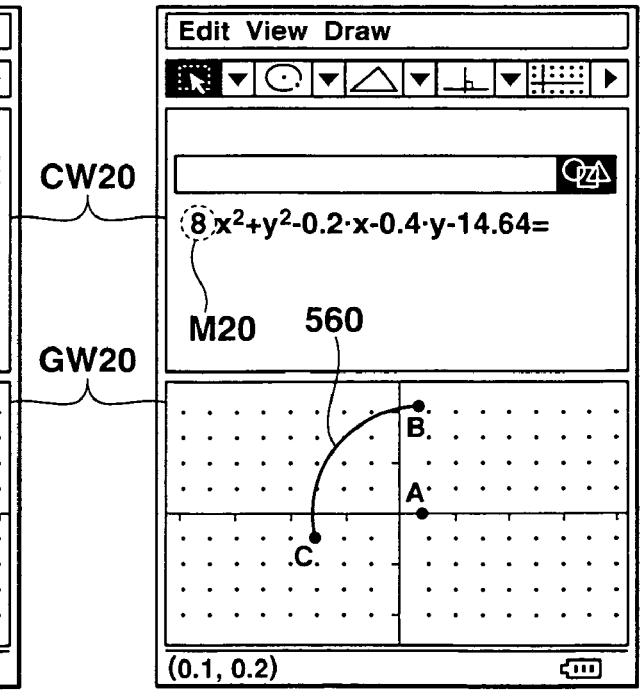

In the geometrical window GW20 shown in FIG. 51A, after a rotate/move operation is input for the arc object 560, when a display position is changed to a position shown in FIG. 51B, an equation of a circle calculated based on the rotate/move operation amount is displayed in the calculation window CW20 (step P26 of FIG. 42: YES→P28→P30: YES→P32). In the geometrical window GW20 shown in FIG. 51B, when the rotate/move operation is input for the arc object 560, as shown in FIG. 51C, an equation of a circle calculated based on the rotate/move operation amount is displayed similarly in the calculation window CW20.

Figure 52A:
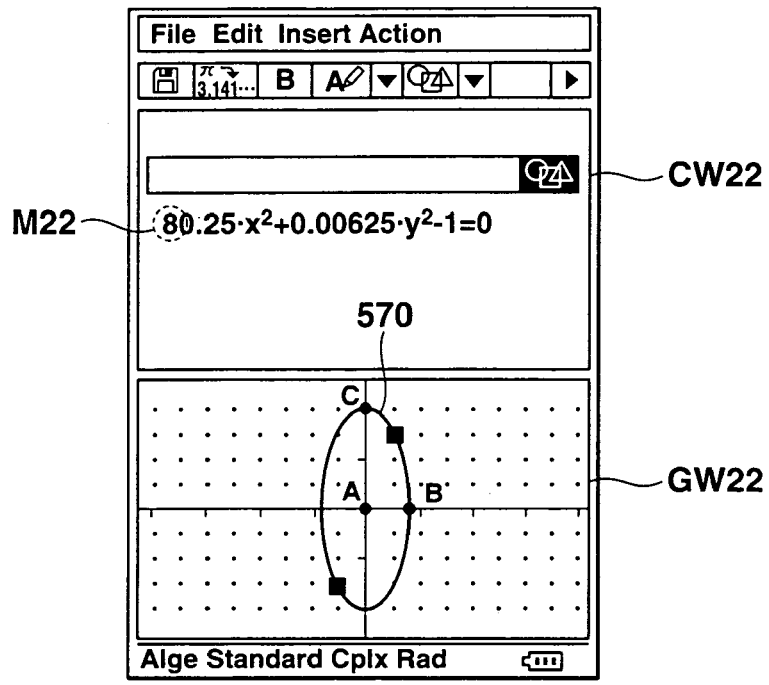
FIG. 52A, FIG. 52B and FIG. 52C are views each showing a screen change example when a link is formed.

In the calculation window CW22 shown in FIG. 52A, for example, an equation of an ellipse is input by using an input pen or the like, for example (step P10 of FIG. 42: YES→P12, step Q10 of FIG. 43: YES→S12: YES→Q14). When an operation for setting a link mode is input by a button operation or the line using an input pen or the like (step P14 of FIG. 42), the link mode is set (step P16 of FIG. 42).

After the equation of the circle is specified for a copy target by displaying the equation in inverse manner by an operation for specifying a range using an input pen or the like, when a drag operation is started, copy/drag processing is carried out, and an equation of the specified ellipse is stored in the copy buffer 85 (step P18 of FIG. 42: YES→P20, steps R10→R12 of FIG. 44: YES→R14→R16→R18: YES→R20).

When a character string region in which the drag operation is started is operated to be dropped on the geometrical window GW22 (step P22 of FIG. 42: YES→P24, steps S10→S12 of FIG. 46: YES→S14: NO→S22: YES→S24→S26, step S272 of FIG. 47: YES), an ellipse object 570 based on the equation of the specified ellipse is drawn in the geometrical window GW22 (step S274 of FIG. 47), and a link mark M22 is displayed (step S288 of FIG. 47: YES→S290→S291).

Figure 52B:
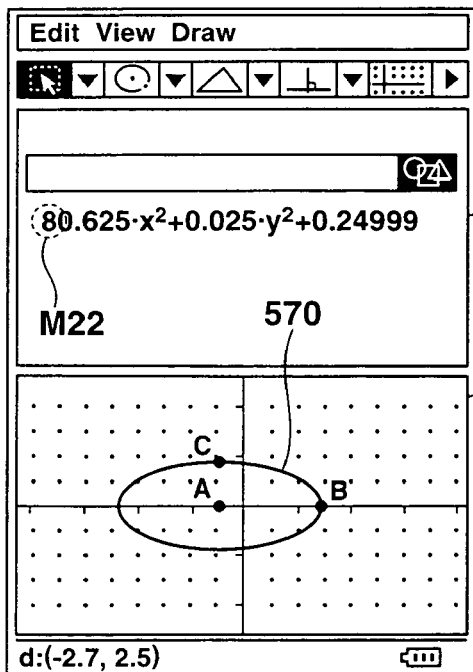
Figure 52C:
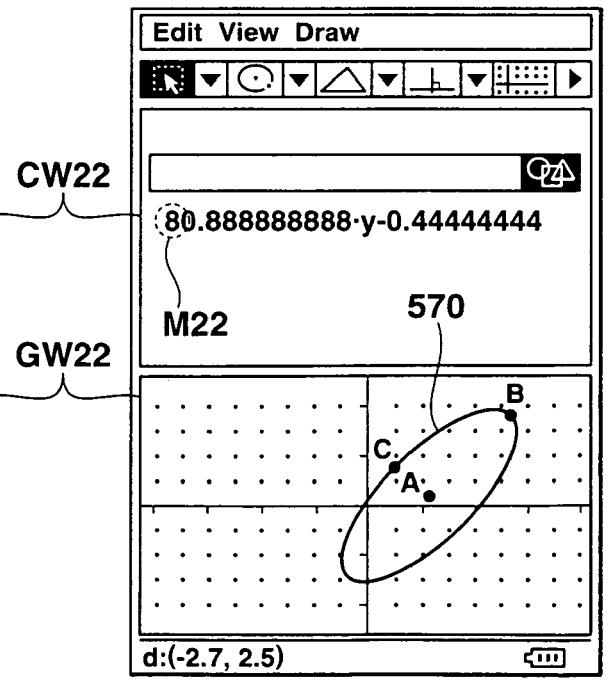

In the calculation window CW22 shown in FIG. 52A, when an equation of an ellipse is changed, as shown in FIG. 52B, the display of an ellipse object 570 displayed in the geometrical window GW22 is updated based on an equation of an ellipse after changed (step P34 of FIG. 42: YES→P36→P38: YES→P40). Further, when an equation of an ellipse is changed in the calculation window CW22 shown in FIG. 52B, the display of the ellipse object 570 displayed in the geometrical window GW22 is updated based on the equation of the ellipse after changed similarly, as shown in FIG. 52C.

Figure 53A:
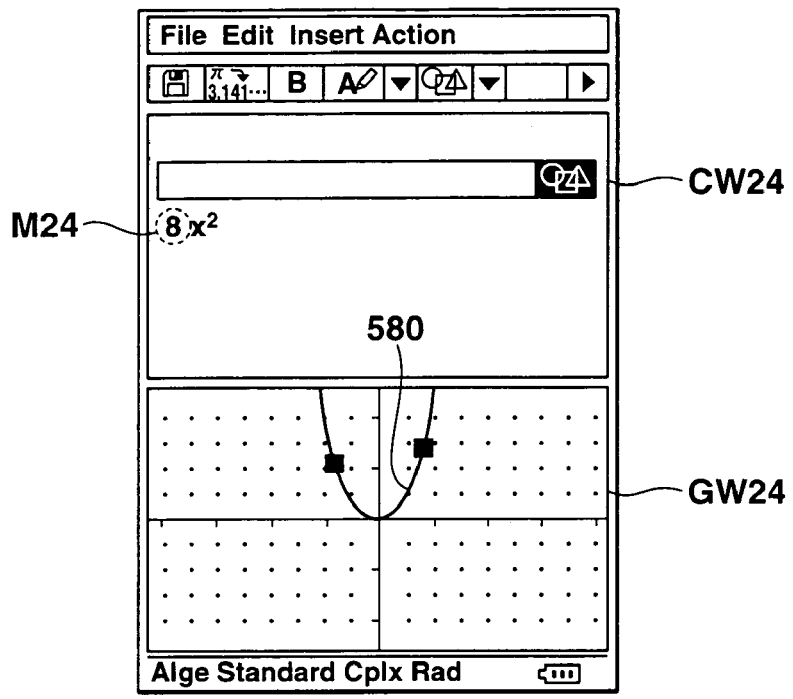
FIG. 53A, FIG. 53B and FIG. 53C are views each showing a screen change example when a link is formed.

In the geometrical window GW24 shown in FIG. 53A, for example, a functional formula window is input by using an input pen or the like (step P10 of FIG. 42: YES→P12, step Q10 of FIG. 43: YES→Q12: YES→Q14). When an operation for setting a link mode is input by a button operation or the like using an input pen or the like (step P14 of FIG. 42), the link mode is set (step P16 of FIG. 42).

After the functional formula is displayed in inverted manner and is specified for a copy target by an operation for specifying a range using an input pen or the like, when a drag operation is started, copy/drag processing is carried out, and the specified functional formula is stored in the copy buffer 85 (step P18 of FIG. 42: YES→P20, steps R10→R12 of FIG. 44: YES→R14→R16→R18: YES→R20).

When a character string region in which the drag operation is started is operated to be dropped on the geometrical window GW24 (step P22 of FIG. 42: YES→P24, steps S10→S12 of FIG. 46: YES→S14: NO→S22: YES→S24→S26, step S278 of FIG. 47: YES), the functional graph object 580 based on the specified functional formula is drawn in the geometrical window GW24 (step S278 of FIG. 47), and a link mark M24 is displayed (step S288 of FIG. 47: YES→S290→S291).

Figure 53B:
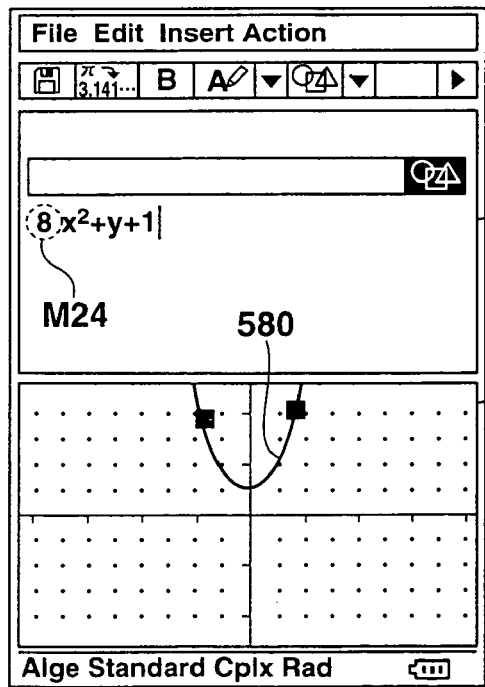
Figure 53C:
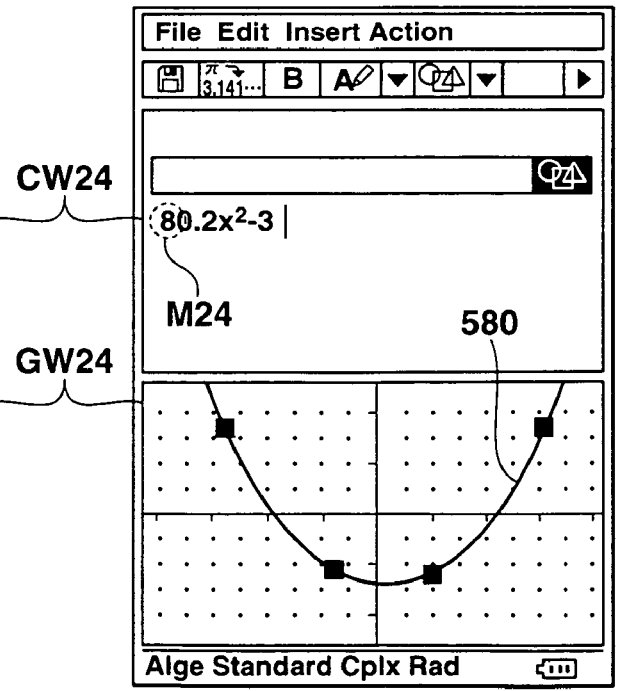

In the geometrical window GW24 shown in FIG. 53A, after a move operation of a functional graph object 240 is input, when a display position is changed to a position shown in FIG. 53B, a functional formula calculated based on the move operation amount is displayed in the calculation window CW24, as shown in FIG. 53B (step P26 of FIG. 42: YES→P28→P30: YES→P32). When a functional formula is changed in the calculation window CW24 shown in FIG. 53B, the display of a functional graph object 580 displayed in the geometrical window GW24 is updated based on a functional formula after changed, as shown in FIG. 53C (step P34 of FIG. 42: YES→P36→P38: YES→P40).

As is described above, according to the fifth embodiment, after the screen display content of either of the geometrical window and calculation window which are different from each other in display mode is selected, a copy operation is made, when the other screen is specified, and a paste operation is made, the screen display content of the selected one is displayed according to the display mode of the other screen. In addition, between the geometrical graphic form object or calculation data of the copy source and calculation data or a geometrical graphic form object of a copy destination, a link for associating them with each other can be formed.

For example, the geometrical graphic form object displayed on the geometrical window is selected, and the selected object is moved onto the calculation window by a drag and drop operation, whereby the calculation data (formula) corresponding to the geometrical graphic form object selected on the geometrical window is displayed at a cursor position of the calculation window, and a link for associating the geometrical graphic form object and calculation data with each other can be formed. In this manner, for example, after the geometrical graphic form object displayed on the geometrical window is selected, when a display position is changed by inputting an operation for deforming the geometrical graphic form object, the geometrical graphic form object can be deformed according to the deform operation.

The calculation data (formula) displayed in the calculation window is selected, and the selected data is moved onto the geometrical window by a drag and drop operation, whereby the geometrical graphic form object based on the calculation data (formula) selected on the calculation window is displayed on the geometrical window, and a link can be formed to associate the calculation data and geometrical graphic form object with each other. In this manner, for example, when an operation for changing calculation data is input in the calculation window, the geometrical graphic form object can be deformed according to the change operation.

Therefore, a function for forming a link can be utilized for study of a change in calculation data (such as formula or coordinate) after an operation for deforming a geometrical graphic form object or a change in a geometrical form object after an operation for changing the calculation data.

In the fifth embodiment, although a description is given with respect to a case in which copy data stored in the copy buffer 85 is defined as text data, the copy data may be stored in the copy buffer 85 in a data format of the geometrical graphic form object.

Geometry type of geometrical graphic form object displayed on the geometrical application may be a curve of negative function format or parameter format or a three-dimensional graphic form-and the like without being limited to the above described types.

Sixth Embodiment

Figure 54:
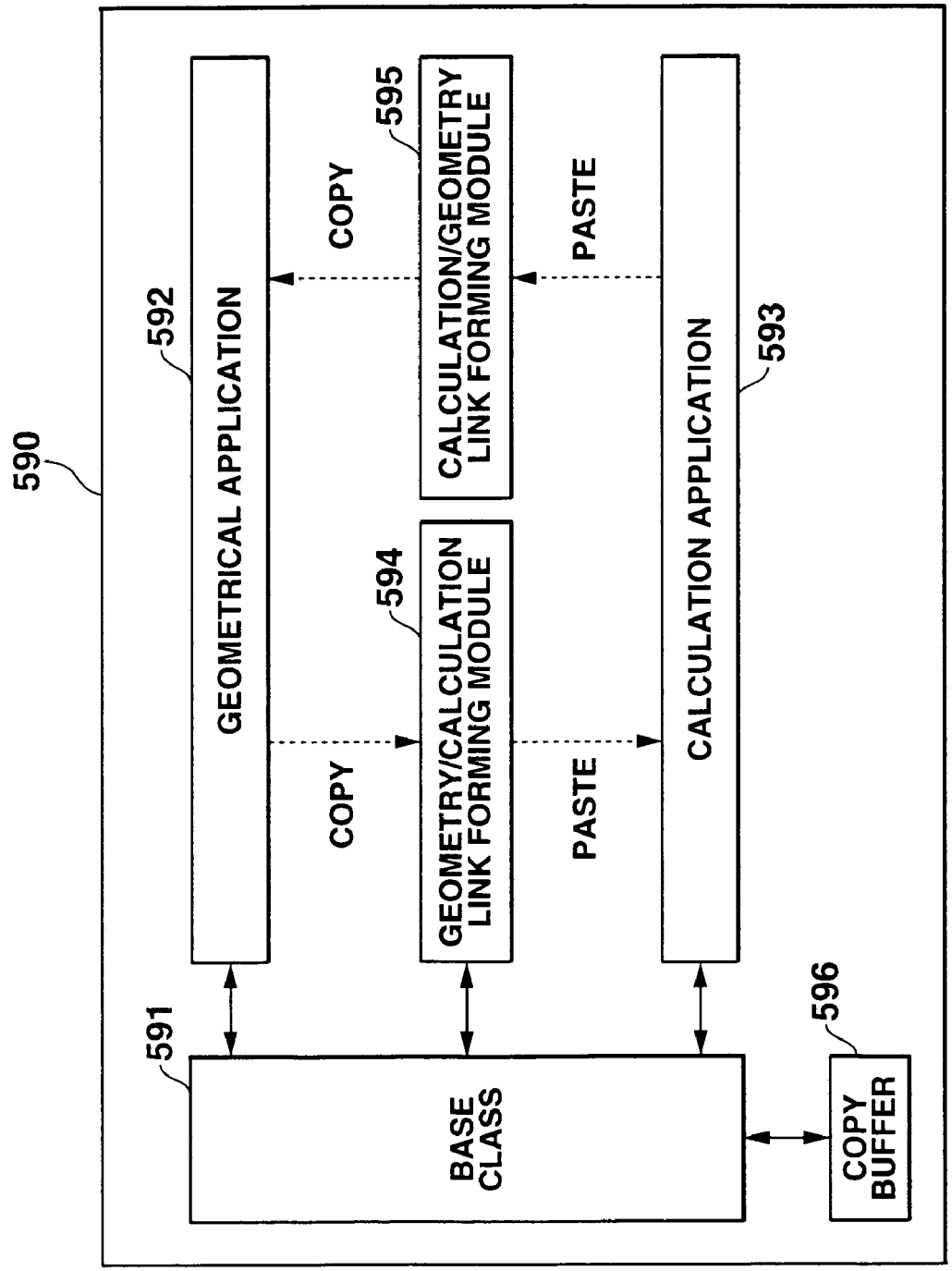
FIG. 54 is a view showing a conceptual drawing of a functional pocket calculator in a sixth embodiment.

A sixth embodiment according to the present invention will be described here. FIG. 54 is a conceptual view showing a functional pocket calculator 590 in the sixth embodiment. The functional pocket calculator 590 includes: programs executed by the CPU 10 such as a base class 591, a geometrical application program 592, a calculation application program 593, a geometry/calculation link forming module 594, and a calculation/geometry link forming module 595. When these programs are executed, the CPU 10 carries out processing by using a copy buffer 596 serving as a part of the RAM. Hereinafter, these programs will be primarily described for clarify. In actuality, these programs are executed and achieved by the CPU 10.

The base class 591 is a program for integrally managing a variety of application programs and a variety of modules which the functional pocket calculator 590 comprises, and controlling an operation of the functional pocket calculator 1. In particular, when the base class 591 monitors a copy and paste instruction by a drag and drop operation or the like between a geometrical window and a calculation window displayed on a display screen, if the base class has sensed a copy and paste operation from the geometrical window to the calculation window, the base class starts up the geometry/calculation link forming module 594. If the base class has sensed a copy and paste operation from the calculation window to the geometrical window, the base class starts up the calculation/geometry link forming module 595.

The geometrical application program 592 is an application program having a variety of geometrical graphic form drawing functions, and handles a geometrical model described in a data format which can be utilized by the geometrical application program 592.

The calculation application program 593 is an application program having a variety of calculation functions, and handles a formula model described in a data format which can be utilized by the calculation application program 593.

The geometry/calculation link forming module 594 converts the geometrical model stored in the copy buffer 595 into a formula model according to a copy and paste instruction to the calculation application program 592 of the geometrical model produced by the geometrical application program 592, and forms a link for associating the geometrical model and the formula model with each other.

The calculation/geometry link forming module 595 converts the geometrical model stored in the copy buffer 595 into a formula model according to a copy and paste instruction to the calculation application program 593 of the geometrical model produced by the geometrical application program 592, and forms a link for associating the geometrical model and the formula model with each other.

The copy buffer 596 is a storage region for temporarily storing the geometrical model copied by the geometrical application program 592 and the formula model copied by the calculation application program 593. This copy buffer is used as a work region when the geometry/calculation link forming module 594 forms a link by converting the geometrical model into the formula model, or alternatively, when the calculation/geometry link forming module 595 forms a link by converting the formula model into the geometrical model.

Figure 55:
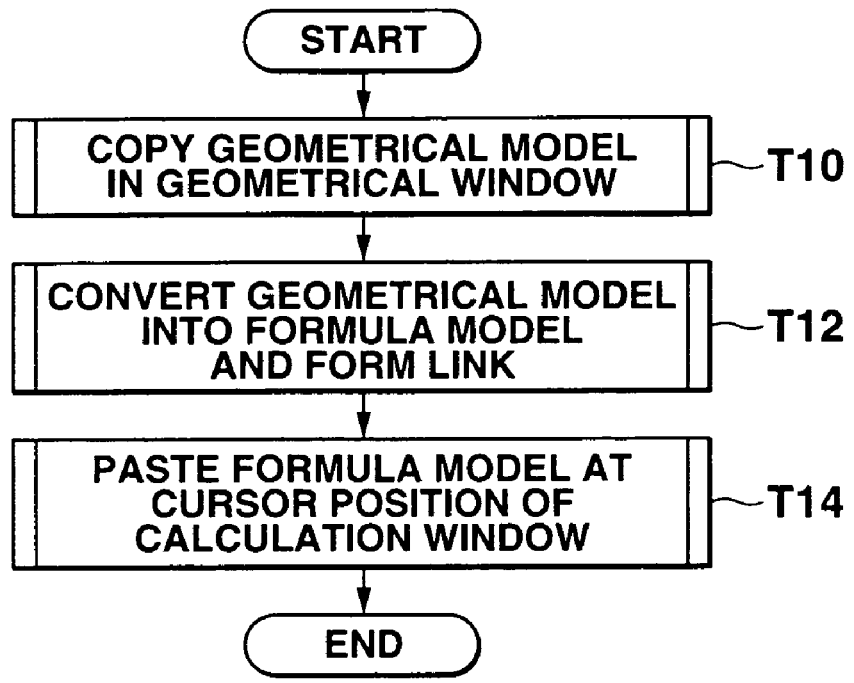
FIG. 55 is a flow chart showing an operation of the functional pocket calculator according to the forming of a link between a geometrical model and a formula model with a module for forming a geometrical/calculation link.

FIG. 55 is a flow chart showing an operation of the functional pocket calculator 1 according to the forming of a link between the geometrical model and the formula model by the geometry/calculation link forming module 595. When the base class 591 senses a copy operation of the geometrical model on the geometrical window, the geometrical application program 592 copies the selected geometrical model, and stores the geometrical model in the copy buffer 596 via the base class 591 (step T10). The geometry/formula conversion module 594 converts the geometrical model stored in the copy buffer 596 into the formula model, updates the copy buffer 596, and forms a link for associating the geometrical model and the formula model with each other between them (step T12). The calculation application program 593 reads out the formula model of the copy buffer 596 to paste the model onto a cursor position of the calculation window, and causes the formula model to be displayed on the calculation window (step T14).

Figure 56:
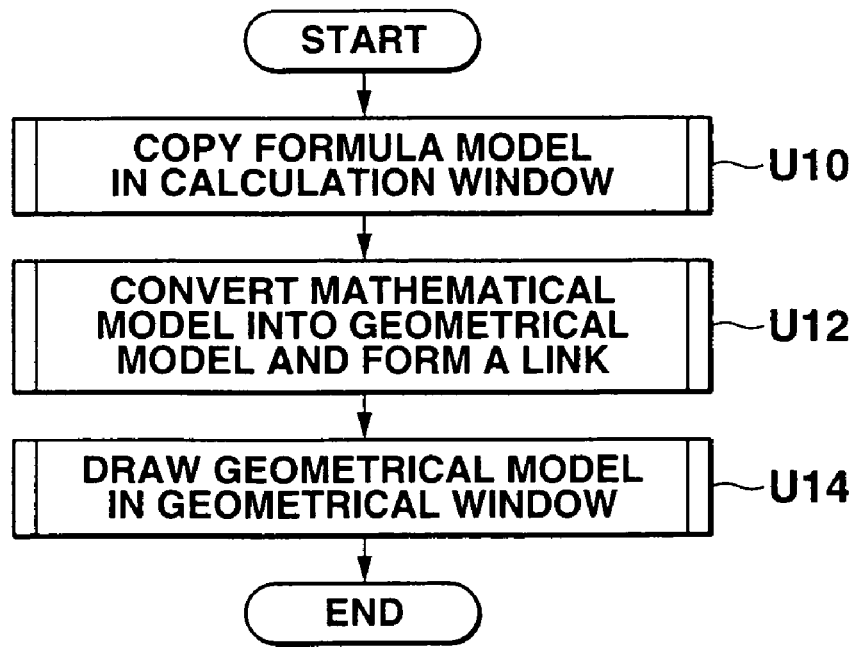
FIG. 56 is a flow chart showing an operation of the functional pocket calculator according to the forming of a link between a geometrical model and a formula model with a module for forming a geometrical/calculation link.

FIG. 56 is a flow chart showing an operation of the functional pocket calculator 1 according to the forming of a link between the geometrical model and the formula model by the calculation/geometry link forming module 596. When the base class 591 senses a copy operation of the formula model on the calculation window, the calculation application program 593 copies the selected formula model, and stores the formula model in the copy buffer 593 via the base class 591 (step U10). The calculation/geometry conversion module 250 converts the geometrical model stored in the copy buffer 596 into the formula model, updates the copy buffer 596, and forms a link for associating the geometrical model and the formula model with each other between them (step U12). The geometrical application program 592 reads out the formula model of the copy buffer 260 to paste the model onto a cursor position of the calculation window, and causes the formula model to be displayed on the calculation window (step U14).

As is described above, according to the sixth embodiment, there are provided conversion modules having described therein processing for converting the display mode of application data of a copy source into the display mode of application data of a copy destination, and forming a link for associating the data on the copy source with the data on the copy destination, thereby achieving a function for forming a link between applications which are different from each other in display mode.

In the sixth embodiment, although a description is given with respect to a function for forming a link between the geometrical application program and the calculation application program, for example, a function for forming a link between copy data between any application program which is different from each other in display mode such as a word processor software, a table calculation software, paint software, or a statistic software can be achieved by adding a conversion module having described therein processing for converting the display mode of an application program of a copy source into the display mode of an application program of a copy destination, and associating the data on the copy source and the data on the copy destination with each other.

For example, by adding to the functional pocket calculator 300, a conversion module for converting a geometrical model into a bit map image, and associating the geometrical model with the bit map image, thereby forming a link; and a conversion module for converting a bit map image into a geometrical model, and associating the bit map image with a geometrical model, thereby forming a link, it is possible to achieve a copy and paste function between the geometrical application program and a drawing application program which handles a bit map image such as paint software.

In the fifth and sixth embodiments, although a description is given with respect to a case of starting up two application programs, i.e., a geometrical application program and a calculation application program, thereby causing two screens, i.e., a geometrical window and a calculation window to be displayed on a display screen, of course, three or more application programs are started up, whereby a screen of a copy source and a screen of a copy destination may be properly selected.

Although the two embodiments have been described by way of example when the present invention is applied to a functional pocket calculator, of course, it is possible to achieve a graphic display control apparatus according to the present invention to a general-purpose computer or a personal computer and the like. Specifically, the above described programs are each configured as software running under an operating system (OS), and are stored in a variety of storage mediums such as a hard disk, a magnetic disk, and an optical disk. In this case, for example, a copy and paste instruction is input by a drag and drop operation using a pointing device such as a mouse.

Seventh and Eighth Embodiments

Figure 57:
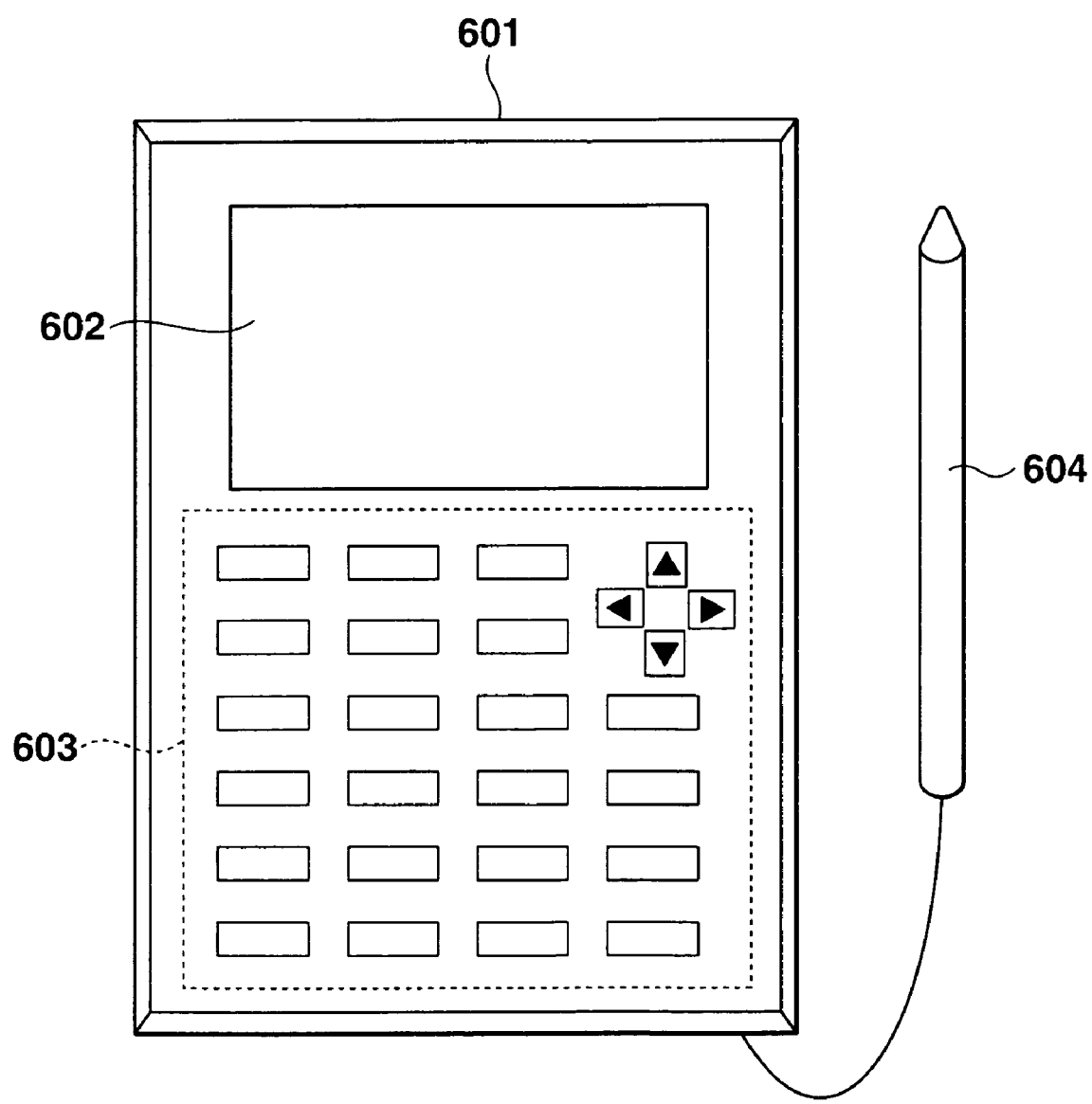
FIG. 57 is a view showing an example of appearance of a functional pocket calculator to which a seventh embodiment and an eighth embodiment of the present invention are applied.

FIG. 57 is an external view showing an example of a functional pocket calculator 601 in seventh and eighth embodiments of a functional pocket calculator to which the present invention is applied.

The functional pocket calculator 601 comprises a display 602, an input key group 603, and an input pen 604, which are incorporated in a main body of the functional pocket calculator 601. The keys each configuring the input key group 603 are assigned with their specific functions. A tablet (touch panel) 630 is integrally configured on the display 602 so that the tablet can sense the press and input by the input pen 604.

The functional pocket calculator 601 of the present embodiment comprises a variety of modes such as a formula processing mode for arithmetically operating a functional formula or a formula including a sign and a graphic display mode for displaying a graph based on a predetermined functional formula, wherein the corresponding keys of the input key group 603 are operated, thereby switching these modes.

<Configuration>

Figure 58:
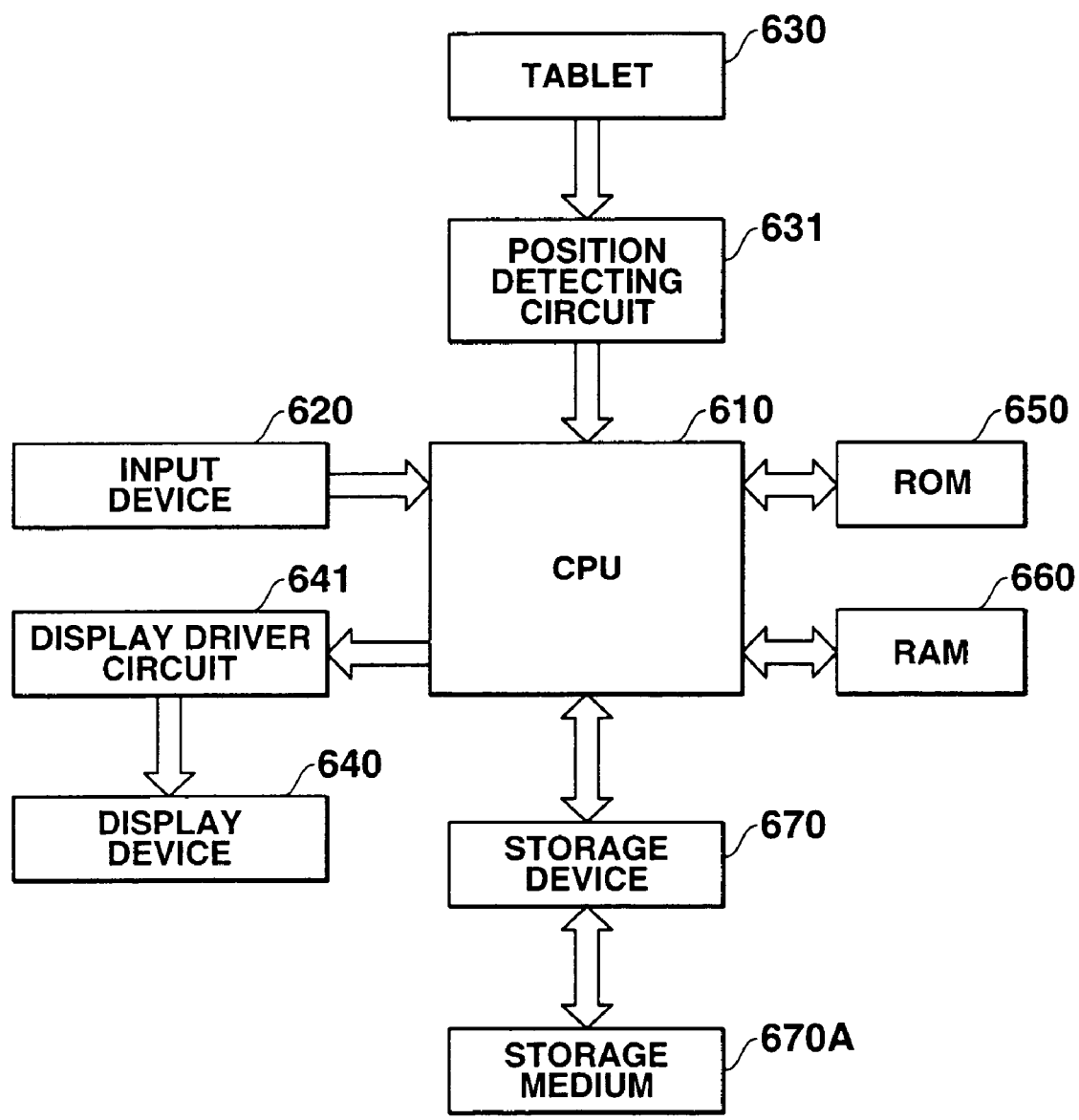
FIG. 58 is a block diagram drawing an internal configuration of the functional pocket calculator.

FIG. 58 is a block diagram drawing an internal configuration of the functional pocket calculator 601. The functional pocket calculator 601 has a CPU (Central Processing Unit) 610, an input device 620, a tablet 630, a position detecting circuit 631, a display driver circuit 641, a display device 640, a ROM (Read Only Memory) 650, a RAM (Random Access Memory) 660, a storage device 670, and a storage medium 670A.

The input device 620 is an input device which comprises a variety of keys required for an input of a numeric values or a formula or a functional selection and the like. This input device outputs an operating signal of a pressed key to the CPU 610. The input device 620 corresponds to a variety of key group 603 of FIG. 57.

The tablet 630 comprises a panel provided to be superimposed on over an entire display screen of the display device 640. The position detecting circuit 631 connected to the tablet 630 detects a position on the tablet 630 pressed by the input pen 604, and outputs the position to the CPU 610 as the coordinate data on the display screen. A position detecting method on the tablet 630 includes a method such as an electromagnetic inducting system, a magnetic strain system, or a pressure sensing system. Any of these methods may be used here.

A user can make a variety of input operations by pressing the display screen top of the display device 640 configured integrally with the tablet 630 by means of the input pen 604.

Figure 62A:
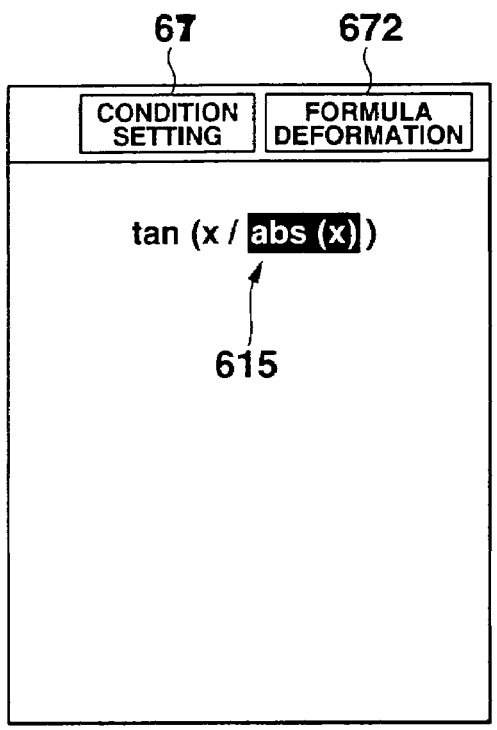
FIG. 62A, FIG. 62B and FIG. 62C are views each showing a change example of a display screen in the seventh embodiment.
Figure 62B:
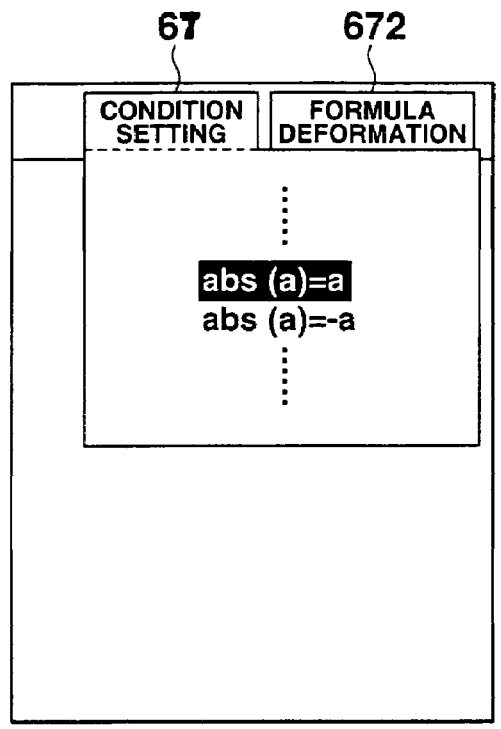
Figure 62C:
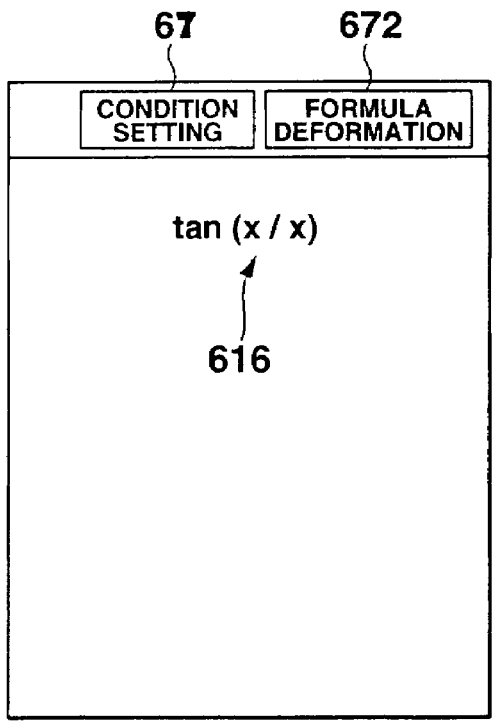

For example, in FIG. 62A, FIG. 62B and FIG. 62C, when a condition setting key 671 displayed on the upper part of the display screen or a position on which a formula deformation key 672 is displayed is pressed by the input pen 604, a coordinate value of the pressed position is detected by the position detecting circuit 631. The CPU 610 senses that the condition setting key 671 is input by the coordinate value input from the position detecting circuit 631.

Further, the user can move a part of the thus selected formula (term or factor or formula portion) up to a desired position on the display screen by a so called "drag" in which the input pen 604 is moved while being abutted against the display screen. Here, after dragging, an operation when the abutted input pen 604 is released from the display screen is referred to as a "drop."

The display driver circuit 641 controls a display device 640 to display a variety of screens based on a display signal input from the CPU 610. The display device 640 comprises a CRT (Cathode Ray Tube) display, an LCD (Liquid Crystal Display), and a TFT (Thin Film Transistor) display or the like. The display device 640 corresponds to the display 602 of FIG. 57.

The ROM 650 is a read only semiconductor memory, and stores an initialization program for carrying out a variety of initialization settings, hardware check, or required program loading and the like. The CPU 610 executes this initialization program when the functional pocket calculator 601 is powered ON, thereby setting operating environment of the functional pocket calculator 601.

The ROM 650 stores: a variety of control programs for operating the CPU 610 and application programs; and data such as parameters required for these programs. The CPU 610 executes these programs properly, thereby achieving a variety of functions included in the functional pocket calculator 601. A detailed description of the ROM 650 will be given in embodiments each described later.

The RAM 660 comprises: a program memory in which a variety of programs executed by the CPU 610 are developed; and a work memory having temporarily stored therein a processing result or the like which occurs when executing the above programs. A detailed description of the RAM 660 will be given in embodiments each described later.

The storage device 670 has the storage medium 670A which stores a program or data and the like. This storage medium 670A comprises a magnetic or optical storage medium 670A or a semiconductor memory. The storage medium 670A is fixedly provided in the storage device 670, or alternatively, is removably mounted. This storage medium 670A stores a variety of processing programs corresponding to the functional pocket calculator 601 or data processing processed based on the variety of processing programs. The programs or data and the like stored in the storage medium 670A may be configured to be stored after received from another device connected via a communication device (not shown). Further, these programs or data may be configured so as to be used after transferred from another device which comprises the storage medium 670A and storage device 670 via a communication line.

The CPU 610 reads out a predetermined program from the ROM 650 or storage medium 670A based on an instruction input via the input device 620 or tablet 630, develops the program in the RAM 660, executes a variety of processing based on the program, and intensively controls portions each configuring the functional pocket calculator 601. That is, the CPU 610 executes a variety of processing based on the read out predetermined program, temporarily stores the processing result in the RAM 660, outputs a display signal for displaying the processing result to the display driver circuit 641 as required, and causes the display device 640 to display the result.

Seventh and eighth embodiments according to the thus configured functional pocket calculator 601 will be described in order. In the following description, it is assumed that an input operation relevant to the functional pocket calculator 601 is performed via the tablet 630 unless otherwise specified.

Seventh Embodiment

The seventh embodiment will be described with reference to FIG. 59A to FIG. 62C.

The functional pocket calculator 601 in the seventh embodiment is featured in that part or all of formula (formula portion) on a display screen is selected by the input pen 604, and a numeric value condition is assigned to the selected screen, thereby executing deformation of the displayed formula. The formula portion selected here includes a sign, a constant, or a variable.

Figure 59A:
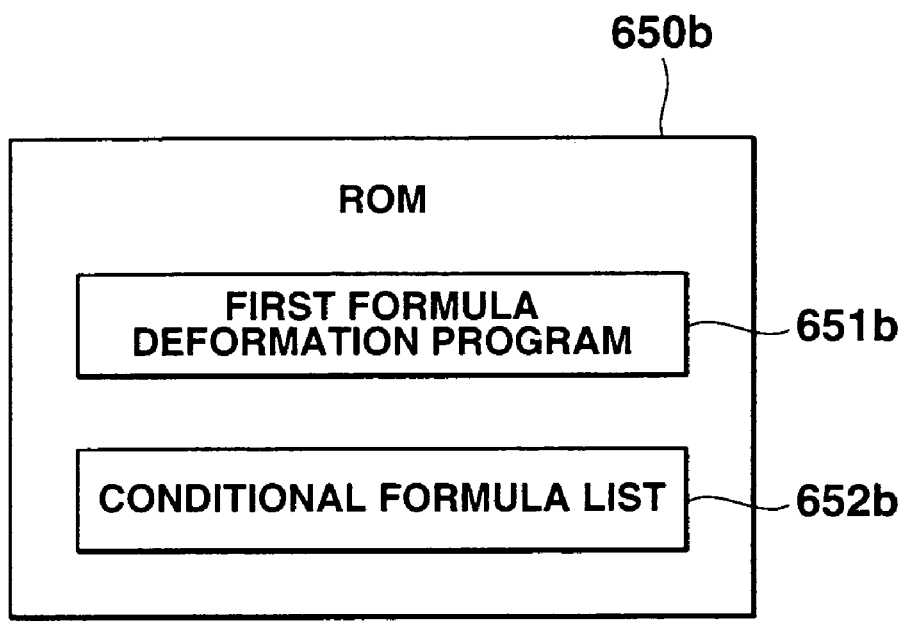
FIG. 59A is a view showing a configuration of a ROM in the seventh embodiment.
Figure 59B:
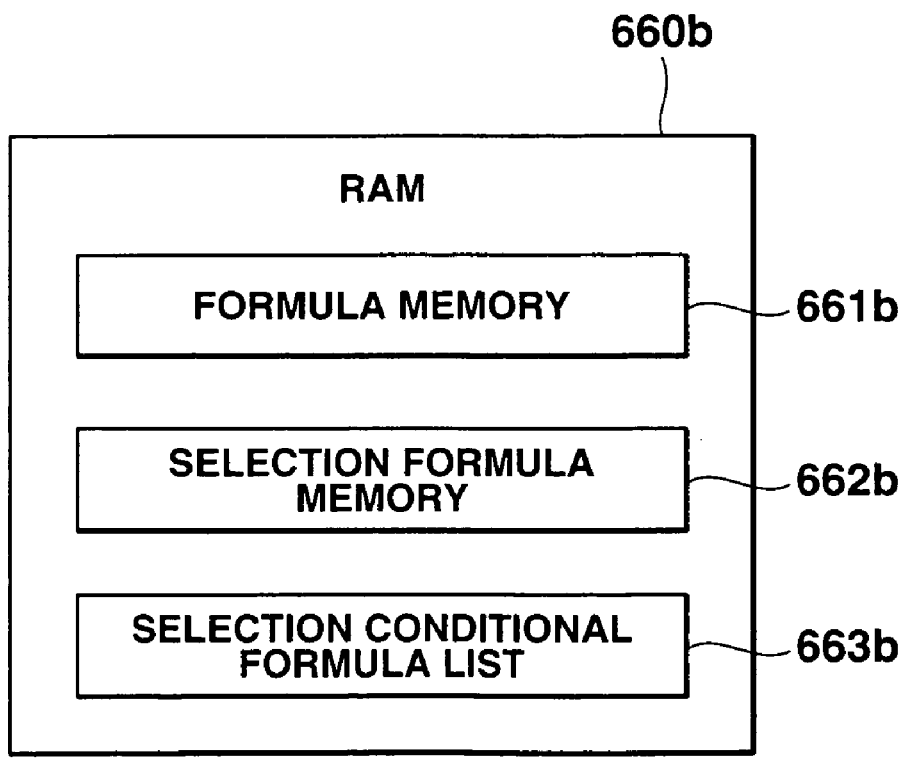
FIG. 59B is a view showing a configuration of a RAM in the seventh embodiment.

FIG. 59A is a view showing a configuration of a ROM 650b in the seventh embodiment. FIG. 59B is a view showing a configuration of a RAM 660b in the seventh embodiment.

According to FIG. 59A, the ROM 650b stores a first formula deformation program 651b and a deformation conditional formula list 652b. The first formula deformation program 651b is a program for achieving the seventh embodiment. In the seventh embodiment, the CPU 610 executes processing in accordance with the first formula deformation program 651b.

The deformation conditional formula list 652b is a list (listing) which stores a plurality of conditional formulas. FIG. 60 shows an example of the listings. The conditional formula used here is a formula for assigning a numeric value condition to a sign, a constant, or a variable included in a target formula (that is, a selected formula portion), thereby executing deformation of the formula. In the figure, the conditional formula is expressed in the name of "conversion means."

In FIG. 60, for example, a conditional formula "abs (a)=a" is a formula which assigns a condition "0 or a positive value" to a variable "a." This formula can execute deformation for removing an absolute value (abs). In addition, a conditional formula "abs (a)=−a" is a conditional formula which assigns a condition "a negative value" to the variable "a." This formula can execute deformation for removing the absolute value (abs).

Referring to FIG. 59B, the RAM 660b comprises a formula memory 661b, a selected formula memory 662b, and a selected conditional formula memory 663b.

The formula memory 661b sequentially stores the formulas displayed on a display screen.

The selected formula memory 662b stores part or all of the formulas selected by the user operation or input. Specifically, this memory 662b stores a term or a factor and the like included in the formula.

The selected conditional formula memory 663b stores a conditional formula selected by the user operation or input.

<Operation>

An operation of the functional pocket calculator 601 will be described here.

FIG. 61 is a flow chart for illustrating an operation of the functional pocket calculator 601 in the seventh embodiment, wherein processing is executed based on the first formula deformation program 651b. FIG. 62A to FIG. 62C are views each showing a change example of a display screen, wherein the screen is sequentially changed in order of FIG. 61A, FIG. 62B and FIG. 63C.

When a formula processing mode is selected by a mode switching operation, the CPU 610 starts execution of a predetermined program according to the formula processing mode, sets the formula processing mode, stands by for input of a formula or arithmetical operation instruction and the like targeted for processing, and starts execution of the first formula deformation program 651b. Then, the CPU 610 causes the input formula to be displayed on a display screen. Every time the arithmetical operation instruction is input, arithmetical operations are executed for the formula on one by one step basis, and the execution result is displayed.

FIG. 62A is a view showing an example of the display screen at this stage. Formula 615 expressed as formula (9) below is displayed on the display screen.

$$\tan(x/\mathrm{abs}(x)) \tag{9}$$

In this display screen, the user selects a desired portion to be deformed in formula 615 by means of the input pen 604. Then, the CPU 610 determines which portion of formula 615 is selected based on the coordinate value input from the position detecting circuit 631, and temporarily stores the portion of formula 615 determined to have been selected (hereinafter, referred to a "selected formula") in the selected formula memory 662b. That is, in FIG. 62A, it is determined that "abs (x)" of formula 615 is selected, and the selected portion is temporarily stored as a selected formula in the selected formula memory 662b.

Further, the user inputs a condition setting key 671 provided at the upper part of the display screen by means of the input pen 604. When input of the condition setting key 671 is sensed (step W21), the CPU 610 refers to the deformed conditional formula list stored in the ROM 650b, and displays a plurality of conditional formulas to be listed, as shown in FIG. 62B, for example (step W22).

FIG. 62B is a view showing an example of the display screen at this stage.

On the display screen, the condition setting key 671 is input, and a plurality of conditional formulas "abs (a)=a" and "abs (a)=−a" are displayed to be listed. The conditional formulas displayed here are included in the deformed conditional formula list 652b.

In this display screen, the user selects a conditional formula to be applied to the previously selected portion (selected formula) of formula 615 from among the conditional formulas displayed to be listed. When selection of the conditional formula is sensed, the CPU 610 determines which conditional formula is selected based on the coordinate value input from the position detecting circuit 631. That is, in FIG. 62B, the CPU 610 determines that "abs (a)=a" is selected (step W23). The conditional formula "abs (a)=a" used here denotes a deformation for assigning a condition "0 or a positive value" to the variable "a," and removing an absolute value, as described above.

When the conditional formula is selected, the CPU 610 determines the presence or absence of a selected formula. That is, the CPU 610 determines the presence or absence of a selected formula temporarily stored in the selected formula memory 662b. Here, it is determined that "a selected formula is present" (step W24).

If it is determined that "a selected formula is present" (step W24: YES), the CPU 610 determines whether or not this selected formula coincides with the above selected conditional formula (hereinafter, occasionally referred to as a "selected conditional formula"), that is, whether or not the selected formula can be deformed in accordance with the selected conditional formula. The selected formula "abs (x)" is used here, and the selected conditional formula "abs (a)=a" is used here. That is, the selected formula can be deformed in accordance with the selected conditional formula, and thus, the CPU 610 determines that the formula coincides with the selected conditional formula (step W25).

If it is affirmatively determined (step W25: YES), the CPU 610 deforms the selected formula in accordance with the selected conditional formula. That is, a condition "positive value" is assigned to a variable "x" included in a selected formula "abs (x)" in accordance with "abs (a)=a," and the formula is deformed as formula "x" whose absolute value (abs) is removed (step W26).

When the selected formula is deformed in accordance with the selected conditional formula, the CPU 610 replaces the selected formula of formula 615 which is currently displayed with a formula after deformed, and generates a new formula 616, as shown in formula (10) below $$\tan(x/x) \qquad (10)$$

The generated formula 616 is displayed as shown in FIG. 62C, for example, and a display screen is updated (step W28).

FIG. 62C is a view showing a display screen after deformed. On the display screen, instead of formula 615, formula 616 is displayed such that the selected formula "abs (x)" in formula 615 is replaced with "x" after deformed. In this manner, the CPU 610 executes deformation for formula 615.

In the step W24, if it is determined that "no selected formula is present" (step W24: NO), the CPU 610 redisplays the display screen shown in FIG. 62A, for example, (step W28) and terminates this processing, because no formula is targeted to be deformed by the selected conditional formula.

In the step W25, if it is determined that the selected conditional formula does not coincide with the selected formula (step S25: NO), the CPU 610 invalidates the selected formula, redisplays the display screen shown in FIG. 62A, for example (step W28), and terminates this processing.

As is described above, according to the seventh embodiment, deformation which is not always equivalent can be executed.

For example, according to the above described example, the selected formula "abs (x)" can be deformed to the two formulas which are different from each other depending on the value of "x," i.e., "x" and "−x." The former is deformation which is met under a condition "x≧0", and the latter is deformation which is met under a condition "x<0." Thus, according to a conventional formula processing function, only deformation which is always equivalent is executed, and arithmetical operation stops here.

However, according to the seventh embodiment, arithmetical operation can be continued by inputting the condition. If an applicable conditional formula is present irrespective of whether the input condition is correct or incorrect (applicable or not), deformation can be executed. That is, there is a possibility that "incorrect arithmetical operation" is carried out. Therefore, in a case in which a formula is used for learning mathematics or the like, for example, even if a user (student) does not understand the condition clearly, arithmetical operation is executed. Thus, the user (student) can think "why this mistake occurs," and the usability can be improved more significantly.

Eighth Embodiment

An eighth embodiment will be described with reference to FIG. 63A to FIG. 68D.

A functional pocket calculator 601 in the eighth embodiment is featured in that part or all of a formula on a display screen is selected by the input pen 604, and a deformed formula is applied to the formula, thereby deforming the displayed formula.

Figure 63A:
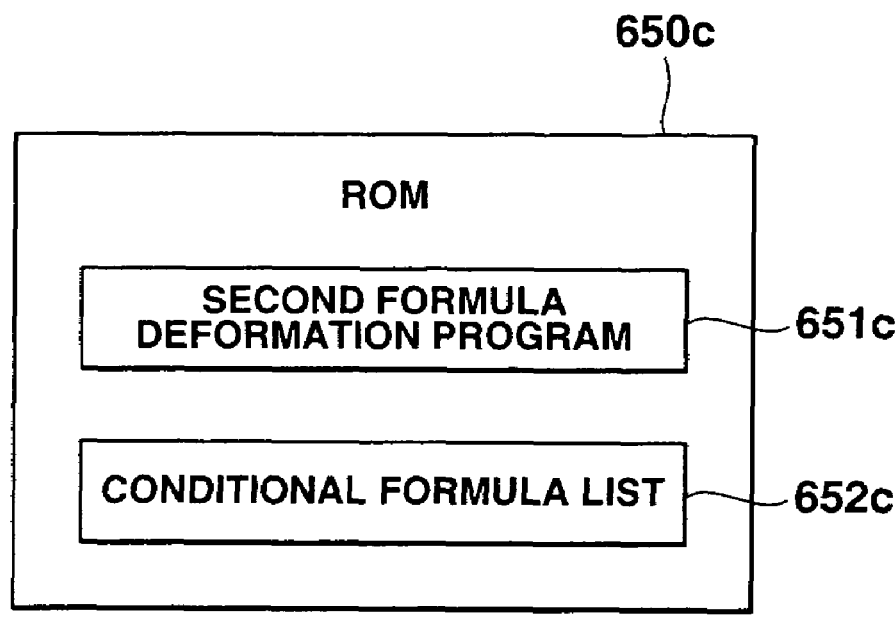
FIG. 63A is a view showing a configuration of a ROM in the eighth embodiment.
Figure 63B:
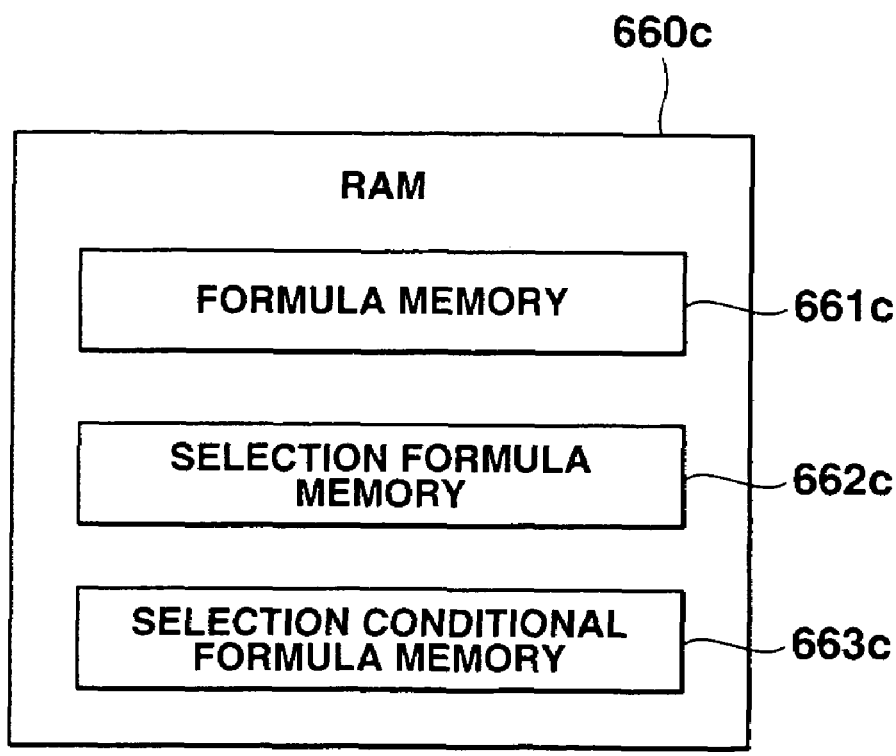
FIG. 63B is a view showing a configuration of a RAM in the eighth embodiment.

FIG. 63A is a view showing a configuration of a ROM 650c in the eighth embodiment, and FIG. 63B is a view showing a configuration of a RAM 660c.

The ROM 650c stores a second formula deformation program 651c and a deformed formula list 652c. The second formula deformation program 651c is a program for achieving the eighth embodiment. In the eighth embodiment, the CPU 610 executes processing in accordance with the second formula deformation program 651c.

The deformation formula list is a list (listing) which stores a plurality of deformation formulas. FIG. 64 shows an example of the list. The deformation formula is a formula for equivalently deforming a target formula (i.e., a selected formula portion). In the figure, the deformation formula is expressed in the name of "conversion means."

This deformation formula requires selection of a deformation direction or specification of an argument. The deformation direction is a direction in which the deformation formula is applied (i.e., from a left side to a right side or from a right side to a left side). The argument is a variable (or a sign or a constant) in which the deformation formula is applied among the variables (or signs or constants) of a target formula.

For example, in FIG. 64, a deformation formula "a″=a×a×a×a . . . " is a formula in which a formula expressed by a power is deformed to a formula represented by multiplication. This formula requires specification of the deformation direction (i.e., deformation of a power to multiplication or deformation of multiplication to a power).

A deformation formula "a″+ . . . +a+1=1+a+ . . . +a′″" is a formula for deforming the current formula to a formula in which polynomials (monomials may be available) are rearranged in ascending power order of "a." This formula requires specification of the deformation direction (i.e., rearrangement in either of ascending and descending power orders) and argument "a."

A deformation formula "1=(sin (a))²+(cos (a))²" is a formula for deforming "1" to a formula including a sin function and a cos function. This formula requires specification of argument "a."

Referring to FIG. 63B, the RAM 660c comprises a formula memory 661, a selected formula memory 662c, and a selected deformation formula memory 663c.

The formula memory 661c sequentially stores a formula displayed on a display screen.

The selected formula memory 662c stores part or all of the formula selected by a user operation or input. Specifically, this memory stores a term or factor included in the formula or a partial formula. The selected deformation formula memory 663c stores a selected formula selected by the user operation or input.

<Operations>

Operations of the functional pocket calculator 601 in the eighth embodiment will be described here.

Figure 65:
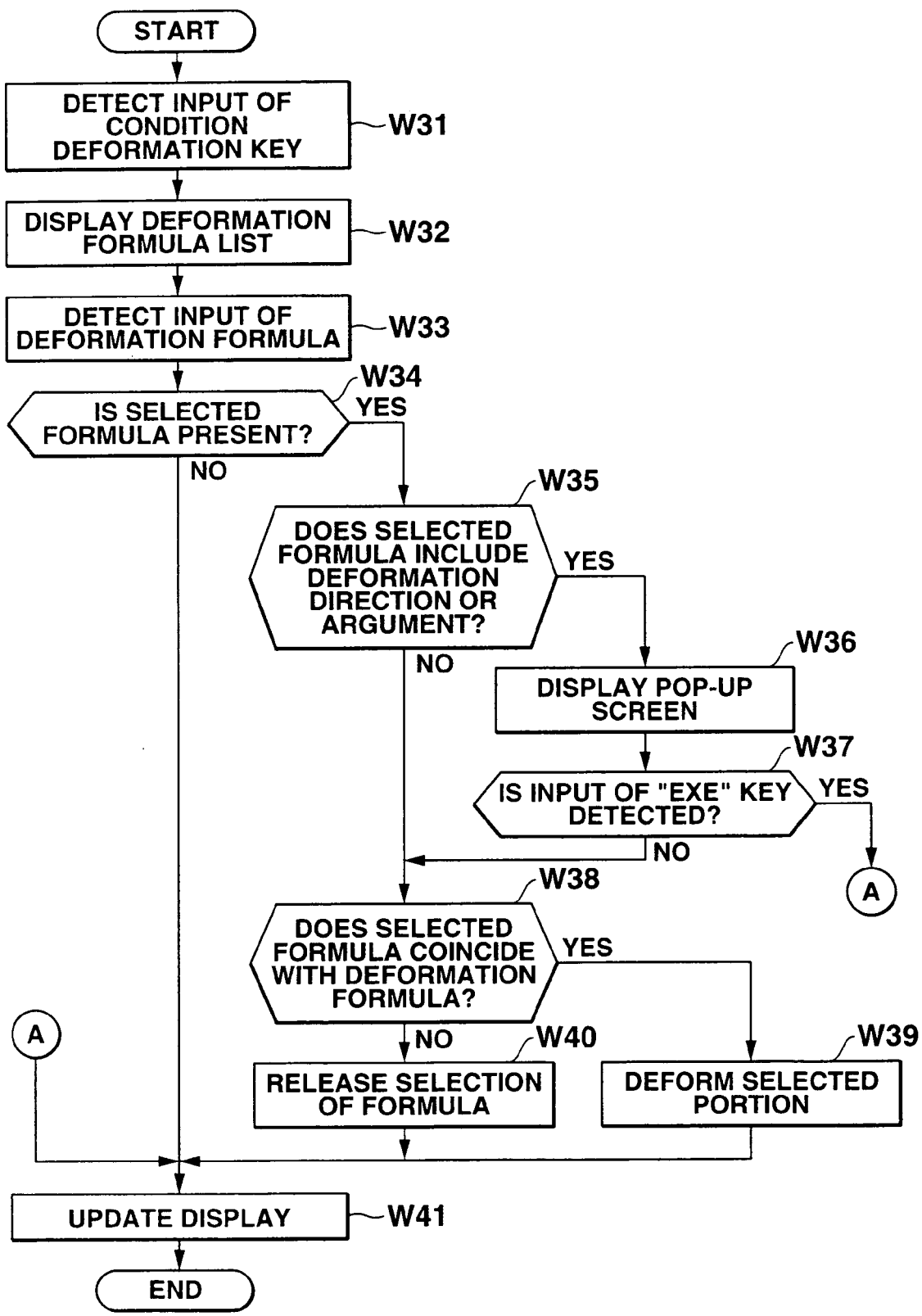
FIG. 65 is a flow chart for illustrating an operation in the eighth embodiment.

FIG. 65 is a flow chart illustrating operations of the functional pocket calculator 601 in the eighth embodiment, wherein processing is executed based on a second formula deformation program 651c. FIG. 66A to FIG. 68D are views each showing a change example of a display screen in operation 1 to operation 3 each in accordance with the flow chart of FIG. 65. FIG. 66A to FIG. 66D move in alphabetical orders such as FIG. 66A, FIG. 66B, FIG. 66C and FIG. 66D.

(Operation 1)

Operation 1 is an operation in the case of applying a deformation formula which requires specification of a deformation direction and an argument.

When a formula processing mode is selected by a mode switching operation, the CPU 610 starts execution of a predetermined program in accordance with the formula processing mode to set the formula processing mode. Then, the CPU 610 stands by for inputs of a formula targeted for processing or an instruction for arithmetical operation and the like, and starts execution of the second formula deformation program 651c. An input formula is displayed on a display screen, arithmetical operation for the formula is executed on a step by step basis every time an arithmetical operation instruction is input, and the execution result is displayed.

Figure 66A:
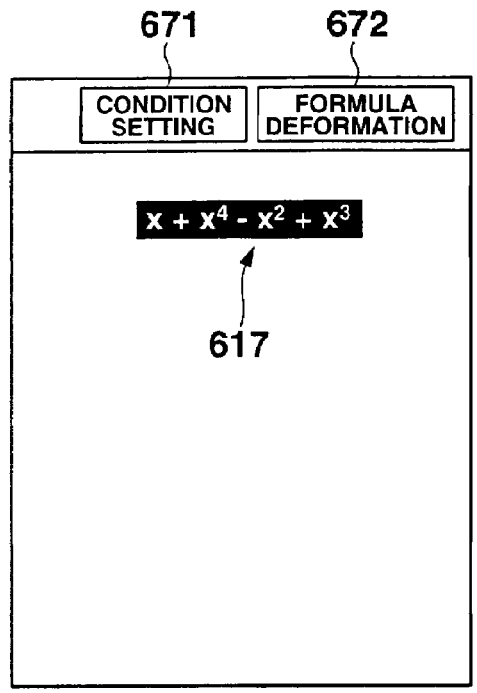
FIG. 66A, FIG. 66B, FIG. 66C and FIG. 66D are views each showing a change example of a display screen in the eighth embodiment.

FIG. 66A is an example of a display screen displayed at this stage. Referring to the figure, formula 617 expressed as formula (11) below is displayed on the display screen.

$$x+x^4-x^2+x^3 \qquad (11)$$

In this display screen, a user selects a desired portion for deformation from among formula 617 by the input pen 604. Then, the CPU 610 determines which portion of formula 617 is selected based on a coordinate value input from the position detecting circuit 631. Then, the CPU 610 temporarily stores a portion of formula 617 determined to have been selected (hereinafter, occasionally referred to as a "selected formula") in the selected formula memory 662c in the RAM 660c. That is, the CPU 610 determines that the entire formula 617 "$x+x^4-x^2+x^3$" is selected in FIG. 66A, and is temporarily stored as a selected formula in the selected formula memory 662c.

Further, the user inputs a formula deformation key 672 provided at the upper part of the display screen by the input pen 604. When input of the formula deformation key 672 is sensed (step W31), the CPU 610 refers to a deformation formula list 672 stored in the ROM 650c, and displays a plurality of deformation formulas to be listed as shown in FIG. 66B, for example (step W32).

Figure 66B:
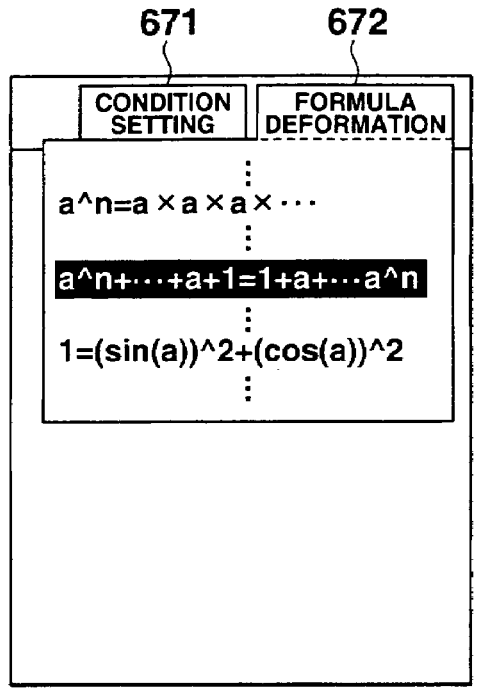

FIG. 66B is a view showing an example of the display screen at this stage.

On the display screen, the formula deformation key 672 is input, and a plurality of deformation formulas "$a''=a \times a \times a \times a \ldots$", "$a''+ \ldots +a+1=1+a+ \ldots +a''$," and "$1=(\sin(a))^2+(\cos(a))^2$" are displayed to be listed. The deformation formulas displayed here are included in the deformation formula list 52c.

In this display screen, the user selects a desired deformation formula to be applied to a portion (selected formula) of formula 617 selected previously from among the deformation formulas displayed to be listed. When selection of a deformation formula is sensed, the CPU 610 determines which deformation formula is selected based on the coordinate value input from the position detecting circuit 631. That is, the CPU 610 determines that "$a''+ \ldots +a+1=1+a+ \ldots +a''''$" is selected in FIG. 66B (step W33). The deformation formula "$a''+ \ldots +a+1=1+a+ \ldots +a''''$" is a formula in which deformation for re-arranging powers in ascending or descending order is executed as described above.

When a deformation formula is selected, the CPU 610 determines the presence or absence of a selected formula. That is, the CPU 610 determines the presence or absence of a selected formula temporarily stored in the selected deformation formula memory 663c in the RAM 660c (step W34).

If it is determined that "a selected formula is present" (step W34: YES), the CPU 610 determines whether or not specification of the deformation direction and argument is required in order to apply the above selected deformation formula (hereinafter, occasionally referred to as a "selected deformation formula") (step W35). That is, the CPU 610 determines that specification of the deformation direction and specification of argument is required for the selected deformation formula "$a''+ \ldots +a+1=1+a+ \ldots +a''''$" (step W35: YES). Then, a pop-up screen 161 for inputting selection of the deformation direction and specification of argument is displayed as shown in FIG. 66C, for example (step W36).

Figure 66C:
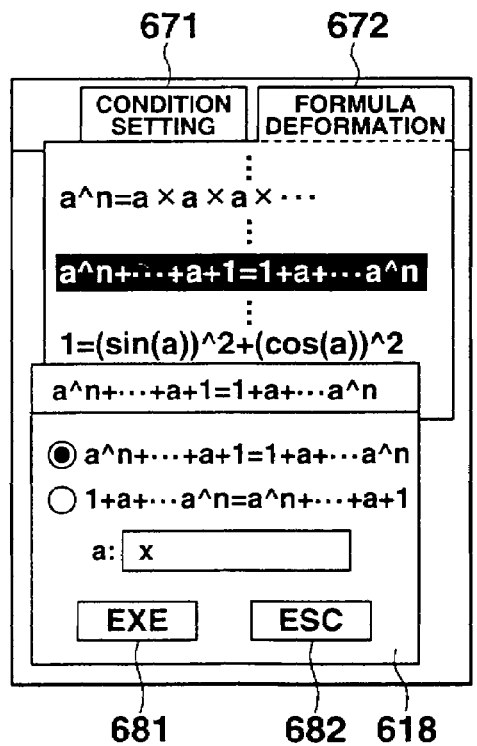

FIG. 66C is a view showing an example of the display screen at this stage. The display screen displays the pop-up screen 161 for specifying the deformation direction in which the deformation formula "$a''+ \ldots ++a+1=1+a+ \ldots +a''''$" is applied; and argument "a." On the pop-up screen 161, the deformation direction of the deformation formula is selected in a radio button format, and the argument "a" can be input.

In this display screen, the user specifies the desired deformation direction and argument to be applied to a selected formula, and inputs an EXE key 681. When input of the EXE key 681 is sensed, the CPU 610 determines the specified deformation direction and argument. That is, in FIG. 66C, it is determined that "x" is specified as deformation from a left side to a right side (i.e., deformation for rearrangement of powers in ascending order) and argument "a."

When the deformation direction and argument are specified, the CPU 610 determines whether or not the selected formula coincides with the selected deformation formula, i.e., whether or not the selected formula can be deformed in accordance with the selected deformation formula. Here, the selected formula "$x+x^4-x^2+x^3$", is a polynomial with respect to "x," and the selected deformation formula "$a''+ \ldots +a+1=1+a+ \ldots +a''''$" is a deformation for rearranging the polynomial in ascending or descending power order with respect to "a." Therefore, the CPU 610 determines that the selected formula coincides with the selected deformation formula (step W38).

If it is affirmatively determined (step W38: YES), the CPU 610 deforms the selected formula in accordance with the selected deformation formula.

That is, the selected formula "$x+x^4-x^2+x^3$" is deformed to a formula "$x-x^2+x^3+x^4$" rearranged in ascending power order with respect to "x" specified as the argument "a" (step W39).

When the selected formula is deformed in accordance with the selected deformation formula, the CPU 610 replaces the selected formula in the currently displayed formula 617 with a formula after deformed, and generates a new formula, as shown in formula (12) below. In operation 1, the entire formula 617 is defined as a selected formula, and thus, the entire formula 617 is deformed.

$$x-x^2+x^3+x^4 \qquad (12)$$

Figure 66D:
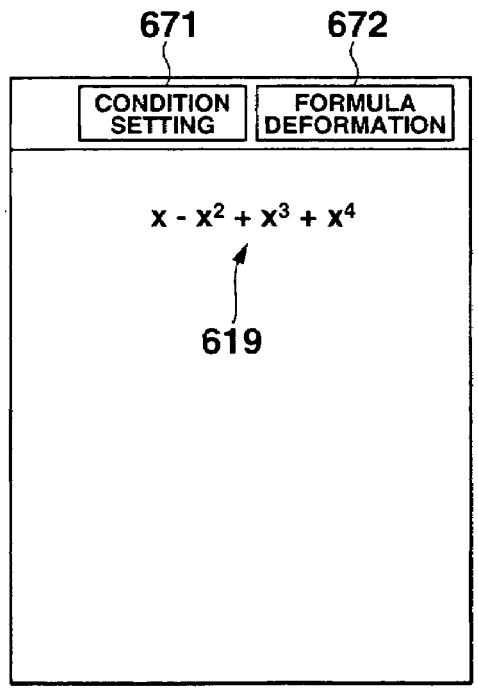

The generated formula 619 is displayed as shown in FIG. 66D, for example, and a display screen is updated ((step W41).

FIG. 66D is a view showing the display screen at this stage. The display screen displays formula 619 obtained by replacing the entire formula 617 with a formula after deformed "$x-x^2+x^3+x^4$" instead of formula 617. In this manner, the CPU 610 executes deformation for formula 617.

In the step W34, if it is determined "no selected formula is present" (step W34: NO), the CPU 610 redisplays a screen shown in FIG. 66D, for example, (step W41), and terminates this processing because no formula is targeted to be deformed by a selected deformation formula.

In the step W38, if it is determined that a selected deformation formula does not coincide with a selected formula (step W38: NO), or alternatively, in the step W37, if input of an ESC key 582 is sensed (step W27: NO), the CPU 610 invalidates the selected formula. Then, the CPU 610 redisplays a display screen shown in FIG. 66A, for example (step W41), and terminates this processing.

(Operation 2)

Operation 2 is an operation in the case of applying a deformation formula which requires selection of a deformation direction.

When a formula processing mode is selected by a mode switching operation, the CPU 610 starts execution of a predetermined program according to the formula processing mode to set the formula processing mode. Then, the CPU 610 stands by for inputs of a formula or an arithmetical operation instruction and the like targeted for processing, and starts execution of the first formula deformation program 651a. The input formula is displayed on a display screen, arithmetical operation with respect to the formula is executed on a step by step basis every time the arithmetical operation instruction is input, and the execution result is displayed.

FIG. 67A to FIG. 67D each show an example of a display screen displayed at this stage.

Formula 620 expressed as formula (13) below is displayed on a display screen.

$$1+a \times a + a \times b \qquad (13)$$

In this display screen, the user selects a desired portion to be deformed from among formula 620 by the input pen 604. The CPU 610 determines which portion of formula 620 is selected based on a coordinate value input from a position detecting circuit 631. Then, the CPU 610 temporarily stores a portion of formula 620 determined to have been selected in the selected formula memory 662c. That is, the CPU 610 determines that a part of formula 620 "axa" is selected in FIG. 67A, and the selected part is temporarily stored as a selected formula in the selected formula memory 662c.

Further, the user inputs a formula deformation key 672 provided at the upper part of the display screen by the input pen 604. When input of the formula deformation key 672 is sensed (step W31), the CPU 610 refers to a deformation formula list 652 stored in the ROM 650c, and causes a plurality of deformation formulas to be displayed as a list, as shown in FIG. 67B, for example (step W32).

Figure 67A:
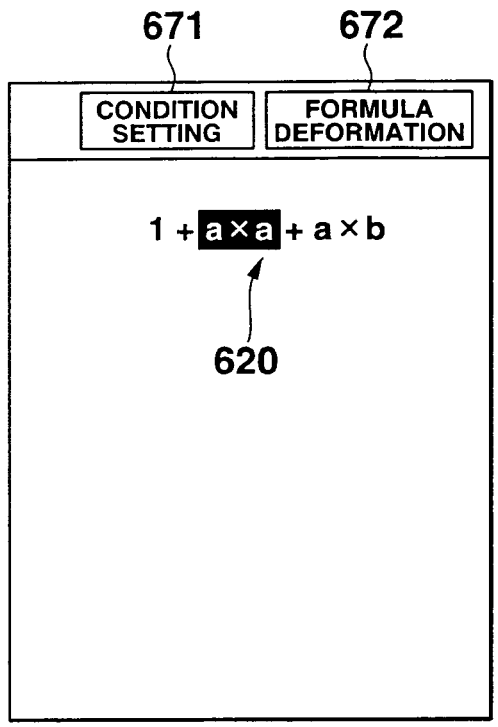
FIG. 67A, FIG. 67B, FIG. 67C and FIG. 67D are views each showing a change example of a display screen in the eighth embodiment.
Figure 67B:
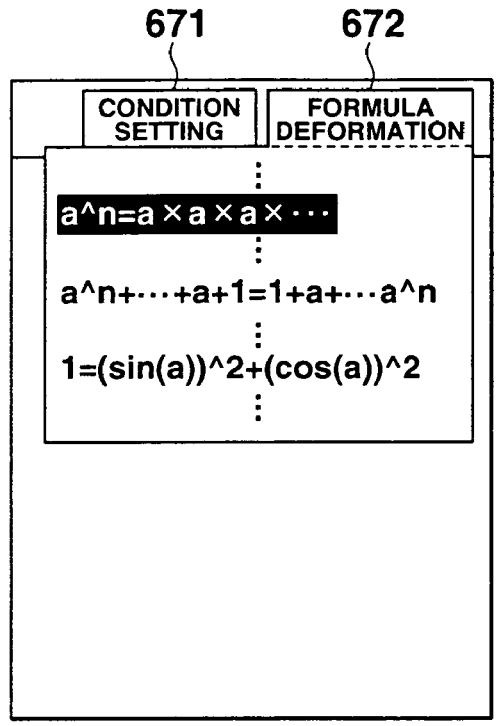

FIG. 67B is a view showing an example of the display screen at this stage.

On the display screen, the formula deformation key 672 is input, and a plurality of deformation formulas "a″=a×a× a×a . . . ," "a″+ . . . +a+1=1+a+ . . . a″," and "1=(sin (a))²+(cos (a))²" are displayed to be listed. The deformation formulas displayed here are included in the deformation formula list 652c.

In this display screen, the user selects a desired deformation formula to be applied to a portion (selected formula) of formula 620 selected previously from among the deformation formulas displayed to be listed. When selection of the deformation formula is sensed, the CPU 610 determines which deformation formula is selected based on a coordinate value input from a position detecting circuit 631. In FIG. 67B, it is determined that "a″=a×a×a×a . . ." is selected (step W33). Here, the deformation formula "a″=a×a×a ×a . . ." is a formula for executing deformation to change a power to multiplication or to change multiplication to a power, as described above.

When the deformation formula is selected, the CPU 610 determines the presence or absence of a selected formula. That is, the CPU 610 determines the presence or absence of the selected formula temporarily stored in the selected deformation formula memory 663c. Here, it is determined that "a selected formula is present" (step W34).

If it is determined that "a selected formula is present" (step W34: YES), the CPU 610 determines whether or not specification of the deformation direction and argument is required in order to apply the above selected deformation formula (hereinafter, occasionally referred to as a "selected deformation formula") (step W35). That is, the CPU 610 determines that specification of the deformation direction is required for the selected deformation formula "a″=a×a×a×a . . . " (step W35: YES), and causes a pop-up screen 621 for inputting specification of the deformation direction to be displayed as shown in FIG. 67C, for example (step W36).

Figure 67C:
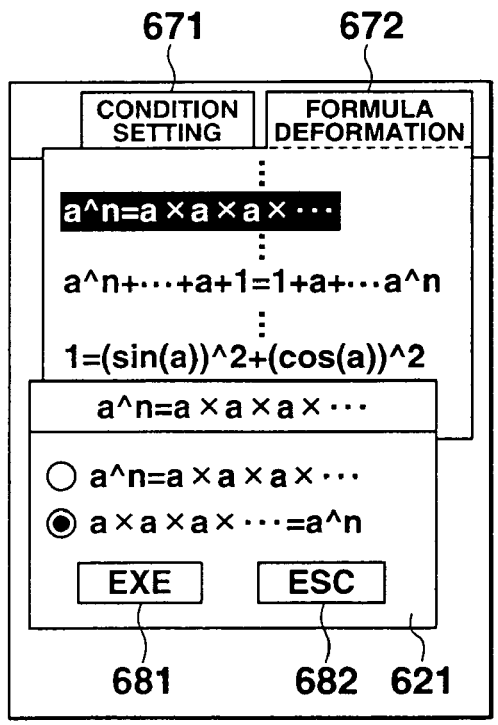

FIG. 67C is a view showing an example of the display screen at this stage. The display screen displays the pop-up screen 621 for specifying the deformation direction to which the deformation formula "a″=a×a×a . . . " is applied. On the pop-up screen 621, the deformation direction of the deformation formula can be selected in a radio button format.

In this display screen, the user selects the desired deformation direction to be applied to a selected formula, and inputs an EXE key 681. When input of the EXE key 681 is sensed (step W37: YES), the CPU 610 determines the specified deformation direction. That is, in FIG. 67C, it is determined that deformation from a right side to a left side (i.e., changing multiplication to a power) is specified.

When the deformation direction is specified, the CPU 610 determines whether or not the selected formula coincides with the selected deformation formula, i.e., whether or not the selected formula can be deformed in accordance with the selected deformation formula. Here, the selected formula "axa" is a formula of multiplication with respect to "a," and the selected deformation formula "a″=a×a×a×a . . . " is a deformation which changes multiplication to a power or changes a power to multiplication. Therefore, the CPU 610 determines that the selected formula coincides with the selected deformation formula (step W38: YES).

If it is affirmatively determined (step W38: YES), the CPU 610 deforms the selected formula in accordance with the selected deformation formula. That is, the selected formula "axa" is deformed from a formula expressed by multiplication to formula "a²" expressed by a power (step W39).

When the selected formula is deformed in accordance with the selected deformation formula, the CPU 610 replaces the selected formula in the currently displayed formula 620 with a formula after deformed, and generates a new formula, as shown in formula (14) below.

$$1+a^2+a \times b \qquad (14)$$

Figure 67D:
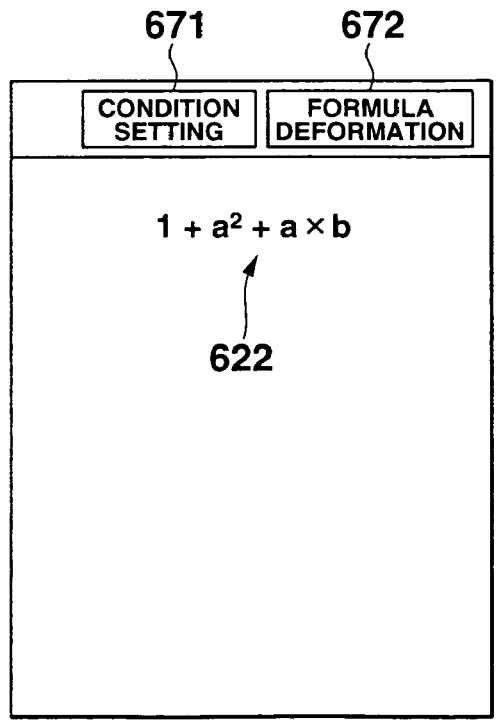

The generated formula 622 is displayed as shown in FIG. 67D, for example, and the display screen is updated (step W41).

FIG. 67D is a view showing the display screen at this stage. The display screen displays formula 622 obtained by replacing the selected formula "axa" in formula 620 with "a²" after deformed instead of formula 620. In this manner, the CPU 610 executes deformation for formula 620.

(Operation 3)

Operation 3 is an operation in the case of applying a deformation formula which requires specification of an argument.

When a formula processing mode is selected by a mode switching operation, the CPU 610 starts execution of a predetermined program according to a formula processing mode to set the formula processing mode. Then, the CPU 610 stands by for inputs of a formula or an arithmetical operation instruction and the like targeted for processing, and starts execution of the second formula deformation program 651c. The input formula is displayed on a display screen, arithmetical operation with respect to the formula is executed on step by step basis every time the arithmetical operation instruction is input, and the execution result is displayed.

Figure 68A:
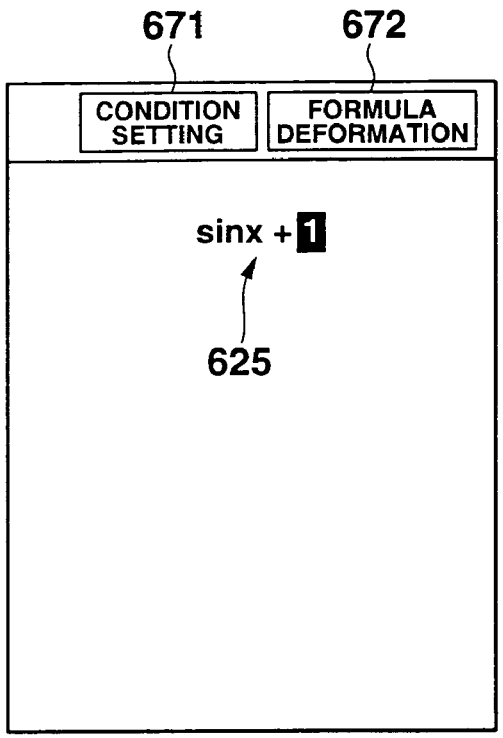
FIG. 68A, FIG. 68B, FIG. 68C and FIG. 68D are views each showing a change example of a display screen in the eighth embodiment.

FIG. 68A shows an example of the display screen displayed at this stage. Formula 625 expressed as formula (15) below is displayed on the display screen.

$$\sin(x)+1 \qquad (15)$$

In this display screen, the user selects a desired portion to be deformed in formula 625 by the input pen 604. Then, the CPU 610 determines which portion of formula 625 is selected based on a coordinate value input from the position detecting circuit 631, and temporarily stores a portion of formula 625 determined to have been selected (hereinafter, occasionally referred to as a "selected formula") in the selected formula memory 662c. That is, the CPU 610 determines that "1" as a portion of formula 625 is selected in FIG. 68A, and the selected portion is temporarily stored as a selected formula in the selected formula memory 662c.

Further, the user inputs the formula deformation key 672 provided at the upper part of the display screen by the input pen 604. When input of the formula deformation key 672 is sensed (step W31), the CPU 610 refers to the deformation formula list 652 stored in the ROM 650c, and causes a plurality of deformation formulas to be displayed as a list, as shown in FIG. 68B, for example (step W32).

Figure 68B:
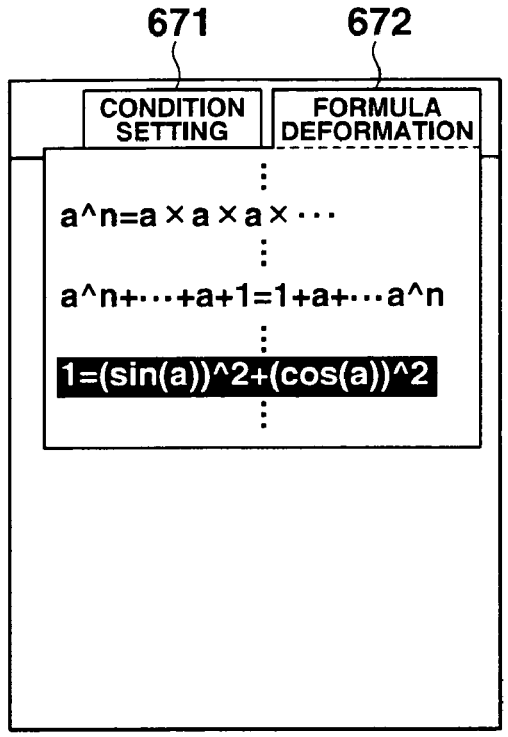

FIG. 68B is a view showing an example of the display screen at this stage. On the display screen, the formula deformation key 672 is input, and a plurality of deformation formulas "a$^n$=a×a×a×a . . . ," "a$^n$+ . . . +a+1=1+a+ . . . +a$^{n}$" "1=(sin (a))$^2$+(cos (a))$^2$" are displayed to be listed. The deformation formulas displayed here are included in the deformation formula list 652c.

In this display screen, the user selects a desired deformation formula to be applied to a portion (selected formula) of formula 625 selected previously from among the deformation formulas displayed to be listed. When selection of the deformation formula is sensed, the CPU 610 determines which deformation formula is selected based on a coordinate value input from the position detecting circuit 631. That is, the CPU 610 determines that "1=(sin (a))$^2$+(cos (a))$^2$" in FIG. 68B (step W33) is selected. Here, the deformation formula "1=(sin (a))$^2$+(cos (a))$^2$" is a formula for deforming constant "1" to a formula including a sin function and a cos function, as described above.

When the deformation formula is selected, the CPU 610 determines the presence or absence of the selected formula. That is, the CPU 610 determines the presence or absence of the selected formula temporarily stored in the selected deformation formula memory 663c. Here, it is determined that "a selected formula is present" (step W34).

If it is determined that "a selected formula is present" (step W34: YES), the CPU 610 determines whether or not specification of the deformation direction and argument is required in order to apply the above selected deformation formula (hereinafter, occasionally referred to as a "selected deformation formula") (step W35). That is, the CPU 610 determines that it is required to input an argument for the selected deformation formula "1=(sin (a))$^2$+(cos (a))$^2$" (step W35: YES). Then, the CPU 610 causes a pop-up screen 626 for inputting specification of an argument to be displayed as shown in FIG. 68C, for example (step W36).

Figure 68C:
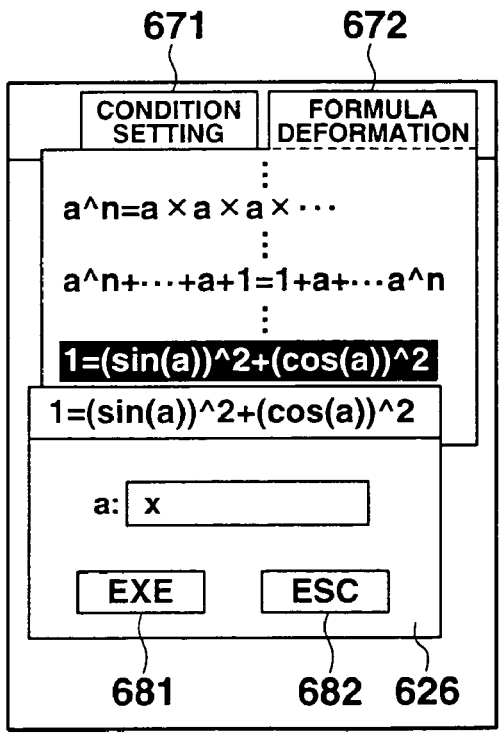

FIG. 68C is a view showing an example of the display screen at this stage.

The display screen displays the pop-up screen 626 for specifying argument "a" which applies the deformation formula "1=(sin (a))$^2$+(cos (a))$^2$." On the pop-up screen 626, the argument "a" of the deformation formula can be input.

In this display screen, the user specifies a desired argument to be applied to the selected deformation formula, and inputs an EXE key 681. When input of the EXE key 681 is sensed (step W37: YES), the CPU 10 determines the specified argument. That is, in FIG. 68C, it is determined that "x" is specified as the argument "a."

When the argument is specified, the CPU 610 determines whether or not the selected formula coincides with the selected deformation formula, i.e., whether or not the selected formula can be deformed in accordance with the selected deformation formula. Here, the selected formula is "1," and the selected deformation formula "1=(sin (a))$^2$+(cos (s))$^2$" is a deformation which changes constant "1" into a formula including a sin function and a cos function. Therefore, the CPU 610 determines that the selected formula coincides with the selected deformation formula (step W38).

If it is affirmatively determined (step W38: YES), the CPU 610 deforms the selected formula in accordance with the selected deformation formula. That is, the selected formula "1" is deformed to a formula "sin (a))$^2$+(cos (s))$^2$" including a sin function and a cos function (step W39).

When the selected formula is deformed in accordance with the selected deformation formula, the CPU 610 replaces the selected formula in the currently displayed formula 625 with a formula after deformed, and generates a new formula, as shown in formula (16) below.

$$\sin(x)+(\sin(x))^2+(\cos(x))^2 \qquad (16)$$

Figure 68D:
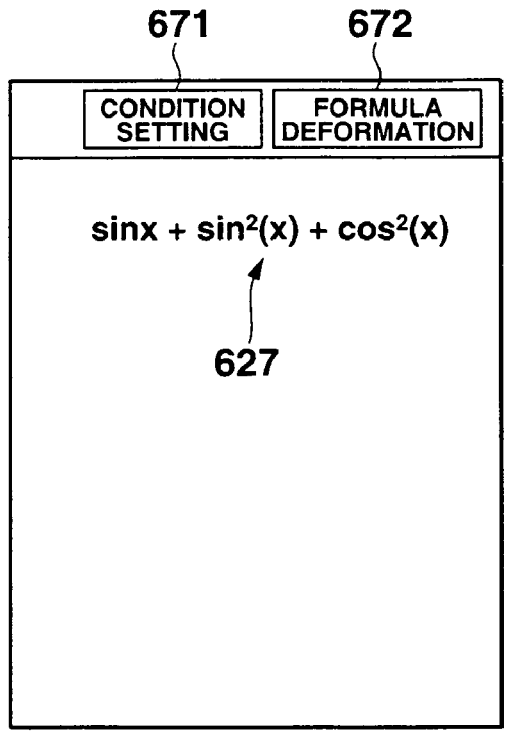

The generated formula 627 is displayed as shown in FIG. 68D, for example, and a display screen is updated (step W41).

FIG. 68D is a view showing the display screen at this stage. The display screen displays formula 627 obtained by replacing the selected formula "1" in formula 625 with "(sin (x))$^2$+(cos (x))$^2$" after deformed instead of formula 625. In this manner, the CPU 610 executes deformation for formula 625.

As is described above, according to the eighth embodiment, after part or all of the displayed formula is selected, when the deformation formula is selected, part or all of the selected formula is displayed to be deformed in accordance with the selected deformation formula (selected deformation formula). That is, the user selects a desired formula from among a plurality of deformation formulas provided, thereby making it possible to easily execute deformation for a desired portion to be deformed in the formula. Thus, the usability of a formula processing function can be improved more significantly.

MODIFIED EXAMPLE

The present invention can be modified without deviating from the spirit of the present invention without being limited to the above described embodiments.

Figure 69A:
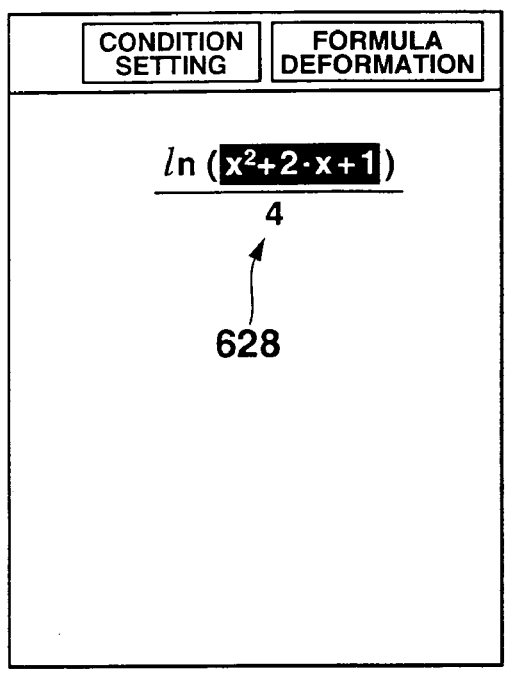
FIG. 69A, FIG. 69B and FIG. 69C are views each showing a change example of a display screen in a modified example.
Figure 69B:
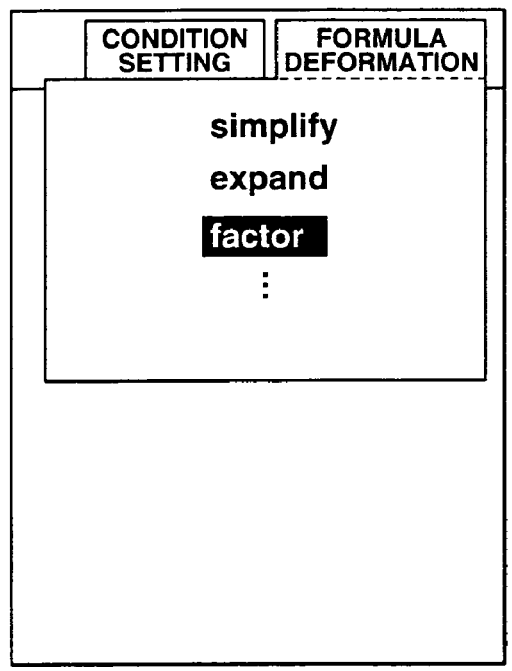
Figure 69C:
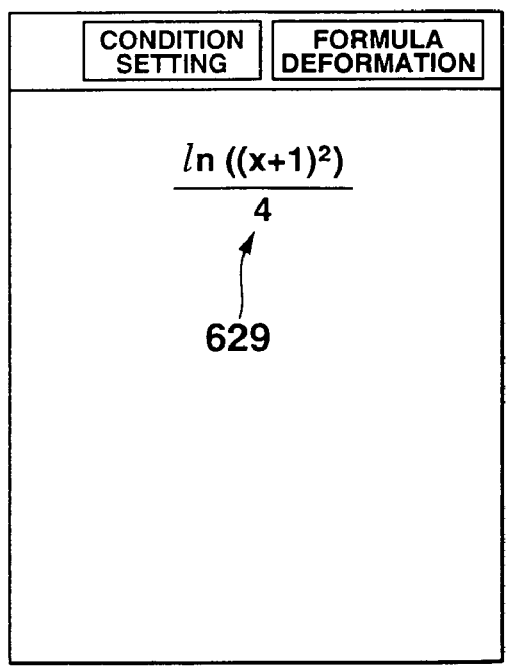

For example, in the above described eighth embodiment, although deformation is executed by selecting a modified formula, a deformation command for indicating a deformation method may be selected. FIG. 69A to FIG. 69C are views each showing a change example of the display screen at this time. These figures are changed in order of FIG. 69A, FIG. 69B and FIG. 69C.

Referring to FIG. 69A, the display screen displays formula 628 expressed as formula (17) below. In this display screen, the user selects a desired portion "x$^2$+2x+1" to be deformed, of formula 628 by the input pen 604, and inputs a formula deformation key 672 provided at the upper part of the display screen. Then, on the display screen, for example, as shown in FIG. 69B, a plurality of deformation commands are displayed to be listed.

$$\ln(x^2+2x+1)/4 \qquad (17)$$

FIG. 69B is a view showing an example of the display screen at this stage. On the display screen, the formula deformation key 672 is input, and a plurality of deformation commands, "expand" and "factor" are displayed. The command "expand" used here is a command which instructs "development of formula," and the command "factor" is a command which instructs "factorization of formula." These deformation commands are included in a deformation command list, one example of which is shown in FIG. 70, for example. This deformation command list is stored in the ROM 650.

In this display screen, the user selects a desired deformation command "factor" to be applied to a portion of the previously selected formula 628 (selected formula) from the deformation command displayed to be listed. Then, the selected formula "$x^2+2\times x+1$" is subjected to "factorization," and formula 629 after deformed is displayed on the display screen, as shown in FIG. 69C, for example.

FIG. 69C is a view showing the display screen at this stage.

The display screen displays formula 629 obtained by replacing formula 628 with "$(x+1)^2$" obtained by factorization of "$x^2+2x+1$."

In the above described embodiments, although selection or input is made by touching the corresponding position on the display screen by means of the input pen 604, of course, operation of the input key group 603 may be carried out. Further, a cursor is displayed on the display screen, and this cursor is moved by a pointing device such as a key or a mouse, whereby selection or input may be made.

The present invention may be applied to any electrical device having a formula processing function without being limited to the above described functional pocket calculator. For example, the present invention may be applied to a PC (Personal Computer) or the like.

What is claimed is:

1. A graphic display control apparatus comprising:
a display comprising a graphic display portion and a formula display portion;
a formula input unit which inputs formulas in accordance with an operation of a user, the input formulas being displayed on the formula display portion;
a position designating unit which is operable to designate points on the display, and to designate and drag one of the input formulas and to specify a drop destination for the dragged formula;
a determination unit which determines whether the drop destination is within the graphic display portion or the formula display portion of the display;
a character display unit which displays character data of the dropped formula at the formula display portion if the determination unit determines that the drop destination is within the formula display portion; and
a graph display unit which displays a graph based on the dropped formula on the graphic display portion if the determination unit determines that the drop destination is within the graphic display portion.

2. The graphic display control apparatus according to claim 1, further comprising:
a graph move unit which parallel moves the graph displayed on the graph display portion;
a graph drag unit which drags the moved graph; and
a graph drop unit which drops the dragged graph into the formula display portion, and which displays a formula corresponding to the dropped graph on the formula display portion.

3. The graphic display control apparatus according to claim 1, further comprising:
a memory which relates and stores the dropped formula and the graph formed based on the dropped formula;
a graph change unit which modifies the graph displayed on the graph display portion; and
a formula change unit which changes the formula stored in the memory and related to the modified graph, and which displays the changed formula on the formula display portion.

4. The graphic display control apparatus according to claim 3, further comprising:
a formula change unit which modifies the formula displayed on the formula display portion; and
a graph change unit which changes the graph stored in the memory and related to the modified formula, and which displays the changed graph on the graph display portion.

5. The graphic display control apparatus according to claim 3, wherein:
the memory relates and stores plural dropped formulas and plural graphs formed based on the plural dropped formulas; and
the formula change unit changes one of the formulas which is displayed on the formula display portion, stored in the memory, and related to the modified graph, and the formula change unit displays the changed formula on the formula display portion.

6. The graphic display control apparatus according to claim 3, further comprising:
an indication unit which displays a mark which indicates that the changed formula and the modified graph are related.

7. A computer-readable storage medium having a program stored thereon that is executable by a control section of a graphic display control apparatus, which includes a formula input unit, a position designating unit, and a display comprising a graphic display portion and a formula display portion, the program being executable by the control section to cause the control section to perform functions comprising:
receiving formulas input via the formula input unit in accordance with an operation of a user, and causing the input formulas to be displayed on the formula display portion;
receiving a designation of one of the input formulas to be dragged, and receiving a specification of a drop destination for the dragged formula, in accordance with operation of the position designating unit, which is operable to designate points on the display;
determining whether the drop destination is within the graphic display portion or the formula display portion of the display;
displaying character data of the dropped formula at the formula display portion if it is determined that the drop destination is within the formula display portion; and
displaying a graph based on the dropped formula on the graphic display portion if it is determined that the drop destination is within the graphic display portion.

* * * * *